US012521789B2

(12) United States Patent
Cauchy et al.

(10) Patent No.: US 12,521,789 B2
(45) Date of Patent: Jan. 13, 2026

(54) ADDITIVE MANUFACTURING POWDERS WITH IMPROVED PHYSICAL CHARACTERISTICS, METHOD OF MANUFACTURE AND USE THEREOF

(71) Applicant: Tekna Plasma Systems Inc., Sherbrooke (CA)

(72) Inventors: Xavier Cauchy, Outremont (CA); Hakim Rahma, Magog (CA)

(73) Assignee: Tekna Plasma Systems Inc., Sherbrooke (CA)

( * ) Notice: Subject to any disclaimer, the term of this patent is extended or adjusted under 35 U.S.C. 154(b) by 166 days.

(21) Appl. No.: 17/608,398

(22) PCT Filed: May 1, 2020

(86) PCT No.: PCT/CA2020/050590
§ 371 (c)(1),
(2) Date: Nov. 2, 2021

(87) PCT Pub. No.: WO2020/220143
PCT Pub. Date: Nov. 5, 2020

(65) Prior Publication Data
US 2022/0288676 A1    Sep. 15, 2022

Related U.S. Application Data

(60) Provisional application No. 62/842,050, filed on May 2, 2019.

(51) Int. Cl.
*B22F 10/34* (2021.01)
*B22F 1/052* (2022.01)
(Continued)

(52) U.S. Cl.
CPC .............. *B22F 1/065* (2022.01); *B22F 1/052* (2022.01); *B22F 1/102* (2022.01); *B22F 1/145* (2022.01);
(Continued)

(58) Field of Classification Search
CPC .. B22F 1/16; B22F 10/34; B22F 1/102; B22F 1/065; B33Y 70/00
See application file for complete search history.

(56) References Cited

U.S. PATENT DOCUMENTS 5,411,761 A    5/1995   Inokuchi et al.
5,547,796 A    8/1996   Kohtaki et al.
(Continued)

FOREIGN PATENT DOCUMENTS

CA    3003502    5/2017
CN    108367361 A    8/2018
(Continued)

OTHER PUBLICATIONS

International Preliminary Report on Patentability in International Appln. No. PCT/CA2020/050590, dated Nov. 2, 2021, 10 pages.
(Continued)

*Primary Examiner* — Adam Krupicka
(74) *Attorney, Agent, or Firm* — Fish & Richardson P.C.

(57) ABSTRACT

In additive manufacturing operations, powders used in stereolithographic processes need to be precisely spread out in a uniform fashion at every pass of the stereolithographic process to ensure predictability in powder surface morphology. Typically, this is difficult to achieve with conventional powders because often these powders suffer from poor flowability, which may further deteriorate over time, and impairs the efficiency of the stereolithographic processes. The present disclosure describes additive manufacturing powders having improved physical characteristics such as
(Continued)

flowability and tap density, which are less sensitive or insensitive to ambient humidity. For example, there is described a powder that includes spherical particles having a particle size distribution of less than 1000 micrometers and having a measurable flowability as determined in accordance with ASTM B213 at 75% relative humidity.

27 Claims, 58 Drawing Sheets

(51) Int. Cl.
| | |
|---|---|
| B22F 1/065 | (2022.01) |
| B22F 1/102 | (2022.01) |
| B22F 1/145 | (2022.01) |
| B22F 1/16 | (2022.01) |
| B22F 9/14 | (2006.01) |
| B22F 10/28 | (2021.01) |
| B22F 10/38 | (2021.01) |
| B22F 10/66 | (2021.01) |
| B22F 10/73 | (2021.01) |
| B22F 12/67 | (2021.01) |
| B33Y 10/00 | (2015.01) |
| B33Y 70/00 | (2020.01) |
| C22C 16/00 | (2006.01) |
| C22C 19/05 | (2006.01) |
| C22C 21/02 | (2006.01) |
| B22F 10/322 | (2021.01) |
| B22F 10/68 | (2021.01) |
| B22F 12/90 | (2021.01) |
| B33Y 30/00 | (2015.01) |

(52) U.S. Cl.
CPC .............. *B22F 9/14* (2013.01); *B22F 10/28* (2021.01); *B22F 10/38* (2021.01); *B22F 10/66* (2021.01); *B22F 10/73* (2021.01); *B22F 12/67* (2021.01); *B33Y 10/00* (2014.12); *B33Y 70/00* (2014.12); *C22C 16/00* (2013.01); *C22C 19/055* (2013.01); *C22C 21/02* (2013.01); *B22F 1/16* (2022.01); *B22F 10/322* (2021.01); *B22F 10/34* (2021.01); *B22F 10/68* (2021.01); *B22F 12/90* (2021.01); *B22F 2301/052* (2013.01); *B22F 2301/15* (2013.01); *B22F 2301/205* (2013.01); *B22F 2304/10* (2013.01); *B33Y 30/00* (2014.12)

(56) References Cited

U.S. PATENT DOCUMENTS

| | | | |
|---|---|---|---|
| 6,300,408 B1 | 10/2001 | Asano et al. | |
| 6,350,801 B1 | 2/2002 | Asano et al. | |
| 6,503,445 B2* | 1/2003 | Ozaki | B22F 1/108 |
| | | | 419/65 |
| 7,651,560 B2 | 1/2010 | Risse et al. | |
| 7,943,084 B1 | 5/2011 | Johnson et al. | |
| 8,859,035 B1* | 10/2014 | Leamon | B01J 23/42 |
| | | | 427/535 |
| 8,894,739 B1 | 11/2014 | Johnson et al. | |
| 2017/0008082 A1* | 1/2017 | Chen | B22F 1/05 |

FOREIGN PATENT DOCUMENTS

| | | | | |
|---|---|---|---|---|
| CN | 113924177 | | 1/2022 | |
| CN | 113924177 B | | 7/2024 | |
| EP | 0913220 A1 | | 5/1999 | |
| EP | 3962677 | | 3/2022 | |
| IN | 202117055662 A | | 5/2022 | |
| JP | 10317001 | | 12/1998 | |
| JP | 2017-154914 A | | 9/2017 | |
| JP | 2018-124317 A | | 8/2018 | |
| JP | 2019500503 | | 1/2019 | |
| WO | WO 2014083277 A1 | | 6/2014 | |
| WO | WO-2017070779 A1 * | | 5/2017 | ............... B01J 2/02 |
| WO | WO 2019007699 A1 | | 1/2019 | |
| WO | WO 2020220143 | | 11/2020 | |

OTHER PUBLICATIONS

International Search Report and Written Opinion in International Appln. No. PCT/CA2020/050590, dated Aug. 20, 2020, 16 pages.
Stevens et al., "Controlling Unconfined Yield Strength in a Humid Environment through Surface Modification of Powders," Powder Technology, 2009, 191:170-175.
European Search Report issued Dec. 5, 2022 in connection with EP Application No. 20799111.8, 15 pages.
Examiner's Report issued Jan. 25, 2024 in connection with CA Patent Application No. 3138388, 3 pages.
Muniz-Lerma Jose et al "A Comprehensive Approach to Powder Feedstock Characterization for Powder Bed Fusion Additive Manufacturing: A Case Study on AlSi7Mg", Materials, vol. 11, No. 12, Nov. 27, 2018 (Nov. 27, 2018), p. 2386, XP055973437, DOI: 10.3390/ma11122386.
Office Action issued in connection with CN Patent Application No. 2020800410438 on Jan. 9, 2023, 4 pages.
Office Action issued in connection with CN Patent Application No. 2020800410438 on Sep. 20, 2023 and EN summary, 44 pages.
Yannig Thomas et al.: "Effect of Atmospheric Humidity and Temperature on the Flowability of Lubricated Powder Metallurgy Mixes", Jan. 1, 2009 (Jan. 1, 2009), XP055397965, Retrieved from the Internet: URL: http://qmp-powders.com/wp-content/uploads/pdfs/technical-papers/2009-Effect-of-Atmospheric-Humidity-and-Temperature-on-the-Flowability-of-Lubricated-Powder-Metallurgy-Mixes.pdf [retrieved on Aug. 10, 2017].
Office Action issued in connection with CN Patent Application No. 2020800410438 on Mar. 4, 2024, and EN translation, 10 pages.
Office Action issued in connection with JP Patent Application No. 2021-564797 on May 7, 2024, 3 pages.
Decision to Grant issued in connection with Japanese Patent Application No. 2021-564797 on Jun. 3, 2025, 4 pages.
Examiner's Report issued Feb. 27, 2025 in connection with CA Patent Application No. 3138388, 4 pages.
Office Action issued in connection with Australian Patent Application No. 2020266480 on Apr. 28, 2025, 5 pages.
Office Action issued in connection with JP Patent Application No. 2021-564797 on Nov. 18, 2024, 3 pages.
Rectification Notice issued on Aug. 20, 2024 in connection with CN Patent Application No. 202410891558.7, 1 page.

* cited by examiner

FIG. 32A 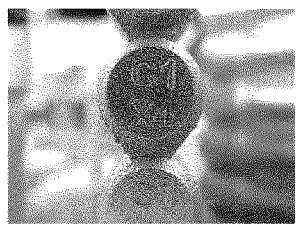 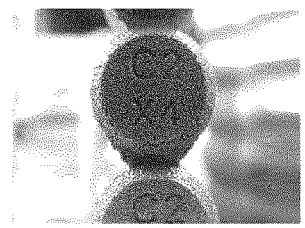 FIG. 32E
FIG. 32B 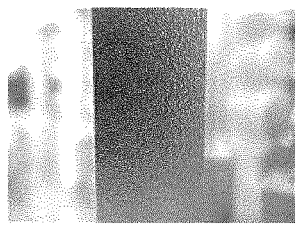 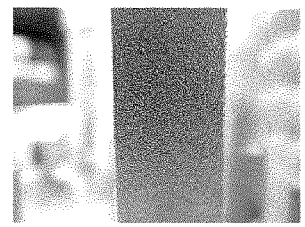 FIG. 32F
FIG. 32C 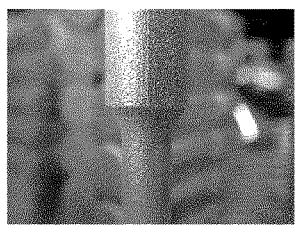 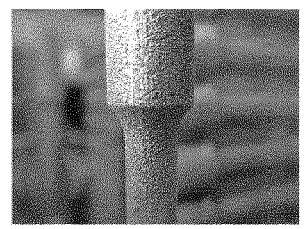 FIG. 32G
FIG. 32D 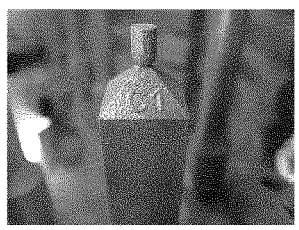 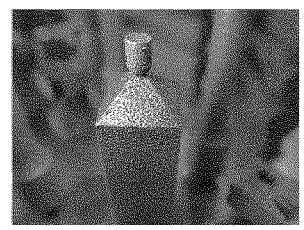 FIG. 32H

ADDITIVE MANUFACTURING POWDERS WITH IMPROVED PHYSICAL CHARACTERISTICS, METHOD OF MANUFACTURE AND USE THEREOF

CROSS-REFERENCE TO RELATED APPLICATION

The present application is the national stage entry of International Patent Application No. PCT/CA2020/050590, filed on May 1, 2020, which claims the benefit of U.S. provisional patent application Ser. No. 62/842,050, filed on May 2, 2019. The disclosures of which are incorporated herein by reference in their entirety.

TECHNICAL FIELD

This application generally relates to the field of powder materials which can be useful in additive manufacturing operations and, more specifically, to additive manufacturing powders having improved physical characteristics, method of manufacture and use thereof.

BACKGROUND

In additive manufacturing operations, powders used in stereolithographic processes need to be precisely spread out in a uniform fashion at every pass of the stereolithographic process to ensure predictability in powder surface morphology.

Typically, this is difficult to achieve with conventional powders because fine powders display inconsistent flowability behaviors and impair the efficiency of the stereolithographic processes. For example, powders that suffer from poor flowability impair the efficiency of powder rake (or "re-coater") which translates to an unpredictable powder surface morphology. Upon interacting with the laser, such a situation can result in the undesired presence of porosities in the finished product, delamination of stereolithographic layers, and incomplete melting. Such critical flaws increase the rejection rate as these flaws render finished parts unusable, which increases production costs and reduce productivity. Moreover, the unpredictability of such events is holding back the wide dissemination of additive manufacturing technologies, as design safety factors need to be very large to accommodate such fluctuations in properties and the economical and performance advantages sought for in the adoption of additive manufacturing are lost in the process.

As particles become smaller, the comparative influence of gravity on the particles become smaller, and cohesive forces that were negligible at large scale become prominent. This is critical since all forces contributing to cohesion and friction counteract gravity and decrease flowability. Among these, van der Walls interactions, polar interactions through localized static charge and hydrogen bonding and surface tension through adsorbed water are often cited. Of these, the static charge-mediated interactions are a non-issue in conductive powders since all charge separation is relaxed instantly as charges are free to reorganize in conductors. Van der Walls interactions are unavoidable if powders are to be handled at non-zero absolute temperatures.

Various solutions have been proposed to improve powder flowability.

For example, it is common for 3-D printing operators to "reset" the powder state by drying the powder under conditions specific to each operator to control adsorbed water. Some powder producers also include a drying step in their production workflow. This approach, however, does not relieve the problem in full, since all manipulations need to be closely monitored to keep the powder away from moisture at every step of the process. In some environments, this becomes extremely difficult. In a quality insurance scope, this can reveal itself to be a major source of error. Further, this known solution has a disadvantage in that it bottlenecks the production line, increases operational cost (e.g., electricity consumption) and increases likelihood of causing presence of undesirable by-products when exposing the powder to the high temperatures that are required to remove water from the powders. Further, it is extremely difficult to remove adsorb water from powder particles surface, such that some residual water often remains, which still causes powder flowability problems.

U.S. Pat. Nos. 8,894,739 and 7,943,084 teach dipping and slurring aluminum powders into silane and alkanes solutions to create a hydrophobic outer layer on the surface of the powder particles, thus avoiding water adsorption on the particle surface. However, thickness of the outer surface layer, chemical composition and nanometric roughness of the powders are compromised because the chemical reaction between the metallic aluminum powders and the solutions is hardly manageable. This approach has not met success at least because the resulting particles tend to form secondary particles through agglomeration, which negatively affects tap density of the powders. Noteworthy also is the fact that the slurring process requires large amounts of solvents which are contaminated by excess reactants (anhydrous processes use excess reactants). Moreover, the powders need to be physically separated from the solvent and dried, which is time consuming and difficult on industrial-scale batches. Further, most of these powders do not flow in a Hall test, which is indicative that powder flowability problems remain.

U.S. Pat. No. 9,994,716 teaches dry mixing the powder with an effective amount of hydrophobic fumed silica to distribute a layer thereof on to the surface of particles in an attempt to avoid water adsorption on the particle surface. This has not met success at least because additive manufacturing operators typically restrict presence of additives in the powder materials—fumed silica is typically considered an undesirable additive, which can generate inclusions which are extremely detrimental to mechanical properties in the consolidated part. Further, when inclusions are put into solution (e.g., by laser or electron-beam melting), the feedstock chemistry is altered. In view of the foregoing, this proposed solution to the flowability problem has not received market adoption.

In light of the above, there is a need to provide powders for use in additive manufacturing operations that alleviate at least in part the deficiencies of the existing powders.

SUMMARY

This Summary is provided to introduce a selection of concepts in a simplified form that are further described below in the Detailed Description. This Summary is not intended to identify key aspects or essential aspects of the claimed subject matter.

As embodied and broadly described herein, the present disclosure relates to an additive manufacturing powder, comprising spherical particles having a particle size distribution (PSD) of from about 0 micrometers (µm) to about 1000 µm and having a flowability of ≤20 s determined in accordance with ASTM B213 at 30% relative humidity.

As embodied and broadly described herein, the present disclosure relates to an additive manufacturing powder, comprising spherical particles having a particle size distribution (PSD) of from about 0 micrometers (μm) to about 1000 μm and having a measurable flowability determined in accordance with ASTM B213 at 75% relative humidity.

As embodied and broadly described herein, the present disclosure relates to an additive manufacturing powder, comprising spherical particles having a particle size distribution (PSD) of from about 0 micrometers (μm) to about 1000 μm and having a first flowability determined in accordance with ASTM B213 at 30% relative humidity and a second flowability determined in accordance with ASTM B213 at 75% relative humidity, wherein a ratio of the second flowability/first flowability is of at least 0.90.

As embodied and broadly described herein, the present disclosure relates to an additive manufacturing powder, comprising spherical particles having a particle size distribution (PSD) of from about 0 micrometers (μm) to about 1000 μm, the PSD including a fraction of fine particles having a size <20 μm in a quantity of up to 30 vol %, and the powder having a flowability of ≤40 s determined in accordance with ASTM B213 at 30% relative humidity.

As embodied and broadly described herein, the present disclosure relates to an additive manufacturing powder, comprising spherical particles having a particle size distribution (PSD) of from about 0 micrometers (μm) to about 1000 μm, the PSD including a fraction of fine particles having a size <20 μm in a quantity of 30 vol %, and the powder having a measurable flowability determined in accordance with ASTM B213 at 75% relative humidity.

As embodied and broadly described herein, the present disclosure relates to an additive manufacturing powder, comprising spherical particles having a particle size distribution (PSD) of from about 0 micrometers (μm) to about 1000 μm the PSD including a fraction of fine particles having a size <20 μm in a quantity of up to 30 vol %, and having a first flowability determined in accordance with ASTM B213 at 30% relative humidity and a second flowability determined in accordance with ASTM B213 at 75% relative humidity, wherein a ratio of the second flowability/first flowability is of at least 0.90.

As embodied and broadly described herein, the present disclosure relates to an additive manufacturing powder, comprising spherical particles having a particle size distribution (PSD) of from about 0 micrometers (μm) to about 1000 μm, wherein the particles have a molecule which decreases the hydrophilicity of the powder being attached to at least a portion of a surface of the particles, wherein the molecule which decreases the hydrophilicity of the powder is present in an amount of less than 800 ppm in the powder.

As embodied and broadly described herein, the present disclosure relates to an additive manufacturing powder, comprising spherical particles having a particle size distribution (PSD) of from about 0 micrometers (μm) to about 1000 μm and having an apparent density of ≥2.440 g/cm$^3$ determined in accordance with ASTM B212 at 30% relative humidity.

As embodied and broadly described herein, the present disclosure relates to an additive manufacturing powder, comprising spherical particles having a particle size distribution (PSD) of from about 0 micrometers (μm) to about 1000 μm and having an apparent density of ≥2.400 g/cm$^3$ determined in accordance with ASTM B212 at 75% relative humidity.

As embodied and broadly described herein, the present disclosure relates to an additive manufacturing powder, comprising spherical particles having a particle size distribution (PSD) of from about 0 micrometers (μm) to about 1000 μm and having a first apparent density determined in accordance with ASTM B212 at 30% relative humidity and a second apparent density determined in accordance with ASTM B212 at 75% relative humidity, wherein the second apparent density represents a loss of ≤2% relative to the first apparent density.

As embodied and broadly described herein, the present disclosure relates to a shipping container comprising an additive manufacturing powder including spherical particles having a particle size distribution (PSD) of from about 0 micrometers (μm) to about 1000 μm, wherein the shipping container comprises a top layer of the powder including a first D50 and a bottom layer of the powder including a second D50, wherein the first D50>the second D50.

As embodied and broadly described herein, the present disclosure relates to a shipping container comprising an additive manufacturing powder including spherical particles having a particle size distribution (PSD) of from about 0 micrometers (μm) to about 1000 μm, wherein the powder in the shipping container forms a stratification along a vertical axis thereof, the stratification comprising a plurality of zones, wherein a D50 powder dimension of a first zone of the plurality of zones is different from a D50 powder dimension of a second zone of the plurality of zones.

As embodied and broadly described herein, the present disclosure relates to an additively manufactured three-dimensional metal part, wherein the part includes a body having a surface perpendicular to a build plane of the part, the surface being characterized with Ra≤25 micrometer and/or Rz≤230 micrometer.

As embodied and broadly described herein, the present disclosure relates to an additively manufactured three-dimensional metal part, wherein the part includes a body having less than 5 ppm oxygen and having a microstructure which is at least 95% porosity-free.

As embodied and broadly described herein, the present disclosure relates to a process for obtaining an additive manufacturing powder, comprising providing a volume of spherical particles having a particle size distribution (PSD) of from about 0 micrometers (μm) to about 1000 μm, and attaching a molecule at the surface of the particles that reduces hydrophilicity of the particles to obtain the additive manufacturing powder, wherein the powder has a measurable flowability as determined with ASTM B213 at 75% relative humidity.

As embodied and broadly described herein, the present disclosure relates to a process for obtaining an additive manufacturing powder, comprising atomizing a feed material with plasma to obtain particles having a particle size distribution (PSD) of from about 0 micrometers (μm) to about 1000 μm, contacting the particles with a reactive gas including an agent and incorporating the agent on a surface of the particles, the agent reducing the hydrophilicity of the particles and the powder having a measurable flowability as determined with ASTM B213 at 75% relative humidity.

As embodied and broadly described herein, the present disclosure relates to a process for manufacturing a three-dimensional part, comprising providing a volume of plasma atomized spherical particles having a particle size distribution (PSD) of from about 0 micrometers (μm) to about 1000 μm, and attaching a molecule at the surface of the particles that reduces hydrophilicity of the particles to obtain the additive manufacturing powder, wherein the molecule which decreases the hydrophilicity of the powder is present in an amount of less than 800 ppm in the powder and wherein the powder has a measurable flowability as determined with ASTM B213 at 75% relative humidity.

As embodied and broadly described herein, the present disclosure relates to an apparatus for manufacturing a three-dimensional part, comprising a fusion bed for supporting the part during manufacturing, a powder delivery system for supplying successive quantities of powder to the fusion bed, a unit for generating an energy beam to form a layer of the part from a layer of the powder, and a drainage system for draining un-sintered powder from the fusion bed being configured for draining powder having a flowability of ≤20 s determined in accordance with ASTM B213 at 30% relative humidity.

As embodied and broadly described herein, the present disclosure relates to an apparatus for manufacturing a three-dimensional part, comprising a fusion bed for supporting the part during manufacturing, a powder delivery system for supplying successive quantities of powder to the fusion bed, a unit for generating an energy beam to form a layer of the part from a layer of powder, and a recoating member configured for travelling across the fusion bed at a speed of at least 250 mm/s to generate the layer of the powder.

As embodied and broadly described herein, the present disclosure relates to a three-dimensional part manufactured by additive manufacturing, the part having a geometry, the three-dimensional part comprising a metallic material, wherein the three-dimensional part has an ultimate strength; and a ratio of the ultimate strength of the three-dimensional metal part over an ultimate strength of a traditionally-manufactured part, the traditionally-manufactured part being distinct from the three-dimensional part, the traditionally-manufactured part having a geometry that is identical to the geometry of the three-dimensional part manufactured by additive manufacturing, the traditionally-manufactured part comprising a metallic material that is identical to the metallic material of the three-dimensional part manufactured by additive manufacturing, is at least 80%.

As embodied and broadly described herein, the present disclosure relates to a three-dimensional part manufactured by additive manufacturing, the three-dimensional part having a geometry, the three-dimensional part comprising a metallic microstructure which includes a metallic material, wherein a ratio of an ultimate strength of the metallic microstructure of the three-dimensional part over an ultimate strength of a bulk of the metallic material is at least 80%.

As embodied and broadly described herein, the present disclosure relates to a three-dimensional part manufactured by additive manufacturing, the three-dimensional part having a geometry, the three-dimensional part comprising a metallic microstructure which includes a metallic material, wherein a ratio of a maximal stress amplitude before failure after $10^6$ cycles of the metallic microstructure of the three-dimensional part over a maximal stress amplitude before failure after $10^6$ cycles of a bulk of the metallic material is at least 80%.

As embodied and broadly described herein, the present disclosure relates to a three-dimensional part manufactured by additive manufacturing, the three-dimensional part having a geometry, the three-dimensional part comprising a metallic microstructure which includes a metallic material, wherein a ratio of an elongation at failure of the metallic microstructure of the three-dimensional part over an elongation at failure of a bulk of the metallic material is at least 80%.

As embodied and broadly described herein, the present disclosure relates to a three-dimensional part manufactured by additive manufacturing, the three-dimensional part having a geometry, the three-dimensional part comprising a metallic microstructure which includes a metallic material, wherein a ratio of a toughness of the metallic microstructure of the three-dimensional part over a toughness of a bulk of the metallic material is at least 80%.

As embodied and broadly described herein, the present disclosure relates to a powder for additive manufacturing, the powder comprising powder particles, the powder particles comprising a metallic material having a density, the powder having a particle size distribution (PSD) of from about 0 micrometers (μm) to about 1000 μm, the powder having an apparent density, wherein a ratio of the apparent density of the powder over the minimum density of the metallic material is at least 57.5%.

As embodied and broadly described herein, the present disclosure relates to a one-piece, integrally formed metallic component, made by powder bed fusion additive manufacturing process using a laser as a source of thermal energy to heat and melt selected areas of a bed of metallic powder to build the metallic component in successive layers, the metallic component comprising an internal cavity including side walls and the internal cavity being in fluid communication through a channel with the outside of the metallic component, the side walls having portions configured such that the portions are unreachable by a machining tool thus precluding surface finishing of the portions with the machining tool through a subtractive process from outside the metallic component, the portions having a surface finish being characterized with Ra<D90 of the metallic powder.

As embodied and broadly described herein, the present disclosure relates to a one-piece, integrally formed metallic component, made by powder bed fusion additive manufacturing process using a laser as a source of thermal energy to heat and melt selected areas of a bed of metallic powder to build the metallic component in successive layers. The metallic component comprises a surface having an in-built surface finish being characterized with Ra<D90 of the metallic powder.

All features of exemplary embodiments which are described in this disclosure and are not mutually exclusive can be combined with one another. Elements of one embodiment can be utilized in the other embodiments without further mention. Other aspects and features of the present invention will become apparent to those ordinarily skilled in the art upon review of the following description of specific embodiments in conjunction with the accompanying figures.

BRIEF DESCRIPTION OF THE DRAWINGS

A detailed description of specific exemplary embodiments is provided herein below with reference to the accompanying drawings in which:

FIGS. 32A to 32D show surface details of additively manufactured parts manufactured with a surface-modified powder, in accordance with an embodiment of the present disclosure;

FIGS. 32E to 32H show surface details of additively manufactured parts manufactured with a comparative prior art powder;

FIGS. 65 to 68 show an example of a processing apparatus of the additive manufacturing apparatus, in accordance with an embodiment of the present disclosure;

Figure 1:
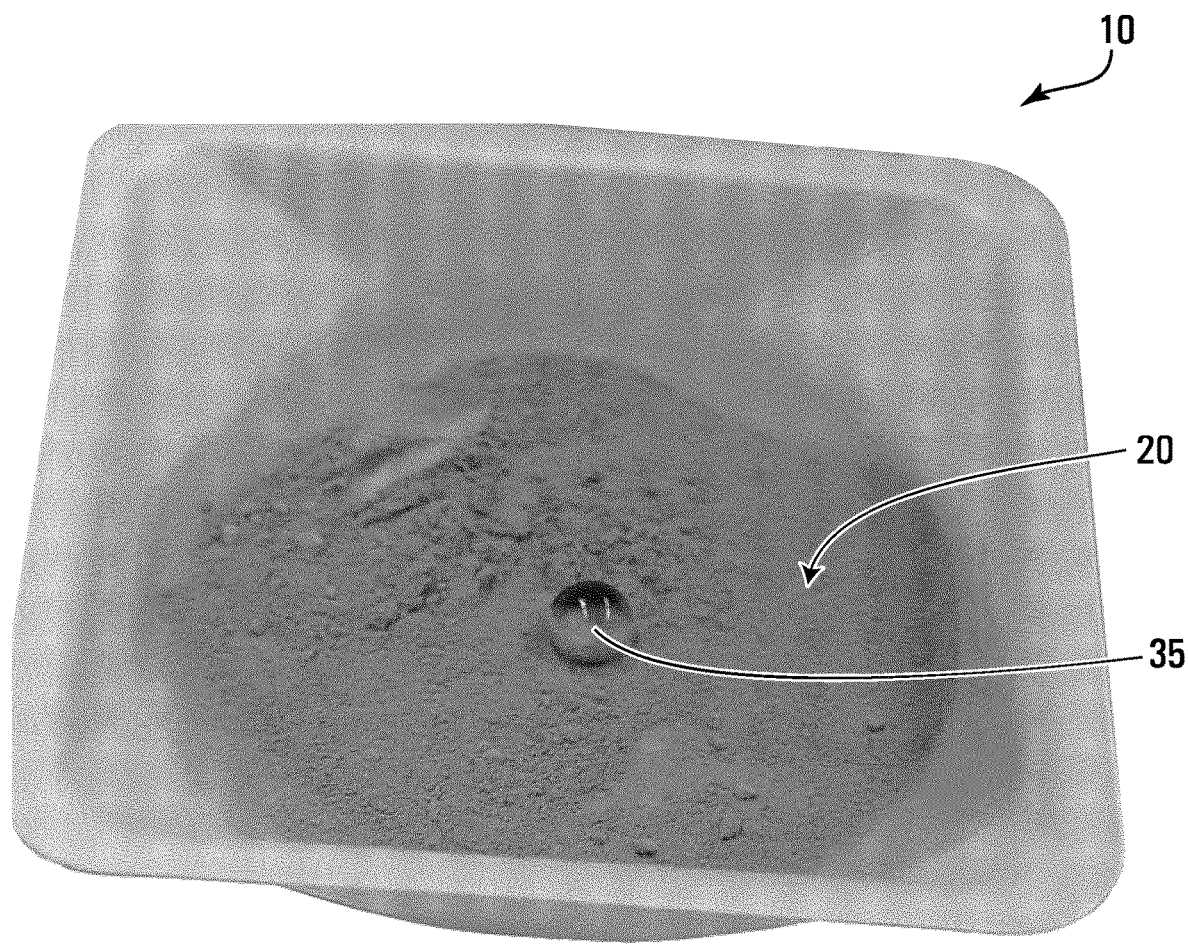
FIG. 1 shows a non-limiting picture of a water droplet upon contact with a powder treated as per Example 3, in accordance with an embodiment of the present disclosure.

In the drawings, exemplary embodiments are illustrated by way of example. It is to be expressly understood that the description and drawings are only for the purpose of illustrating certain embodiments and are an aid for understanding. They are not intended to be a definition of the limits of the invention.

DETAILED DESCRIPTION

A detailed description of one or more embodiments of the invention is provided below along with accompanying figures that illustrate the principles of the invention. The invention is described in connection with such embodiments, but the invention is not limited to any embodiment. The scope of the invention is limited only by the claims. Numerous specific details are set forth in the following description in order to provide a thorough understanding of the invention. These details are provided for the purpose of non-limiting examples and the invention may be practiced according to the claims without some or all of these specific details. For the sake of clarity, technical material that is known in the technical fields related to the invention has not been described in detail so that the invention is not unnecessarily obscured.

Additive manufacturing processes are typically operated with "fixed" parameters for a specific application, with current machines offering little opportunity for any form of responsive control. This means that inconsistent input material properties will translate directly into inconsistent finished parts properties. Poor powder quality can produce defects in the end part including pores, cracks, inclusions, residual stresses and suboptimal surface roughness, as well as compromising throughput. Understanding the correlations between material properties, processing performance and end component properties is therefore important, both to select the best powder for an application and to ensure the consistency of that powder, i.e., from build-to-build and layer-to-layer, as well as through recycling. Chemistry and physical characteristics of a metal powder are generally understood to define additive manufacturing performance.

In terms of chemistry, a powder needs to comply with the alloy composition of the material specified, and grade must be carefully selected to control the interstitial elements present, such as oxygen or nitrogen, which can impact the properties of the finished part. In addition, powders must be free from foreign particulate contamination, such as from other material batches at the powder production plant or the manufacturing facility, or debris in processing/recycling equipment. Contaminant levels of just a few parts per million can be significant in terms of component quality.

Beyond chemistry, the physical characteristics of a metal powder, such as bulk properties of the powder and properties of the individual metal particles, have an impact on the additive manufacturing process. Key bulk properties are packing density and flowability. Powders that pack consistently well to give a high density are associated with the production of components with fewer flaws and consistent quality. Flowability, on the other hand, is arguably more closely associated with process efficiency. The ability to spread evenly and smoothly across a bed, and to form a uniform layer with no air voids is essential for powder-bed fusion processes, for example, while consistent flowability under very different conditions, as an aerated powder stream, is required for directed energy deposition. These requirements intensify as processing speeds are increased.

Both bulk density and flowability are directly, though not exclusively, influenced by particle size and shape. The range of particle characteristics known to influence flowability, for example, includes stiffness, porosity, surface texture, density and electrostatic charge. Generally speaking, smooth, regular-shaped particles flow more easily than those with a rough surface and/or irregular shape. Rougher surfaces result in increased interparticular friction while irregularly shaped particles are more prone to mechanical interlocking; both of these effects decrease flowability.

Similarly, spherical particles tend to pack more efficiently than those that are irregular giving rise to higher bulk densities. The bulk powder property requirements for AM therefore suggest that sphericity is likely to be highly prized, a conclusion widely recognized within the industry.

When it comes to particle size, metal powders for additive manufacturing have particles that are typically of sizes within the micrometer sizes, for example, to meet the requirement to form a powder bed just tens of microns thick. However, smaller size particle powders can be problematic from a health and safety perspective, and in terms of flowability. Because the forces of attraction between particles increase with decreasing particle size, smaller size powders are usually less free flowing than coarser analogues.

The present inventors have through extensive R&D work surprisingly and unexpectedly developed powders for use in additive manufacturing having improved physical characteristics relative to comparative prior art powders.

For example, these improved characteristics include bulk properties of the powder and properties of the individual metal particles.

In some embodiments, the improved physical characteristics of the powders of the present disclosure include an improved static flowability as measured with a Hall flowmeter (e.g., ASTM B213) and/or an improved dynamic flowability as measured with a revolution powder analyzer (RPA) (e.g., "avalanche angle").

In some embodiments, the improved physical characteristics of the powders of the present disclosure afford more tolerance to the presence of fine particles having a size of <20 micrometer in the powder particle size distribution (PSD). In other words, it is generally understood that powders for use in additive manufacturing can tolerate fine particles in their PSD up to a certain threshold beyond which, the powder characteristics will deteriorate. For example, at levels of 10% vol % a comparative powder of the prior art will typically exhibit significant disadvantages, such as reduced flowability; the chemical composition relative to BET will be too concentrated, which causes artifacts when used in 3D laser printing; when the powder is poured, fine particles create a cloud that clogs the filters inside the additive manufacturing machine and results in laser attenuation; fine particles increase surface-to-volume ratio which will in turn increase oxygen uptake, which oxygen uptake could have adverse effects on mechanical properties such as fatigue resistance or elongation of the part. In contrast, powders of the present disclosure will show some tolerance to fine particles having a size of <20 micrometer in levels of up to 30 vol % fines particles in their PSD and will not exhibit at least some of the above disadvantages.

In some embodiments, the improved physical characteristics of the powders of the present disclosure are less sensitive (and in some cases, are insensitive) to ambient humidity (often described using relative humidity or RH %) or humidity exposure history. In other words, while physical characteristics (e.g., flowability, apparent density) of comparative prior art powders for use in additive manufacturing will typically deteriorate in higher ambient humidity levels, in contrast, the powders of the present disclosure will typically remain the same in higher ambient humidity levels. Advantageously, powders of the present disclosure will thus have substantially the same improved physical characteristics at low and high levels of relative humidity (e.g., at any RH % in the range of from 10 RH % to 75 RH %, e.g., at 10 RH % and at 75 RH %, or at 30 RH % and 75 RH %).

In some embodiments, the powders of the present disclosure depict improved properties in the molten state (during additive manufacturing), such as the wettability characteristics. For example, by modifying the surface chemistry of the powders, the wettability of the powder particles after melting may be altered and preferably lowered. A lower wettability characteristic may minimize the spreading of the molten material phase which can be observed in comparative prior art powders upon melting following exposure to the additive manufacturing laser. In other words, the powders of the present disclosure will afford confining the melt pool to the energy deposition region. In some embodiments, such improved wettability characteristic improves the resolution and surface finish of the 3D part by providing finer control over the width of the melt pool. In other words, a smaller melt pool will produce a finer granularity part. In another example, the altered wettability of the powder may prevent the inclusions of non-melted powder particles in the solidifying melt pool. Generally speaking, an important component of the surface roughness of parts obtained through powder based additive manufacturing is attributable to welded, un-melted powder particles attached to the part surface. In some embodiments, it is believed that this change in the wettability of the powder changes the surface tension between the melted pool and the surface of the un-melted particle, adjacent the melt pool, resulting in a higher angle of contact between the melt and the un-melted particles, which limits expansion of the metal pool and also reduces the attachment of the un-melted particles to the metal pool, as the later solidifies, thus yielding parts with improved surface finish.

In some embodiments, the powders of the present disclosure afford more flexibility in terms of recycling during the additive manufacturing process. For example, it has been observed that the powders of the present disclosure substantially retain at least some of the improved physical characteristics after being used in an additive manufacturing process. This powder property allows some flexibility and predictability in recycling powders for a number of iterations which can be increased relative to comparative prior art powders and/or in mixing recycled powders with fresh powders such that the resulting mixture still has the herein described improved flowability albeit with possibly hybrid behavior (e.g., in flowability, tap density, and the like).

In some embodiments, the improved physical characteristics of the powders of the present disclosure afford more flexibility in terms of packaging the powders in containers, which can simplify the packaging process and/or reduce costs. Powders for use in additive manufacturing are typically packaged in packages such as drums, pails, jars, and the like. In some embodiments, since the powders of the present disclosure exhibit increased flowability relative to comparative powders of the prior art, the packaging processing time can be reduced due to the facilitated pourability of the powders. In some embodiments, since the powders of the present disclosure are less sensitive to high RH %, these powders can be packaged in containers without the need to include therein package desiccants (e.g., pouches with AlSiMg therein), which eliminates this potential contamination source (e.g., desiccants leaking out from pouches during transport/storage). In some embodiments, since the powders of the present disclosure are less sensitive to RH % history exposure, these powders can be packaged in containers under air (dry or with a relative humidity of up to 75%) or nitrogen instead of argon (as is done with comparative prior art powders), which reduces contraction problem of packages seen with the use of argon, reduces costs associated with the use of argon and can simplify the packaging process.

In some embodiments, the improved physical characteristics of the powders of the present disclosure afford an improved sieving efficiency relative to comparative prior art powders. For example, such improved sieving efficiency can reduce sieving processing time, thus increasing the amount of powders processed by period (kg/h)—which can occur with fresh powders and/or during recycling. For example, such improved sieving efficiency can increase yield and apparent density of powders, allowing the use of powders at 15 μm instead of at 20 μm (e.g., Ti64 or AlSiMg).

In some embodiments, the powders of the present disclosure have an increased batch-to-batch consistency/stability in respect of expected performance during additive manufacturing relative to comparative prior art powders. For example, it has been observed that, at least due to possibly the increased flowability, and in particular the increased flowability which is less sensitive to ambient humidity, at least some of the herein described improved physical characteristics reduce variances in product performance that are typically associated with poor apparent density and/or poor flowability of the powder. This may translate to a better process control when operating the powder in additive manufacturing, generally resulting in fewer defects and failures in the end-product.

In some embodiments, improvements in additive manufacturing powders may have an impact on subsequent operations of the additive manufacturing procedure (e.g., cleaning, machining, etc.) and will likely improve the process reliability. Accordingly, confidence levels on manufactured parts may increase thus enabling applications where standards are too stringent for the actual state of the art. Also, since the cost of powder feedstock is the most important expense over the lifecycle of an additive manufacturing machine, costs will be reduced significantly.

For example, it has also been observed that the use of the herein described powder may result in less time required for cleaning up the finished part compared to when using comparative powders of the prior art. Typically, when using prior art powders, it is more difficult to remove un-sintered powders from the part as they do not flow away freely, thus requiring extensive and time-consuming cleaning procedures to rid the finished part from such un-sintered powder. Further, powder removal may be difficult for a large part due to the size and weight. The print bed containing both a printed part and un-sintered powder may weigh thousands of kilograms or more and may be difficult to handle. The person of skill will readily understand that a powder which is more fluid-like, such as the powder of the present disclosure, will more easily fall off the part when the operator retrieves the finished part from the powder bed, thus, resulting in a shortened cleaning procedure for the finished part and overall increasing productivity.

Further, the present inventors have discovered that using the herein described powder in conventional 3D printing apparatuses (additive manufacturing apparatuses) results in an improved performance of at least a number of such apparatuses in terms, e.g., of energy efficiency, part quality output, processing time, and the like. For example, it has been observed that the use of the herein described powder may result in a manufactured part (also referred-to as "end-product" herein) which has a better surface finish, with less rugosities, cracks or pores compared to when using a comparative prior art powder. For example, it has also been observed that the use of the herein described powder may result in an apparatus which can be operated at faster speeds—for instance, one can operate the recoating element at a faster speed than what is possible with a comparative prior art powder, thus reducing overall time required for manufacturing a part.

Characteristics of the Powder

Figure 2:
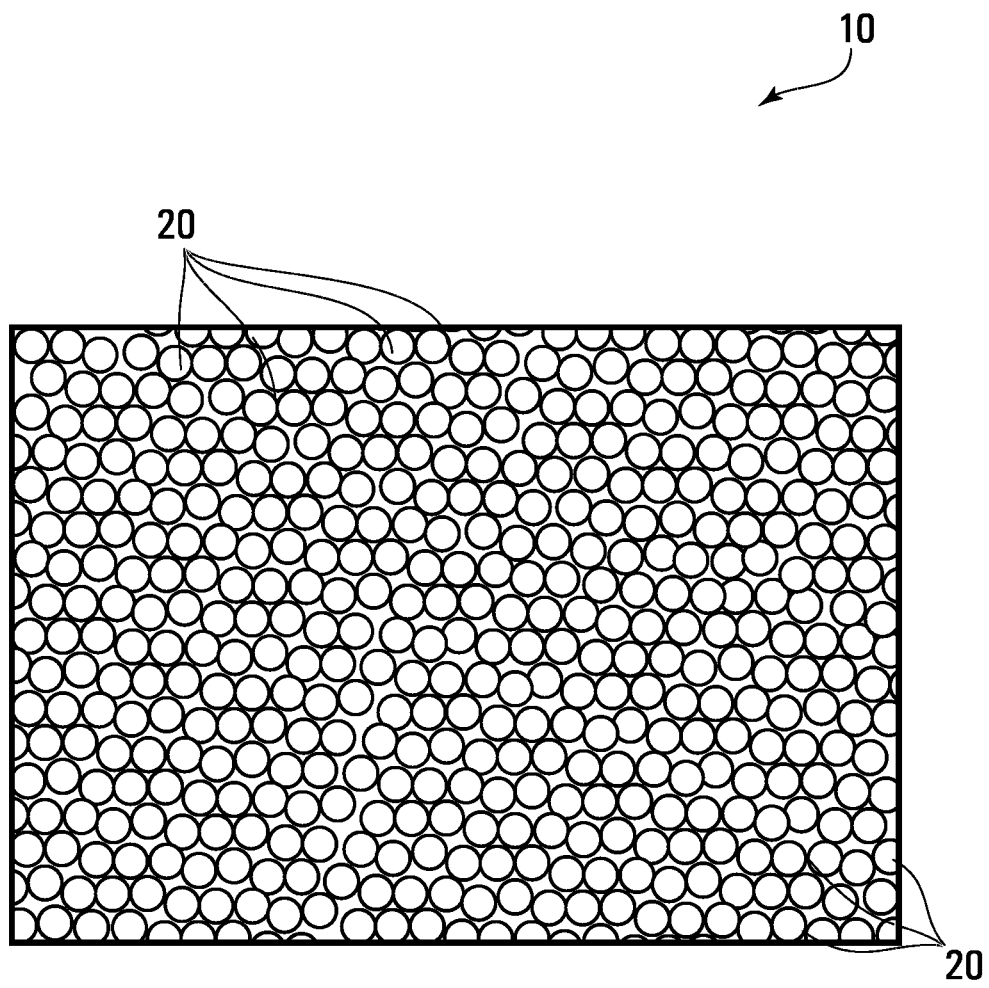
FIG. 2 shows a scanning electronic microscope image of a powder, in accordance with an embodiment of the present disclosure.

FIG. 1 shows a picture of a powder 10 that includes substantially spherical particles 20 in accordance with an embodiment of the present disclosure. FIG. 2 further shows an illustration of the powder 10 and particles 20 embodiment of FIG. 1.

As discussed previously, the herein described powders exhibit improved physical characteristics relative to comparative prior art powders. These characteristics can be measured using standard tests (e.g., ASTM) and/or which are discussed in the present text.

In some embodiments, a powder 10 of the present disclosure may have a flowability characteristic which is measurable with a Hall Flowmeter funnel (static flowability) according to standardized testing procedures (i.e., without being shaken), such as ASTM B213, or with an RPA (dynamic flowability), such as the GranuDrum™ (Granutools, Belgium), which is improved relative to that one of comparative prior art powders. For example, it has been observed by the present inventors that an illustrative embodiment of the powder 10 (AlSi7Mg) has an avalanche angle of 31 degrees whereas a comparative prior art powder (AlSi7Mg) has an avalanche angle of 42 degrees.

In some embodiments, this increased flowability characteristic may be less sensitive (or in some cases, insensitive) to presence of fine particles in the powder particle size distribution (PSD) relative to comparative prior art powders.

In some embodiments, this increased flowability characteristic may be less sensitive (or in some cases, insensitive) to ambient humidity (RH %) and/or powder's humidity history exposure relative to comparative prior art powders.

For example, a powder 10 of the present disclosure may have a flowability which is measurable with a Hall Flowmeter funnel according to ASTM B213 under conditions of at least 75% relative humidity (RH %). This is unexpected and surprising since comparative prior art powders which are typically used in the art of additive manufacturing will usually stop flowing in a Hall Flowmeter funnel test at much lower RH % levels, for example at values as low as 30 RH % (see FIG. 7—atomized powders, which are typically used in additive manufacturing).

Figure 9:
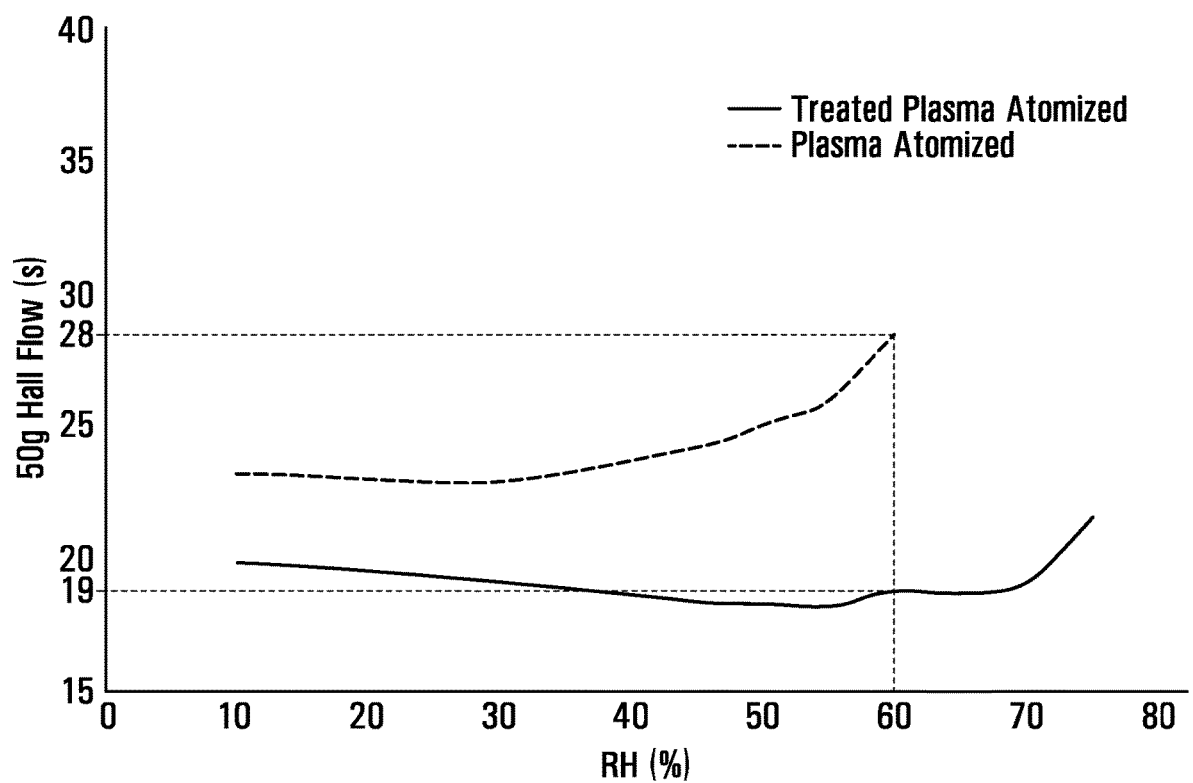
FIG. 9 shows a non-limiting graph of a comparison between flowability of comparative prior art powder ("pristine") and flowability of surface-modified powder (53/20) as a function of relative humidity (RH %), in accordance with an embodiment of the present disclosure.

For example, a powder 10 of the present disclosure may have a flowability which is increased compared to comparative prior art powders, where the increased flowability is measurable at both lower ambient humidity (e.g., 10 RH %) and higher ambient humidity (e.g., 75 RH %). For example, FIG. 9 shows that an embodiment of powder 10 has a faster profile at all tested ambient humidity conditions relative to a comparative prior art powder (also referred-to in this text as "untreated powder", "pristine powder", "raw powder", etc.).

In some embodiments, the herein described increased resistance to ambient humidity can be quantified by determining the maximum RH % at which point an embodiment of the powder 10 of the present disclosure still flows in a Hall Flowmeter funnel test as per ASTM B213 compared to a comparative prior art powder. For instance, in some embodiments, the powder 10 described herein can still flow at a maximum RH % which is at least 5 RH % higher, or which is least 10 RH % higher, or which is at least 15 RH % higher, or even more, than that of a comparative prior art powder. In some embodiments, the powder 10 flows in the Hall Flowmeter funnel test as per ASTM B213 in a RH % of at least 80%, in some embodiments of at least 90%, in some embodiments of at least 95%, and in some embodiments the powder 10 flows regardless of the RH % (e.g., the powder 10 still flows in the Hall Flowmeter funnel test as per ASTM B213 in a RH % of 100%).

In some embodiments, the herein described increased resistance to ambient humidity can be quantified by determining a ratio of the maximum ambient humidity at which an embodiment of the powder 10 of the present disclosure still flows in a Hall Flowmeter funnel test as per ASTM B213 compared to that one of where the comparative prior art powder stops flowing (powder 10/comparative powder). For instance, in some embodiments, the ratio is of at least 1.05, or of at least 1.10, or of at least 1.15, or of at least 1.20, or of at least 1.25, or even more.

In some embodiments, the herein described increased flowability can be quantified by determining the duration to complete a Hall Flowmeter funnel test (number of seconds) for an embodiment of the powder 10 of the present disclosure compared to the duration required for the comparative prior art powder. For instance, in some embodiments, an embodiment of the powder 10 of the present disclosure will complete the Hall Flowmeter funnel test in a time duration shorter relative to the prior art powder that is of at least 1 second shorter, or at least 3 seconds shorter, or at least 5 seconds shorter, or at least 7 seconds shorter, or at least 9 seconds shorter, or even more.

In some embodiments, the herein described increased flowability can be quantified by determining a ratio of the duration required to complete the Hall Flowmeter funnel test (number of seconds) for an embodiment of the powder 10 of the present disclosure compared to the duration for the comparative prior art powder at high RH % (e.g., >50 RH %). For instance, in some embodiments, an embodiment of the powder 10 will have a Hall Flowmeter funnel test duration ratio compared to the comparative prior art powder at high RH % of less than 0.95 (powder 10/comparative powder), or of less than 0.90, or of less than 0.85, or of less than 0.80, or of less than 0.75, or of less than 0.70, or of even less.

In some embodiments, a powder 10 of the present disclosure may have an apparent density (also referred-to as "tap density") tested according to standardized testing procedures, such as ASTM B212, which is improved relative to that one of a comparative prior art powder.

In some embodiments, the herein described improved relative apparent density may also be less sensitive (or in some cases, insensitive) to ambient humidity (RH %) and/or powder's humidity history exposure.

In some embodiments, a powder 10 may have an apparent density which is increased relative to comparative prior art powders whether at conditions which are at lower ambient humidity (e.g., 10% RH) or higher ambient humidity (e.g., 75% RH). For example, the present inventors have observed that embodiments of the powder 10 typically have an increase in apparent density (g/cm$^3$) of at least 3% relative to the apparent density of the comparative prior art powder at the same ambient humidity (RH %).

Figure 10:
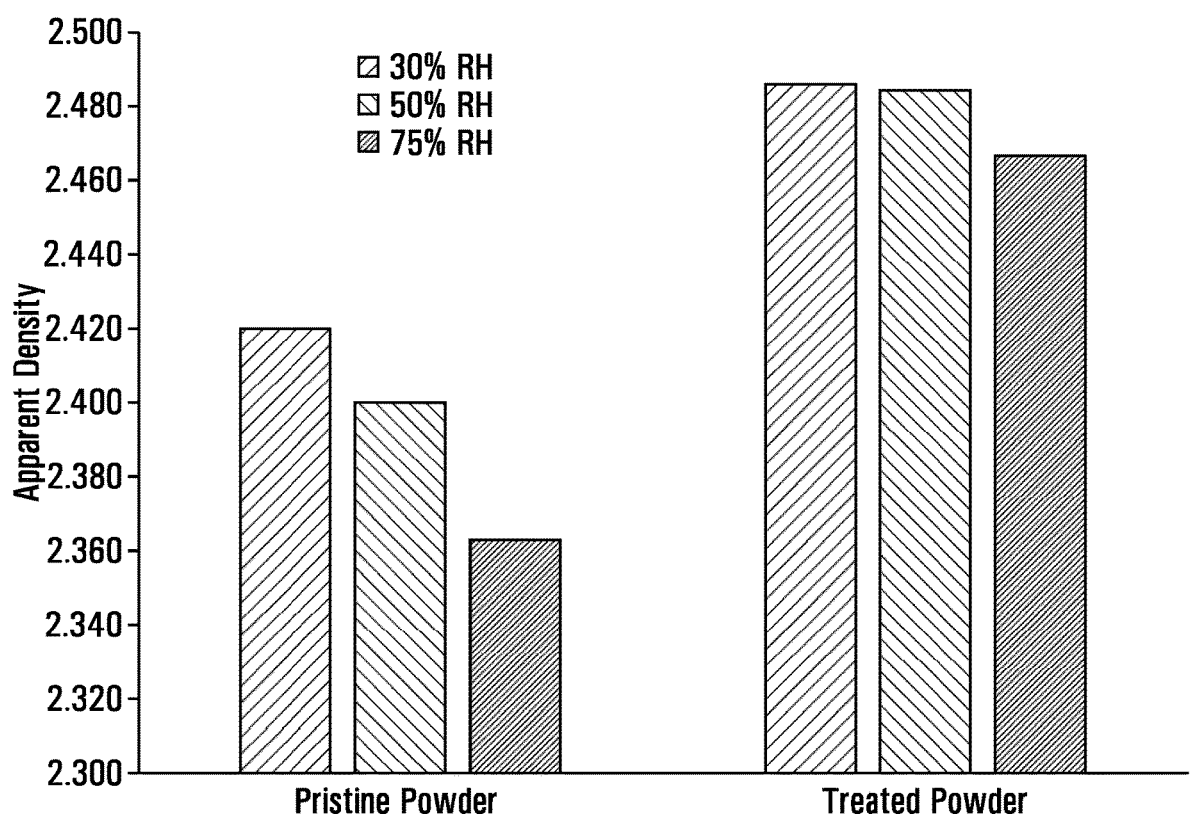
FIG. 10 shows a non-limiting graph of a comparison between apparent density of comparative prior art powder ("pristine") and apparent density of surface-modified powder at different RH (%), in accordance with an embodiment of the present disclosure.

For example, FIG. 10 illustrates the apparent density of an embodiment of the powder 10 (labeled "treated powder") at different ambient humidity values alongside an apparent density of the comparative prior art powder (labeled as "pristine powder") as measured with ASTM B212. In FIG. 10, the embodiment of the powder 10 is a surface modified Ti-6Al-4Va powder (Ti64, Tekna Plasma Systems, Inc.) obtained as per Example 7. At 30% RH, the comparative prior art powder has an apparent density of 2.420 g/cm$^3$ whereas this embodiment of the powder 10 has an apparent density value of about 2.490 g/cm$^3$, representing an about 3% increase in apparent density. At 50% RH, the comparative prior art powder has an apparent density of ≥2.400 g/cm$^3$ whereas this embodiment of the powder 10 has an apparent density value of about 2.480 g/cm$^3$, again representing an increase of about 3%. At 75% RH, the comparative prior art powder has an apparent density of 2.360 g/cm$^3$ whereas this embodiment of the powder 10 has an apparent density value of about 2.470 g/cm$^3$, representing an increase of about 4.45%.

In other words, at a given relative humidity, a powder 10 of the present disclosure will have an increase in apparent density relative to a comparative prior art powder.

FIG. 10 also shows that the comparative prior art powder apparent density is more sensitive to increases in ambient humidity levels. It underwent a decrease in apparent density from 2.420 g/cm$^3$ at 30% RH to 2.360 g/cm$^3$ at 75% RH, which represents a loss in apparent density of about 2.5% as a function of relative ambient humidity. In contrast, this embodiment of the powder 10 has an apparent density that is less sensitive to increases in ambient humidity levels going from 2.490 g/cm$^3$ at 30% RH to 2.470 g/cm$^3$ at 75% RH, which represents a loss in apparent density of only 0.8% as a function of relative ambient humidity.

In some embodiments, the apparent density of the powder 10 of the present disclosure will be less sensitive to an increase in ambient humidity, for example, to an increase from 30% to 75% RH, which can be determined in accordance with ASTM B212. For example, when submitted to such an increase in RH %, the apparent density of the powder 10 may be greater than the apparent density of the comparative prior art powder by at least 0.01 g/cm$^3$, or at least 0.04 g/cm$^3$, or at least 0.06 g/cm$^3$, or at least 0.08 g/cm$^3$, or at least 0.10 g/cm$^3$, or even more. For example, when submitted to such an increase in RH %, the apparent density of the powder 10 may vary by no more than 0.06 g/cm$^3$, or no more than 0.04 g/cm$^3$, or no more than 0.02 g/cm$^3$, or by even less.

Figure 46:
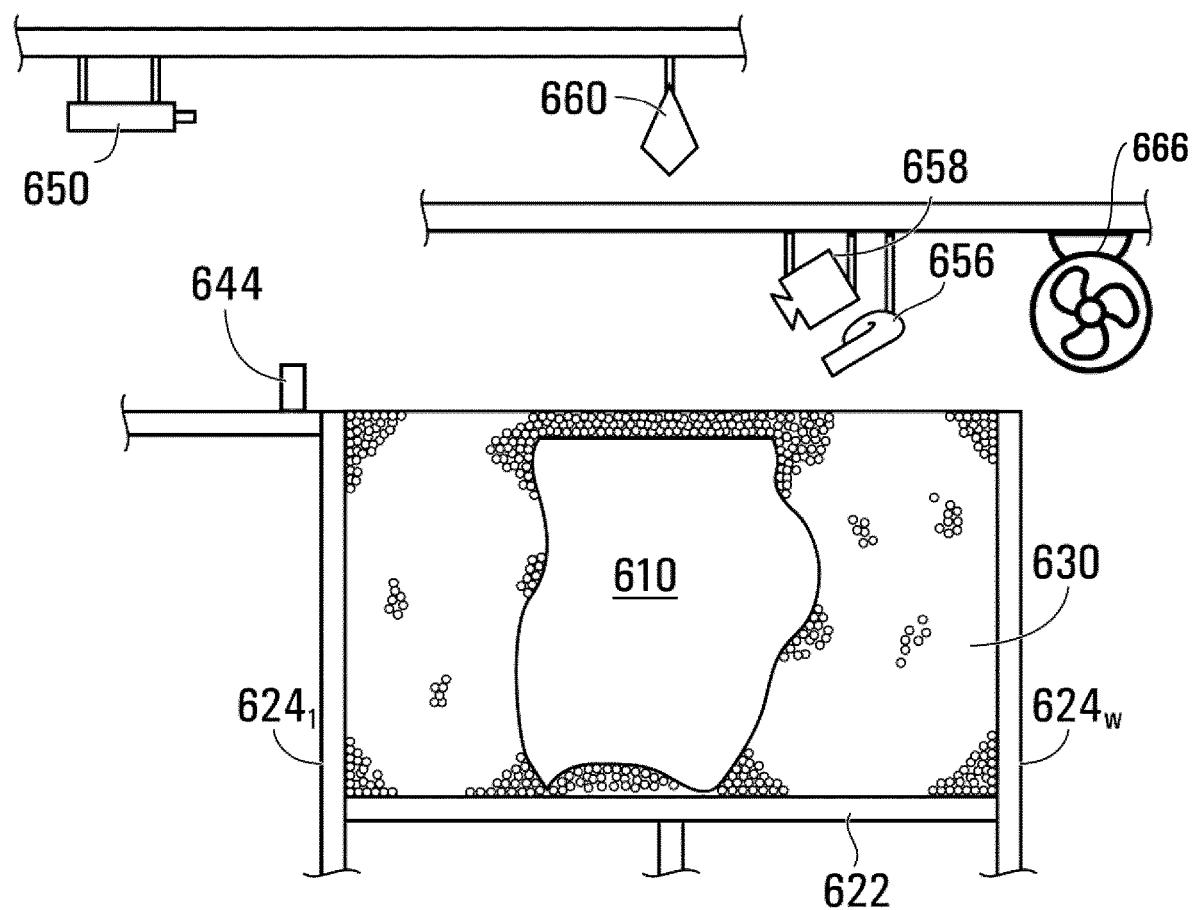
Figure 47:
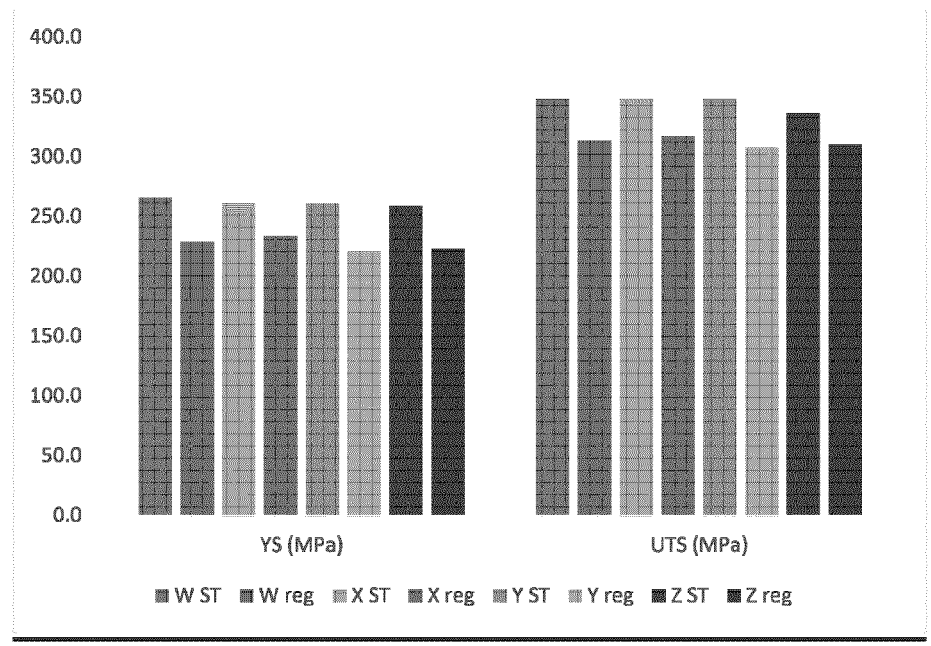
FIG. 47 shows yield strength ("YS") and ultimate strength ("UTS") along X, Y and Z axes of two additively-manufactured parts including one additively-manufactured part manufactured with a surface-modified powder in accordance with an embodiment of the present disclosure (labeled "ST") and one additively-manufactured part manufactured with a prior-art powder with identical parameters (labeled "reg")
Figure 48:
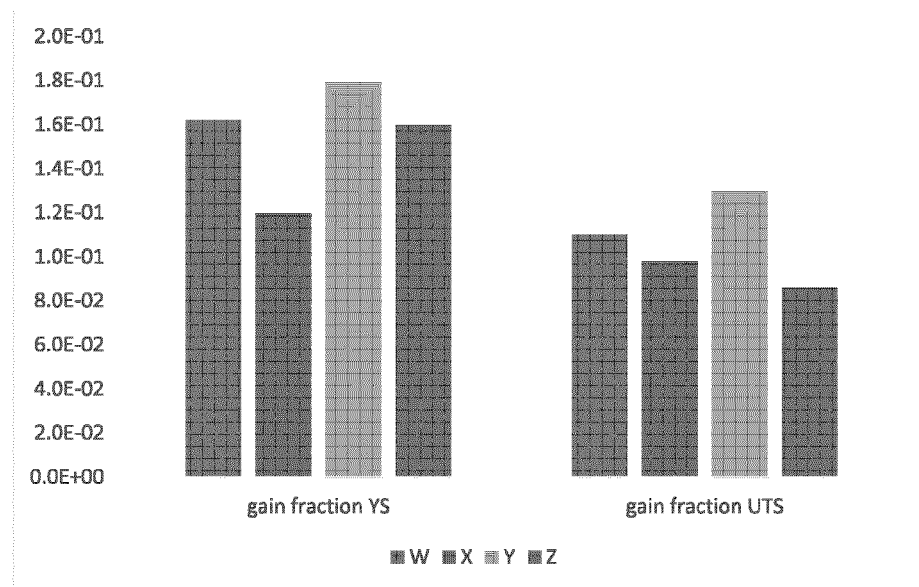
FIG. 48 shows yield strength ("YS") and ultimate strength ("UTS") gains calculated from the results obtained in FIG. 47.

In general, the herein described relative increase in the apparent density of the powder 10 may allow the manufacture of a 3D object having a higher degree of compactness, a better surface-finish, and enhanced mechanical properties such as ultimate tensile strength (UTS or Rm), elongation at break (A %) and resistance to fatigue (description of the test and the values to be measured are given, e.g., in the standard EN ISO 6892-1:2009). This can be observed in FIGS. 46A and 46B, which show surface details of additive manufacturing parts manufactured with a surface-modified embodiment of the powder 10 and in FIGS. 46A and 46B, which show the effect on the mechanical properties of the printed parts. The better surface-finish can be observed when comparing with additive manufacturing parts manufactured with a comparative prior art powder, as shown in FIGS. 32E to 32H.

In some embodiments, a powder 10 of the present disclosure may display altered wettability characteristics relative to comparative prior art powders.

Figure 35:
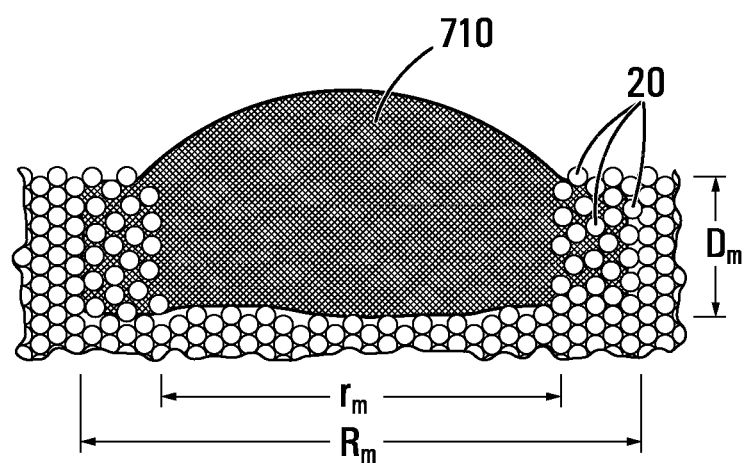

For example, by modifying surface chemistry of the powder 10, the wettability of the powder particles 20 after melting may be altered and lowered. A lower wettability may minimize spreading of a molten material of a melt pool 710 created by the melting action of the laser on powder particles 20 by capillary forces which confines the melt pool to the energy deposition region. By doing so, finer features can be obtained as the width of the melt pool is reduced. Thus, with additional reference to FIG. 35, the resolution of the 3D process may be enhanced and energy losses may be reduced. For instance, in some embodiments, for a melt pool 710 having a radius $R_M$ of 200 µm and a depth $D_M$ of 200 µm, a radius $R_M$ of the molten material spread by capillary forces may be no more than 600 µm, in some embodiments no more than 400 µm, in some embodiments no more than 300 µm, and in some embodiments even less (e.g., no more than 250 µm).

In some embodiments, the altered wettability of the powder particles 20 may prevent the inclusions of non-melted powder particles in the solidifying melt pool. Generally speaking, an important component of the surface roughness of parts obtained through powder based additive manufacturing is attributable to welded, un-melted powder particles attached to the part surface. The herein described change in the wettability of the powder 10 by the metal allows for a high angle of contact between the melt and the cold metal particles, which prevents their inclusion at the surface and thus yields parts with improved surface finish.

Figure 33:
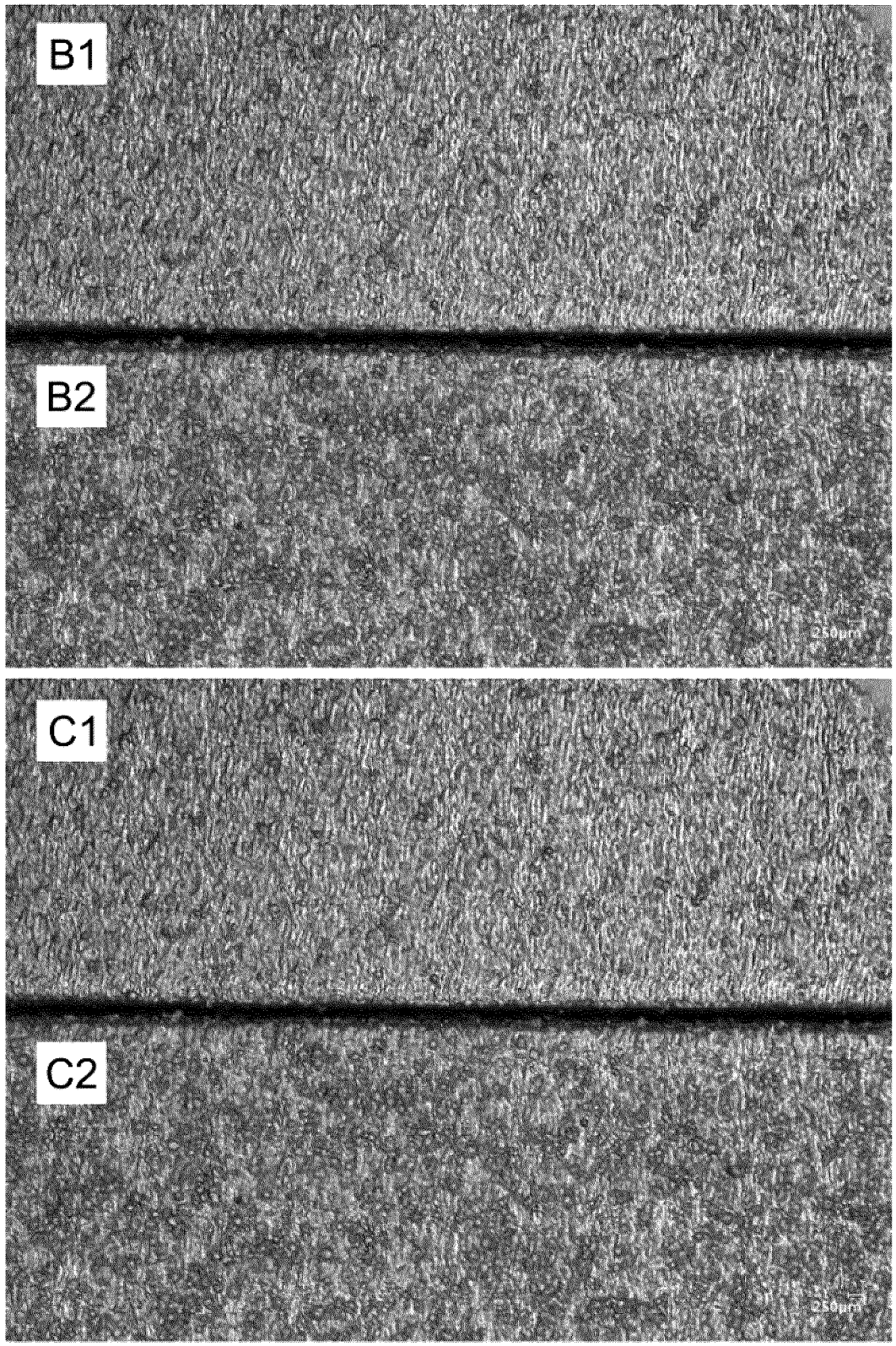
FIG. 33 shows examples of the improvement in surface finish after the additive manufacturing process. B1 and B2 are treated AlSi7Mg and AlSi10Mg, respectively. B2 and C2 are the same powders before treatment.
Figure 34:
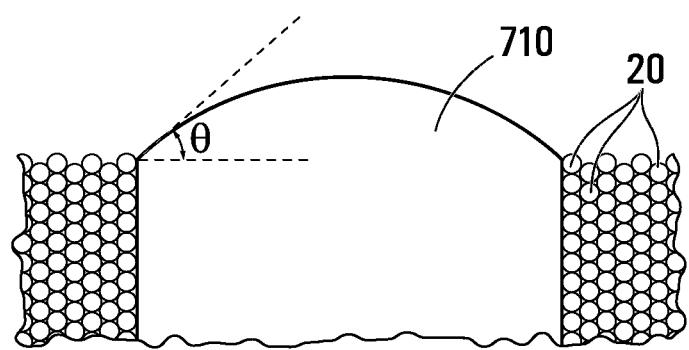
FIGS. 34 and 35 show a melt pool comprising molten material of the powder.

This effect on the surface finish is shown in FIG. 33 where the surface of parts made with a laser powder bed fusion process with powders of AlSi7Mg and AlSi10Mg are compared. The letter "B" depicts AlSi7Mg and "C" AlSi10Mg, and the letter labeled "1" indicates that this process used a powder 10 as described herein whereas the letter labeled with "2" indicates that this process used a comparative powder of the prior art.

In some embodiments, a powder 10 of the present disclosure may have an improved sieving efficiency as tested according to standardized testing procedures (e.g., such as with a stack of ASTM E11 mesh sieves 230, 450, 500 and 625), which is improved relative to that one of a comparative prior art powder.

In some embodiments, the herein described improved relative sieving efficiency may also be less sensitive (or in some cases, insensitive) to ambient humidity (RH %) and/or the powder's humidity history exposure.

Figure 11:
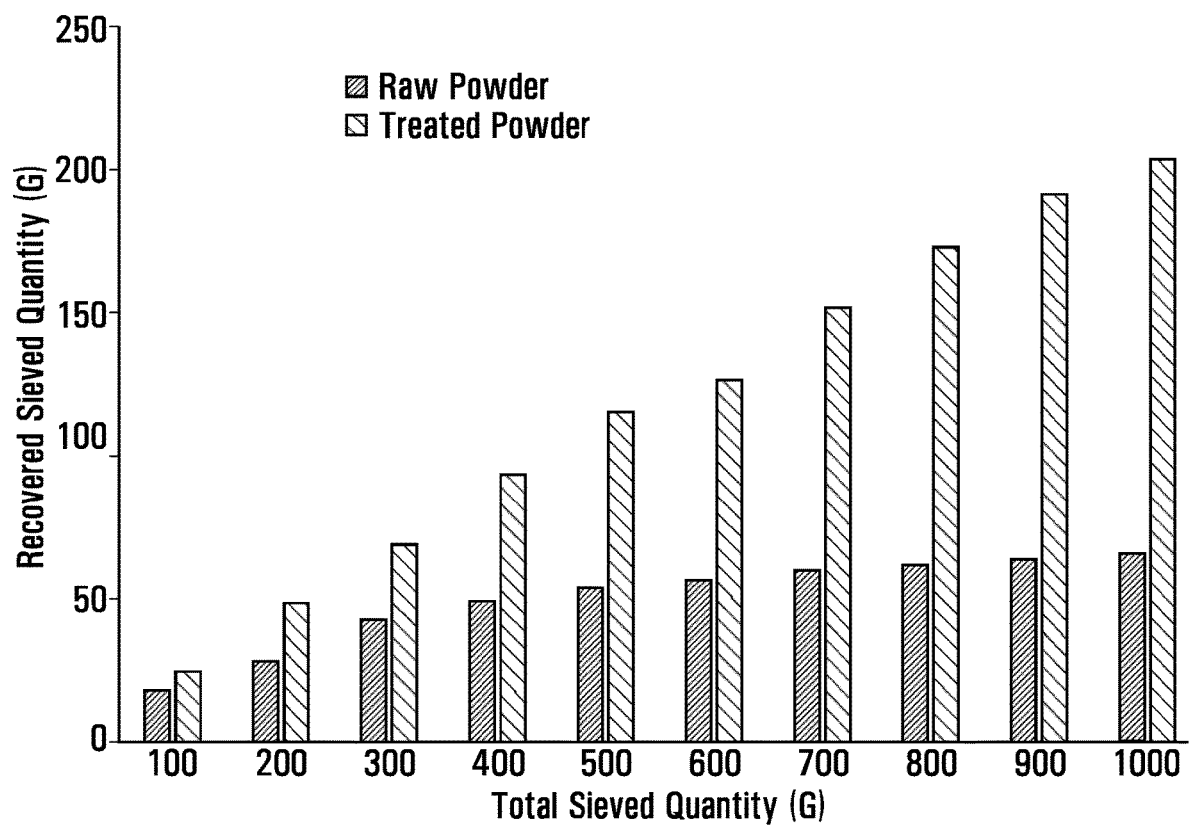
FIG. 11 shows a non-limiting graph of a comparison of behavior of comparative prior art powder ("raw") and surface-modified powder in a sieving assay, in accordance with an embodiment of the present disclosure.

FIG. 11 illustrates the results of a sieving efficiency test using an embodiment of powder 10, where the result is reported as the quantity of particles having a size of less than 20 µm collected in the last stage of the sieve stack as a function of the total quantity of powder initially used. In this test, the embodiment of powder 10 is the AlSi10Mg powder obtained as per Example 8 and the comparative prior art powder is prior art non-processed AlSi10Mg powder (Tekna Plasma Systems, Inc.). FIG. 11 shows recovery of less powder with the comparative prior art powder and this decrease in collected powder is further exacerbated when higher initial volumes of powder are used. Without being bound by any theory, it is believed that this differential behavior can be attributed to the powder 10 being less cohesive, such that individual particles 20 are forced by the overall increased mass of material through the openings of the sieving meshes instead of forming lumps of material.

In some embodiments, a powder 10 of the present disclosure may, thus, show a higher sieving efficiency and a better resistance to high ambient humidity relative to comparative prior art powders.

For example, a ratio of the sieving efficiency of the powder 10 over the sieving efficiency of the comparative prior art powder may be at least 1.15, or at least 1.5, or at least 2, or at least 2.5, or at least 3, or even more. For example, a ratio of the recovered sieved powder 10 over the total initial quantity may be of at least 0.15, or at least 0.20, or at least 0.25, or at least 0.30, or even more. For example, for total sieved quantities ranging from 100 g to 1000 g, this ratio may vary by less than 0.10, or less than 0.8, or less than 0.6, or less than 0.4, or less than 0.2, or even less. For example, relatively to the recovered sieved quantity of powder 10 for a total initial quantity of 100 g, in some embodiments, this ratio may vary by less than 50%, or by less than 40%, or by less than 30%, or by less than 20%, or by less than 10%, or by even less.

For example, the herein described powder 10 may have a sieving efficiency such that at least 100 g of powder having a PSD<20 micrometer is recovered when sieving 1000 g of powder 10 having a PSD of 0-1000 micrometers through a stack of ASTM E11 mesh sieves 230, 450, 500 and 625.

In some embodiments, a powder 10 of the present disclosure may have an improved behavior in gas classification processes relative to that one of a comparative prior art powder.

In some embodiments, the herein described improved relative behavior in gas classification processes may also be less sensitive (or in some cases, insensitive) to ambient humidity (RH %) and/or the powder's humidity history exposure.

Gas classification processes typically rely on particle inertia to separate them according to size. As such, a gas classifier typically does not differentiate aggregates of two or more particles and larger particles. Because the herein described powder 10 is characterized as having minimal formation of aggregates at least in part due to its reduced hydrophilicity, it then follows that the herein described powder 10 has an improved separation of particles in the gas classification process. This improved separation of particles minimizes classification errors. In diminishing the cohesivity of individual powder grains, the fraction of aggregates in the gas flow is lessened. Since aggregates will behave as larger particles with lower density, they will remain with the larger fraction in the process, whereas the small particles that constitute the aggregate should not.

The person of skill will readily understand that in certain embodiments, a powder 10 of the present disclosure may include one or more of the herein described advantageous physical characteristics.

Powder Materials

Various materials may be used for additive manufacturing. The person of skill will readily understand how to proceed with analysing the chemical composition of a given powder using standardized tests. For example, the chemical composition of a powder can be determined by chemical analysis in accordance with ASTM E34, ASTM E3061, or by other analytical methods acceptable in the art.

In one non-limiting embodiment, the powder 10 may include particles 20 which are pure metal-based, alloy-based, ceramic-based, and/or composite-based particles. For example, the powder 10 may include particles 20 that are, but without being limited to, aluminum alloys, steels, stainless steels, copper alloys, nickel alloys, superalloys, palladium, silver, tungsten, refractory metals, ceramics, polyamide and/or polystyrene-based particles. For example, the particles may be metal-based spherical particles.

For example, the powder 10 may include particles 20 that are, but without being limited to, aluminum (Al), iron (Fe), steel, copper (Cu), nickel (Ni), gold (Au), silver (Ag), bismuth (Bi), manganese (Mn), zinc (Zn), cobalt (Co), titanium (Ti), chromium (Cr), molybdenum (Mo), platinum (Pt), zirconium (Zr), Tantale (Ta), Niobium (Nb), tungsten (W), iridium (Ir), and the like, -based particles. These can be used singly as one species or in a combination of two or more species as alloys.

Examples of alloys include, but without being limited to, aluminum alloys (such as AlSi10Mg, AlSi12, AlSi7Mg0.6, etc.), copper alloys (such as Cu-15Ni-8Sn, GRCop-84, CuNiSi(Cr), CuCr1Zr, CuAl10, CuSn10, CuSn15, etc.), nickel alloys (such as Nickel chromium super-alloys like Inconel 718, Inconel 713, Inconel 738, Inconel 625, etc.), magnesium alloys (such as Mg-5.9Zn-0.13Zr, Mg-9Al, etc.), zinc alloys (such as Zn—Al, Zn—Fe, etc.), cobalt alloys (such as ASTM F75 CoCr, Co28Cr6Mo, etc.), and titanium alloys (such as Ti-6Al-4V, Ti-6Al-7Nb, Ti-6Al-4V ELI [which contains less nitrogen, oxygen, iron and carbon], etc.).

For example, the powder 10 may include particles 20 that are, but without being limited to, ceramic materials formed of oxides (oxide-based ceramic materials) and ceramic materials formed of non-oxides such as carbides, borides, nitrides, and apatites. The oxide-based ceramic is not particularly limited and can be oxides of various metal species. The metal(s) forming the oxide-based ceramic can be, for example, one, two or more species selected among metalloids such as B, Si, Ge, Sb, and Bi; typical elements such as Mg, Ca, Sr, Ba, Zn, Al, Ga, In, Sn, and Pb; transition metals such as Sc, Y, Ti, Zr, Hf, V, Nb, Ta, Cr, Mo, W, Mn, Fe, Co, Ni, Cu, Ag, and Au; and lanthanoids such as La, Ce, Pr, Nd, Sm, Er, and Lu. In particular, one, two or more species selected among Mg, Y, Ti, Zr, Cr, Mn, Fe, Zn, Al, and Er can be used.

More specific examples of the oxide-based ceramic may include alumina, zirconia, yttria, chromia, titania, cobaltite, magnesia, silica, calcia, ceria, ferrite, spinel, zircon, nickel oxide, silver oxide, copper oxide, zinc oxide, gallium oxide, strontium oxide, scandium oxide, samarium oxide, bismuth oxide, lanthanum oxide, lutetium oxide, hafnium oxide, vanadium oxide, niobium oxide, tungsten oxide, manganese oxide, tantalum oxide, terbium oxide, europium oxide, neodymium oxide, tin oxide, antimony oxide, antimony-containing tin oxide, indium oxide, tin-containing indium oxide, zirconium oxide aluminate, zirconium oxide silicate, hafnium oxide aluminate, hafnium oxide silicate, titanium oxide silicate, lanthanum oxide silicate, lanthanum oxide aluminate, yttrium oxide silicate, titanium oxide silicate, and tantalum oxide silicate.

Examples of the non-oxide-based ceramic may include carbides such as tungsten carbide, chromium carbide, vanadium carbide, niobium carbide, molybdenum carbide, tantalum carbide, titanium carbide, zirconium carbide, hafnium carbide, silicon carbide, and boron carbide; borides such as molybdenum boride, chromium boride, hafnium boride, zirconium boride, tantalum boride, and titanium boride; nitrides such as titanium nitride, silicon nitride, and aluminum nitride; composite compounds such as forsterite, steatite, cordierite, mullite, barium titanate, lead titanate, lead zirconate titanate, Mn—Zn ferrite, Ni—Zn ferrite, and sialon; phosphate compounds such as hydroxyapatite and calcium phosphate. Of these, any species can be used singly or two or more species can be used in combination.

For example, the powder 10 described herein may include particles that have the formula Al-10Si-0.35Mg, or the formula Al-10Si—Mg, or the formula Al-7Si—Mg, or the formula 62Ni-21.5Cr-9.0Mo-3.65Nb, or the formula Ti-6Al-4Va, or the formula Ti-6Al-2Sn-4Zr-2Mo, or the formula Ti-5Al-5V-5Mo-3Cr, or are Ni alloy 625-based particles, or are Ni alloy 718-based particles, or are pure titanium-based particles (e.g., CP-Ti, commercially pure titanium).

The person of skill will readily understand that a given powder 10 may include certain controlled amounts of specific elements determined using standardized tests. For example, a given powder 10 may include one or more elements such as carbon determined in accordance with ASTM E 1941 or ASTM E 1019, hydrogen determined in accordance with ASTM E 1447, oxygen and nitrogen determined in accordance with ASTM E 1409, and other elements determined in accordance with ASTM E 539 and ASTM E 2371. Other analytical methods are also known in the art and for conciseness sake, will not be further described here.

For example, a given powder 10 may include one or more of the following: an oxygen content of less than 2000 ppm, or less than 1500 ppm, or less than 1000 ppm, or less than 400 ppm, or less than 300 ppm, or less than 150 ppm, or even less; a carbon content of less than 1000 ppm, or less than 500 ppm, or less than 300 ppm, or less than 100 ppm, or even less; a hydrogen content of less than 200 ppm, or less than 150 ppm, or less than 100 ppm, or even less; a nitrogen content of less than 500 ppm, or less than 400 ppm, or less than 300, or even less.

Powder Particle Size

Powders of various particle size distributions (PSD) may be used in additive manufacturing, where the PSD may be determined by one or more of the intended additive manufacturing apparatus, the intended application, the intended part, and the like. The person of skill will readily understand how to measure particle size in a given powder. For example, the person of skill will readily understand that particle size may be determined in accordance with standard ASTM B214 for powder sizes 45 microns and higher, whereas for sizes 45 microns and less, ATSM B822 should generally apply instead.

In one non-limiting embodiment, the powder 10 may, for example, include particles 20 having a PSD in the general size range of from about 0 μm to about 1000 μm, including any general size ranges contained therein, such as from about 0 μm to about 20 μm, or from about 0 μm to about 45 μm, or from about 0 μm to about 53 μm, or from about 0 μm to about 70 μm, or from about 15 μm to about 45 μm, or from about 15 μm to about 53 μm, or from about 15 μm to about 70 μm, or from about 15 μm to about 105 μm, or from about 30 μm to about 53 μm, or from about 30 μm to about 70 μm, or from about 30 μm to about 105 μm, or from about 45 μm to about 105 μm, or from about 53 μm to about 105 μm, from about 100 μm to about 500 μm, or from about 500 μm to about 1000 μm. In some cases, the powder 10 may include particles having a size larger than 1000 μm, depending on the specifics of an additive manufacturing process and/or apparatus.

The person of skill will also readily understand that for a given general size PSD range, there might be room for small proportions of the powder 10 which has particle sizes that are beyond the general lower or upper limit, i.e., the PSD may allow for a fine tolerance and/or coarse tolerance (in vol. % or wt. %).

For example, a powder 10 having a PSD in the general size range of from 25 μm to 45 μm may include particles having an average particle diameter lower than 25 μm (fine tolerance) that is less than 20 vol. %, or less than 15 vol. %, or less than 10 vol. %, or less than 5 vol. %, or even less (e.g. 0 vol. %) in accordance with ASTM B822. The powder 10 may also have a proportion of particles having a diameter higher than 45 μm (coarse tolerance) that is less than 20 wt. %, or less than 15 wt. %, or less than 10 wt. %, or less than 5 wt. %, or even less (e.g. 0%) in accordance with ASTM B214.

For example, the following tables show a number of PSD size ranges for embodiments of the powder 10 of the present disclosure, which may be suitable in various applications:

TABLE 1

Examples of Particle size distribution for powder A

| PSD | Size | Max. |
|---|---|---|
| 0-25 μm | >25 μm | 20% |
| | >45 μm (325 mesh) | 1% |
| 15-63 μm | <15 μm | 5% |
| | >63 μm (230 mesh) | 10% |
| | >90 μm (170 mesh) | 0.2% |
| 45-177 μm | <25 μm (500 mesh) | 0.7% |

TABLE 1-continued

Examples of Particle size distribution for powder A

| PSD | Size | Max. |
|---|---|---|
| | <45 μm (325 mesh) | 5% |
| | >177 μm (80 mesh) | 10% |
| | >250 μm (60 mesh) | 0.2% |
| 45-106 μm | <25 μm (500 mesh) | 0.7% |
| | <45 μm (325 mesh) | 5% |
| | >106 μm (140 mesh) | 10% |
| | >150 μm (100 mesh) | 0.2% |

TABLE 2

Examples of Particle size distribution for powder B

| PSD | Size | Max. |
|---|---|---|
| 20-63 μm | <20 μm | 10 vol. % |
| | >63 μm | 5 wt. % |
| 15-53 μm | <15 μm | 10 vol. % |
| | >53 μm | 5 wt. % |
| 10-45 μm | <10 μm | 10 vol. % |
| | >45 μm | 5 wt. % |

TABLE 3

Examples of Particle size distribution for powder C

| PSD | Size | Max. |
|---|---|---|
| 45-125 μm | <45 μm | 10 wt. % |
| | >125 μm | 10 wt. % |
| 10-53 μm | <10 μm | 5 wt. % |
| | >53 μm | 5 wt. % |
| 5-30 μm | <5 μm | 5 wt. % |
| | >30 μm | 5 wt. % |

Process for Preparing the Powders of the Present Disclosure

Figure 3:
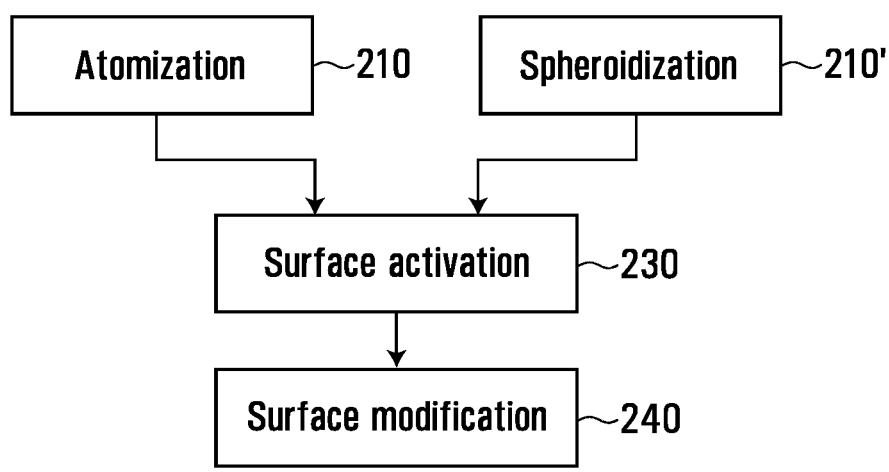
FIG. 3 shows a flowchart illustrating a manufacturing process for manufacturing a powder in accordance with an embodiment of the present disclosure.
Figure 4A:
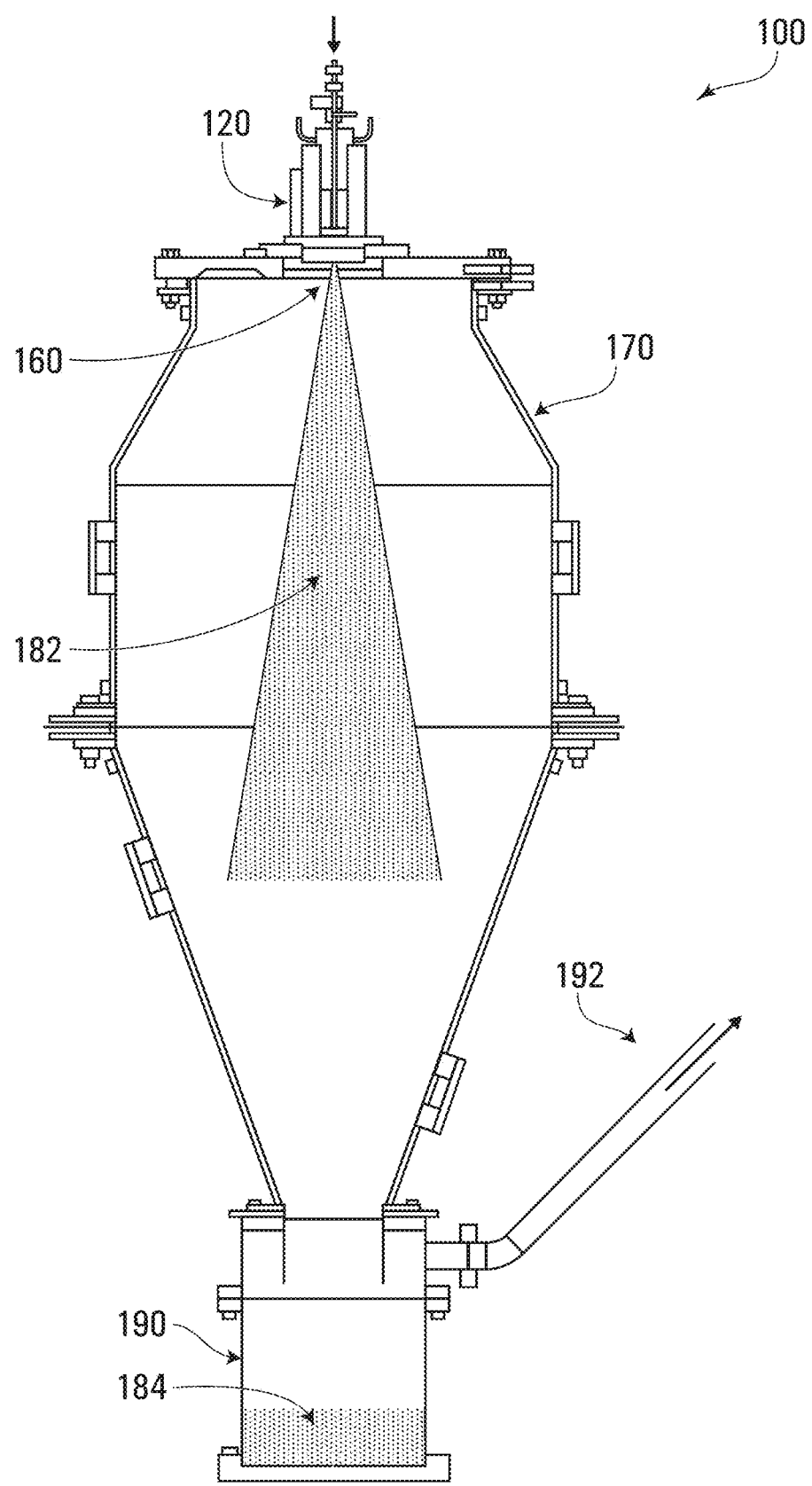
FIGS. 4A and 4B show an example of a manufacturing apparatus for producing an atomized powder in accordance with an embodiment of the present disclosure.
Figure 4B:
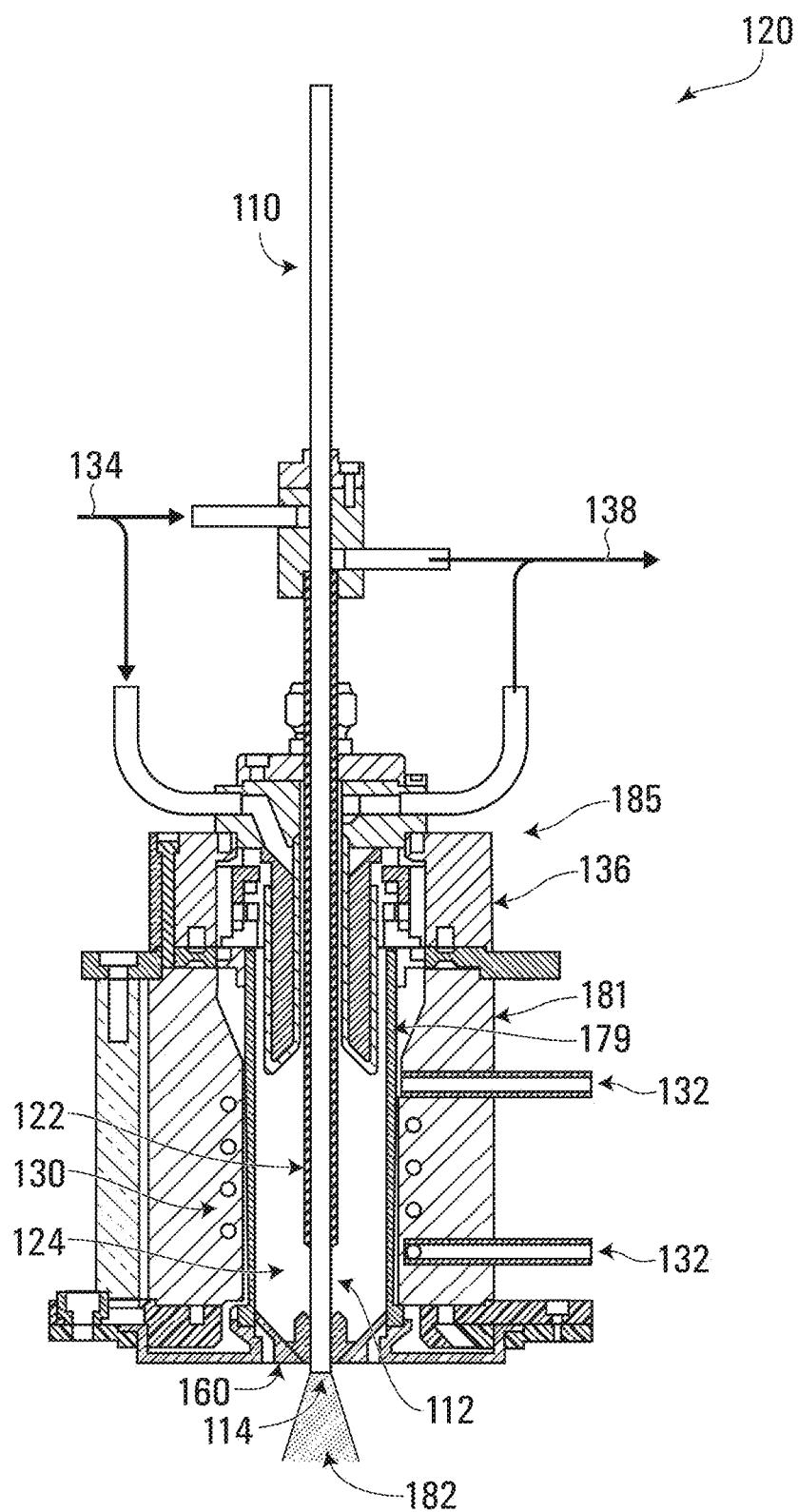

FIG. 3 illustrates a flowchart of a general method 200 for manufacturing powder 10.

Without being bound by any theory, it is believed that powders for use in additive manufacturing display chemical moieties on the particle surface that interact favorably with water molecules, making the surface hydrophilic. This increases the tendency of powders to adsorb water from ambient atmosphere, for example, during manufacturing or post-manufacturing stages, such as during any one of the preparation, handling, storage and use. Hence, water will tend to adsorb on the surface of the particles, eventually until a layer (e.g., a molecular layer, a multi-molecular layer, etc.) is formed. The presence of adsorbed water on the surface of powder particles for use in additive manufacturing is detrimental at least in that, at the contact points between individual powder particles, the adsorbed water film on each particle may interact through hydrogen bonding and surface tension, forming agglomerates (which can be "secondary particles" and/or the whole powder bed). This cohesiveness is detrimental to the powder flow properties as more energy is needed to initiate powder avalanches. Because in additive manufacturing operations, the powder needs to be precisely spread out in a uniform fashion at every pass of the operation, such cohesiveness or agglomerate formation caused by the presence of adsorbed water at the surface of the powder particles is, accordingly, highly undesirable.

In one aspect, the present disclosure addresses this issue by using the very same chemical moieties responsible for the hydrophilic quality of the powders to attach functional moieties that will impart the powder surface with the desired properties.

For example, at step 210, a plasma atomization process may be used to obtain powder particles from a broad range of feed materials, including for example pure metals, alloys, ceramics and composites. For example, a wide range of dense spherical metal, ceramic or composite powders may be obtained from a feed material of the same nature in the form of an elongated member such as, as non-limitative examples, a rod, a wire or a filled tube as disclosed, for example, in U.S. Pat. Nos. 9,718,131 and 9,751,129, both of which are incorporated herein by reference in their entirety for all purposes. Briefly, methods for atomization include plasma atomization where a feed material is guided at the apex of one or more plasma jets. The plasma jets impinging on the end of the material heat it until it reaches its melting point and it gets stripped away from the feed material in the form of melt droplets by the plasma jets, by a secondary set of plasma jets or by an additional gas jet. The feed material can optionally be preheated by one or more preheating mechanism(s). The melted material droplets then enter a cooling zone where the droplets freeze in free fall, thus adopting a mostly spherical shape. Plasma reactors for implementing such methods are known in the art and may be an inductively coupled plasma torch (ICP torch) (e.g., TEKNA Plasma Systems, Inc. PL-50, PN-50, PL-35, PN-35, PL-70, PN-70, PN-100) or may be a direct current (DC) plasma torch (e.g., those commercialized by Praxair, Oerlikon-Metco, Pyrogenesis and Northwest Mettech).

Another possible process is through the gas atomization of a melt pool. In such an embodiment the powder is first melted in a crucible and then fed through an aperture into a stream of high velocity gas where the melt stream is sheared into smaller droplets. The atomization method might also use a bar of feedstock molten in passing through an induction coil. The molten metal then flows towards an atomization nozzle, where streams of high velocity gas disrupt the melt into fine droplets. Another method for atomization uses a rotating electrode contacted by a plasma jet. The centrifugal force generated by the rotation of the electrode ejects the molten material which then freezes in-flight thus adopting a spherical shape. Another method atomizes molten material from a heated reservoir by spreading the molten material on a rotating disk and subsequent ejection under the centrifugal force generated by the rotation of the disk. The ejected droplets then freeze during freefall thus adopting a spherical shape.

Other atomization methods are known in the art and for conciseness sake, will not be further described here.

The powders obtained with atomization may include, without limitation, micron sized particles that may be defined as particles in a range from 0 to 1000 micrometer in diameter, as discussed elsewhere in this specification.

In some embodiments, the feed material can include powder having angular shaped particles. Step 210' includes processing such angular shaped particles to produce dense and spheroidal products, for example as described in U.S. Pat. Nos. 9,023,259 and 9259785, both of which are incorporated herein by reference in their entirety for all purposes. Briefly, the angular shaped powder can be fed in a hot zone where sufficient energy to partially melt the particle is transferred to the surface of the particle through radiation, convection, induction, surface recombination or a combination thereof. In one embodiment, powder is fed into an inert gas stream which enters a chamber where thermal plasma exists, generated by an alternating electromagnetic field as in an ICP torch to which is made reference above. The particle surface melts and subsequently reshapes into a spherical shape as required for the minimization of Gibbs' free energy. In another contemplated embodiment, the thermal plasma is generated at the exit of a DC plasma torch to which is made reference above or at the apex of the plasma jets generated by a plurality of plasma torches. Optionally a sheath gas can be provided that protects the walls of the plasma chamber. The sheath gas can also play an active role in the interaction with the powder material. As the sheath gas is brought in thermal contact with the plasma, it becomes part of the heating media. The hot zone at the apex of the plasma torches can then be expanded on a larger volume to facilitate the interaction with the injected powder cloud.

The description provided herein is not meant to be limitative and those skilled in the art will recognize that other methods exist that can heat powder particles for spheroidization.

At step 230, the surface of the powder may be activated, e.g., the surface of the powder may comprise more hydroxyl groups when it is exposed to plasma compared to a native oxide layer. Prior to step 230, the powder comprises a native oxide outer layer resulting from an oxidation of the outer layer. This layer is also called a passivation layer and helps to protect the metal from deeper corrosion. The metal oxide MOx naturally presents OH groups at its surface. However, the concentration of the hydroxyl group differs from a metal oxide to another and strongly depends on the synthesis method including the gas composition and the water vapor concentration in the powder environment.

Figure 5A:
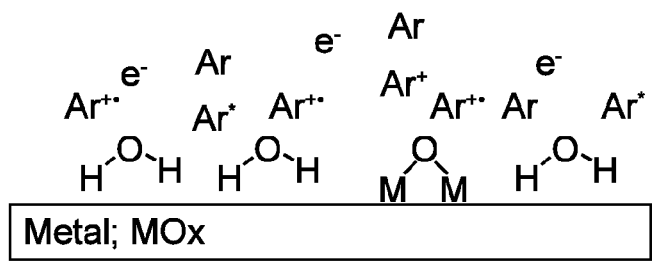
FIGS. 5A to 5C show non-limiting schematics that illustrate a possible surface activation mechanism in an inert gas plasma of a metallic powder, in accordance with an embodiment of the present disclosure.
Figure 5B:
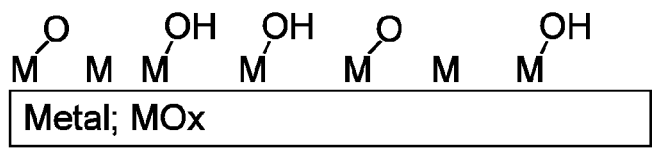
Figure 5C:
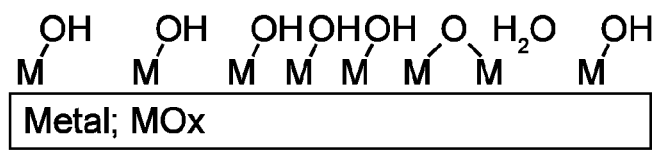

In the plasma state, atoms are ionized and accelerated by electromagnetic fields. Upon impinging on the surface of the immersed material, these high energy ions transfer some of their energy to the surface, leading to the formation of hydroxyl groups, thus generating an "activated" surface. FIGS. 5A to 5C show a non-limiting activation mechanism scheme in the case of a metallic surface in an inert gas plasma, which is in this case, argon. FIG. 5A shows the reactive metal surface, which typically has a certain amount of oxygen thereon. As high energy inert gas ions created in the plasma impinge on the surface, they disrupt the electronic structure in the target region which can result, for example, in the breakage of an oxygen bond with the metal, as shown in FIG. 5B. It thus creates surface radicals which are very reactive. If water vapor is present in the vicinity of the activated region and in a sufficiently short timeframe, hydrolysis will occur and —OH moieties will attach to the surface as shown in FIG. 5C. Water present at concentrations of about 1000 ppm, or 100 ppm, or even 10 ppm, added intentionally or not, is sufficient in generating hydroxyl groups on the metal surface.

Figure 6A:
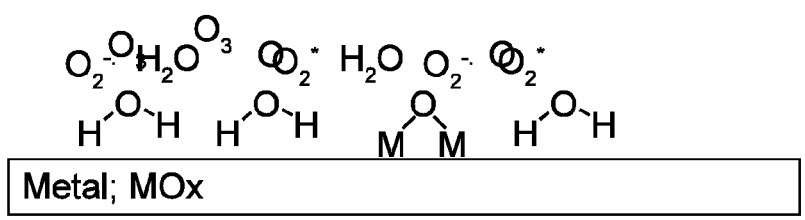
FIGS. 6A to 6C show non-limiting schematics that illustrate a possible surface activation mechanism in an oxygen-containing plasma of a metallic powder, in accordance with an embodiment of the present disclosure.
Figure 6B:
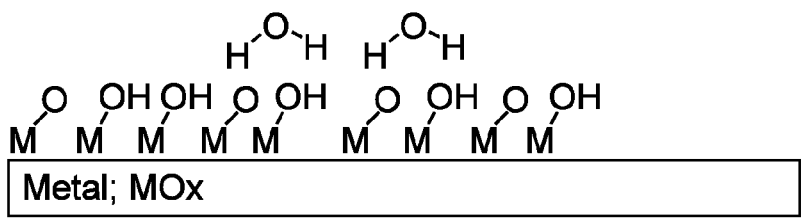
Figure 6C:
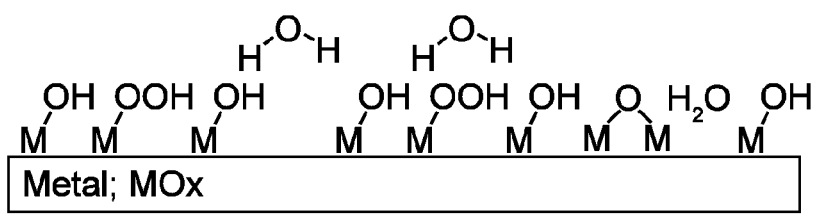

As another example, the plasma gas might contain oxygen. FIGS. 6A to 6C show a non-limiting possible mechanism responsible for activation in presence of oxygen-containing plasma. Oxygen radicals as shown in FIG. 6A impinge on the metal surface where they form a bond with the metallic substrate, as shown in FIG. 6B. Such oxygen atoms remain in a radical state until they encounter water vapor which undergoes hydrolysis to generate —OH groups at the surface, as shown in FIG. 6C. The exposure to water vapor can happen either during the plasma process, or out of the plasma reactor, for example, during subsequent steps such as during handling, storage or use.

As yet another example, it is possible for free radicals to be generated by exposure to UV radiation. Plasmas such as DC and RF plasmas used in plasma atomization produce energetic UV radiation. These highly energetic photons interact with gaseous oxygen to form ozone, which then react with water vapor to form hydroxyl radicals that are then free to interact with the surface.

As another example of a mechanism for surface activation in the presence of a plasma, it was reported in the literature that exposure of titania to UV light generated oxygen vacancies at surface bridging oxygen sites. These vacancies can then be healed by hydrolysis of water and subsequent bonding to the damaged sites. The surface then undergoes a conversion to a super-hydrophilic state. In this mechanism like in the others, the hydrolysis step can be subsequent to the radical formation step. In some embodiments, it might occur as a post-process step.

Figure 7:
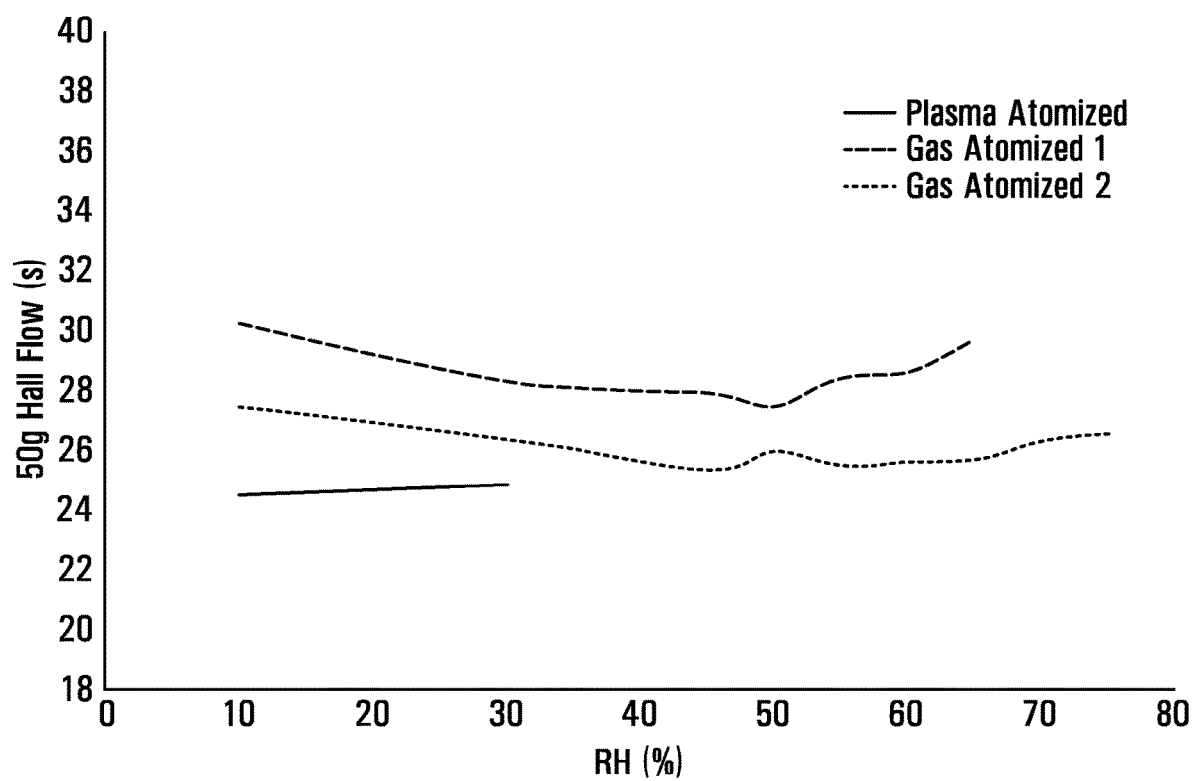
FIG. 7 shows a non-limiting graph of flowability for prior art Ti-6Al-4Va powders produced using different atomization technologies as a function of relative humidity (RH %)

In atomization schemes where no plasma is used, the production of hydrophilic groups is not as important since these mechanisms cannot take place. However, at the solid/gas interface, an oxide layer is still formed when the naked metal come into contact with oxygen or water. This layer will not be fully transformed into a stoichiometric MOx, and hydroxyl groups will still be present to some extent. Hence, the hydroxyl groups that dictate the flowability behavior of a metal powder rely on the synthesis method. For example, the present inventors expect that Ti alloy powder made by a plasma process would have a hydroxyl concentration higher than a Ti alloy powder made by a gas atomized process. FIG. 7 shows Hall flow vs. relative humidity curves for Ti-6Al-4V powders produced with different processes. While it flows faster at low humidity, the plasma atomized powder stops flowing at a moderate RH level, while the flowability of the gas atomized powders display a better resilience to damp atmospheres.

At step 240, the hydrophilicity imparted to the powder by the hydroxyl groups present at the surface of the powder is hindered by a surface modification, which incorporates a hydrophobic agent at the surface of the powder particles. The surface modification can be carried out through different methods using coupling agents. These molecules interact with the interface either by chelation bonding as with catechol, phosphate phosphonate, sulfate, amine and carboxylate or by chemical covalent bonding as with organo-silane, organo-titanate organo-zirconate and organo-aluminate. The following non-limiting embodiments mostly relate to the surface modification of metal powders using silane coupling agents, however, the person of skill will readily understand that these embodiments are for illustrative purposes only and are not meant to limit the invention, such that other types of powders and/or of coupling agents can be envisioned without departing from the present disclosure.

FIGS. 8A to 8D show possible mechanisms of attachment for alkoxysilanes. Such molecules need water to allow the chemical reaction to take place. The functional silane is represented as $R_nSiX_{(4-n)}$ where X is the hydrolysable group (alkoxy, halide, carboxylate, amine group) and R is the non-hydrolysable group that holds the function of interest (alkyl, amine, epoxy, thiol, acrylate, alkyl halide), and n is an integer between 1, 2 and 3. In the first step of the reaction shown in FIG. 8A, the hydrolysis occurs. The water molecules either adsorbed at the surface or added to the mixture attack the silicon site of the silane leading to the replacement of the leaving groups (hydrolysable group) by silanol groups (Si—OH) through a nucleophilic substitution mechanism (SN2). It is noted that the by-product of this step is the hydrolysable group bonded to a hydrogen (alcohol, hydrogen halide, carboxylic acid, or amine). The kinetic of the hydrolysis step depends of several parameters: the temperature, the leaving group, the chemical structure of the functional group and the acid/base catalysis. For instance, in the case of the leaving group, the hydrolysis follows the order:

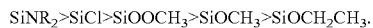
$SiNR_2 > SiCl > SiOOCH_3 > SiOCH_3 > SiOCH_2CH_3$.

Figure 8A:
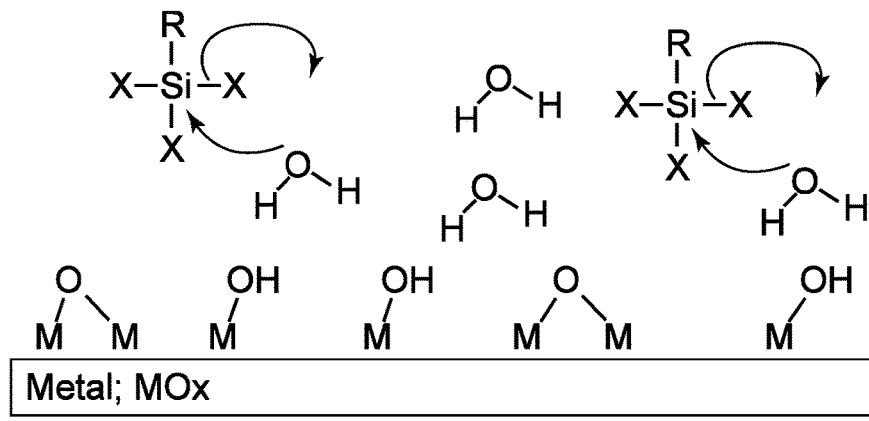
FIGS. 8A to 8D show non-limiting schematics that illustrate possible attachment mechanisms of an alkoxysilane to the surface of a metallic powder, in accordance with an embodiment of the present disclosure.
Figure 8B:
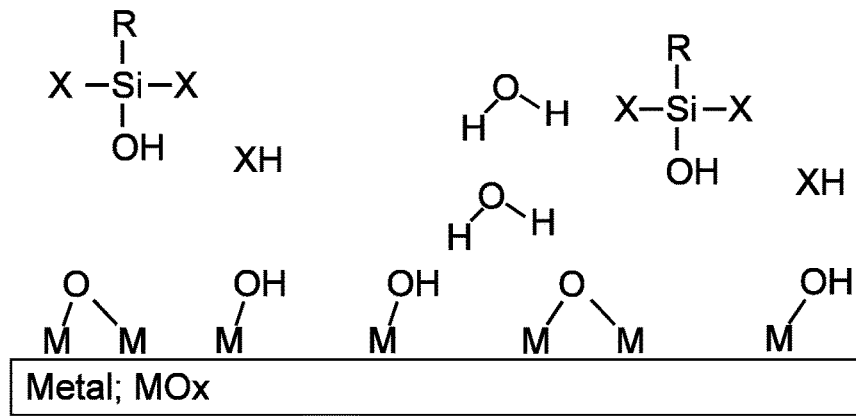
Figure 8C:
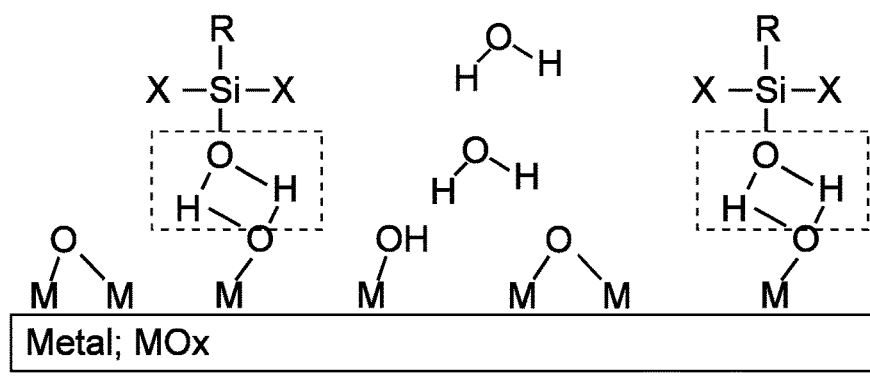
Figure 8D:
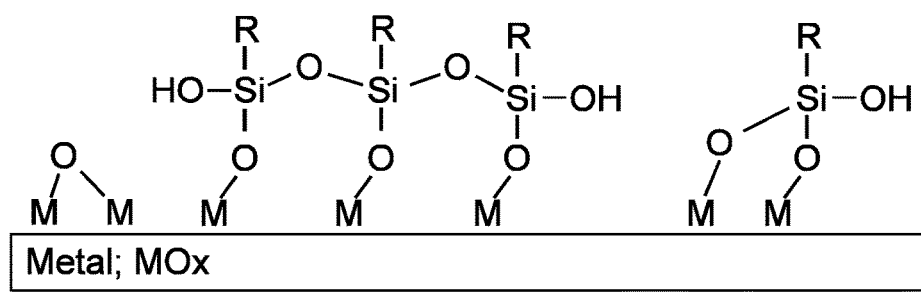

It is noted that if the leaving group generates an acid or a base when hydrolysed, it will contribute to the reactivity. At this point, two outcomes are possible. Either the silanol reacts with another silanol from a second hydrolyzed silane molecule or the silanol reacts with a —OH from the surface, as illustrated in FIGS. 8C and 8D. In this situation, water is released, and the silane molecule becomes covalently attached to the surface. This step is called condensation.

Preferably, the target application requires that a maximum effect be obtained with relatively low silane quantity. Therefore, the preferred approach aims to maximize coverage while diminishing the thickness of the layer added. In this embodiment, this is achieved by favoring the attachment of reactive silanols to the surface rather than to other silane molecules. In practice, this is achieved by adjusting the rate of the two competing processes in the reaction, namely, hydrolysis and condensation.

In the process of the present disclosure, one can use, for example, methyltrimethoxysilane which is an alkoxysilane where X is a methoxy and R is a methyl group ($CH_3$). Such a silane with one carbon alkyl chain has the minimum of hydrophobic interactions compared to long chain silanes. This particular alkoxysilane may be advantageous in that it may help to remove the hydrogen bonding between the particles while maintaining the hydrophobic interactions to its lowest. The alkoxy as a leaving group has a low reactivity at room temperature in the absence of a catalyst. Such a situation creates the opportunity of tuning the reaction kinetics through an appropriate choice of catalyst. It is known from research on mesoporous silica that basic catalysis tends to promote condensation at the expense of hydrolysis while the acid catalysis tends to follow the opposite trend. Consequently, the acid catalysis would promote the formation of oligomers especially in the presence of excess amount of water and the use of basic catalysis would promote the grafting. The basic catalysis precisely meets the goal being sought in tuning the process for the present application.

In a preferred embodiment, the reaction is to be performed in hydroalcoholic media. The coupling agent (e.g., silane molecule) is dissolved in alcohol, and a second solution of alcohol and catalyst is prepared. The solutions are then added to the powder while mixing to ensure equal wetting of all powder grains. The total amount of alcohol is chosen so that it does not exceed the void volume in the powder bed, i.e. the mixture remains solid. It has been shown that the use of alcohol as a protic solvent helps to boost the hydrolysis reaction to some extent compared to the use of aprotic solvents whereas the use of pure water may be limiting since most of the alkyl silane are not miscible with it. In a preferred embodiment the catalyst is ammonia but not limited thereto. Other catalysts promoting the condensation over the hydrolysis might be used, such as triethylamine, trimethyl amine calcium carbonate or sodium fluoride to name a few.

In this scheme, the reaction dynamics are in favor of surface attachment of silanol moieties. As hydrolysis begins, condensation becomes possible. Since at the very beginning the probability that a silanol moiety will encounter a hydroxyl from the surface is much greater that the probability of it encountering a second silanol from another silane molecule, the majority of molecules will attach at the surface of the powder. Since the condensation dynamics are highly favored, the equilibrium will remain in favor of attachment at the surface sites rather than between free silanes. If n is greater than 1, n hydrolyses are possible on each silane molecule. It is therefore possible to attach more molecules to surface bound silanes. In this case, however, steric hindrance and a lower reactivity of the bonds towards hydrolysis make this event less likely than the attachment to a free hydroxyl. As more and more surface hydroxyls become occupied, however, the event becomes more likely.

The reaction is preferably performed in a closed vessel under constant agitation and at a temperature between room temperature (about 20° C.) and 79° C., and preferably about 50° C., to keep the solvent and catalyst concentration constant, as it is believed that the temperature has an effect on the reactivity.

Materials for additive manufacturing have restrictive limitations on their composition. It is therefore preferable that all treatment does not modify substantially the chemical composition of the raw powders. In an ideal situation, the surface treatment adds only a molecular layer on the surface of the powder. It was reported that optimal silane coverage was around $2.7 \times 10^{14}$ molecules per $cm^2$. The typical surface area for a powder in the laser melting PSD range is of 0.04 $m^2/g$, or 400 $cm^2$ per gram. This process yields $1.08 \times 10^{17}$ molecules per gram since each silane molecule has 1 silicon atom, this translates to a pickup of 5 ppm Si in the treated Ti64 powder. Alkoxysilane molecules also have oxygen atoms that react to a variable extent. Depending on the functional groups, there will be carbon, fluorine, hydrogen or nitrogen atoms without wishing to be limitative. In practice, the amount of silicon added to a typical laser melting range Ti64 powder will be of about 10 to 100 ppm.

Variants

It is also contemplated that the surface modification can be performed in a gas phase. In such an embodiment, the powder is placed in a fluidized bed and silane vapors are circulated through the powder bed. The gas composition is adjusted according to the type of silane to be reacted. For example, water vapor may be added if the silane requires hydrolysis to proceed. The temperature of the fluidized bed and the water vapor pressure are controlled to provide enough water adsorption for the reaction but not enough to make the powder cohesive. The water vapor pressure can be varied through the process. Catalysts, such as acetic acid or ammonia can be supplied to control the reaction dynamics. Chlorosilanes or azosilanes can also be used if the reaction is to proceed in the absence of water. It is contemplated that such an embodiment could enable the treatment of powders in-line with the atomization process. In such an embodiment the reactive gases are injected downstream from the plasma torch to avoid dissociation. The aerosolized powders then have their surface free to react with the reactive species. The geometry of a second reactor in a fluid connection to the atomization reactor controls the time spent in the aerosol phase by the powder grains and thus the reaction time.

In another embodiment, the particles 20 of the powder 10 may comprise a metal that is reactive with silane hydrides. For instance, the particles 20 may be titanium-, zirconium-, nickel-, platinum- or gold-based particles. Silane may adsorb on the naked metal surface (a surface without a passivation layer) and then react leading to a surface modification and liberating hydrogen molecules. This process may be performed in a gas phase. In order for the reaction to happen; the surface may be free of the oxide native layer. Therefore, this process may be employed in oxygen free environment.

In another contemplated embodiment, the powders are collected in-line in a bubbler. The fluid in the bubbler has reactive molecules in solution which can react with the powders. The fluid is in fluid connection with a separation apparatus which separates the powders from the liquid solution. In an embodiment, this separation apparatus can be a tangential flow filtration apparatus. The fluid is then recirculated in the system with addition of fresh reactants. The resulting slurry is then dried in a disc dryer, for example.

As another variant, in some embodiments, rather than being manufactured by direct metal laser melting, the three-dimensional metal part 610 may be manufactured by direct metal laser sintering, electron beam melting, selective heat sintering, selecting laser sintering, selective laser melting or molding.

Those skilled in the art will recognize that limitations on the amount of solvent used are suggested for best practices but are not intended to be limitative in any way. The example of the powder treatment in a bubbler in fluid connection with the atomizer is a good example where a more dilute suspension is required.

In some embodiments, the powders can be processed to obtain a surface treatment resulting in an increased flowability. For example, the powders may be retrieved from the manufacturing apparatus (e.g., a DC plasma reactor, an ICP plasma reactor, etc.) and processed directly (without further treatment or classification) to obtain the surface treatment. Alternatively, the powders may be retrieved from the manufacturing apparatus (e.g., DC plasma or ICP plasma) and classified (e.g., gas classification or mesh sieving) to separate the metal powder by particle size distributions.

This surface treatment may include stirring the powder in a solvent, e.g., water or other suitable solvent, containing a source of a molecule which decreases hydrophilicity of the powder under conditions to obtain less than 800 ppm, or less than 500 ppm, or less than 400 ppm, or less than 300 ppm, or less than 200 ppm, or less than 100 ppm, or less than 50 ppm, or less than 25 ppm, or less than 20 ppm, or less than 15 ppm, or less than 10 ppm of the molecule which decreases hydrophilicity of the powder being taken up by the powder. For example, the water or suitable solvent may include less than 1000 ppm, or less than 800 ppm, or less than 500 ppm, or less than 400 ppm, or less than 300 ppm, or less than 200 ppm, or less than 100 ppm, or less than 50 ppm, or less than 25 ppm, or less than 20 ppm, or less than 15 ppm, or less than 10 ppm of the source of the molecule which decreases hydrophilicity of the powder.

Ideally, the molecule which decreases hydrophilicity of the powder forms a molecular layer on at least a portion of the surface of each particle. For example, the molecule which decreases hydrophilicity of the powder may form a molecular layer encapsulating a respective particle.

The surface treatment thus results in a metal powder for additive manufacturing which has an increased flowability relative to a powder which has not been treated as such. For example, if using water as solvent, one may use distilled water or demineralized water.

For example, the source of the molecule which decreases hydrophilicity of the powder may include a molecule capable of reacting with the reactive surface of the powder particles to result in the molecule which decreases hydrophilicity of the powder being attached to the surface. For example, the source of the molecule which decreases hydrophilicity of the powder may include a molecule having a moiety capable of reacting with and/or attaching to elements present at the surface of the reactive powder particles and having a hydrophobic moiety which is intended for reducing the hydrophilicity of the powder as described herein.

For example, the source of the molecule which decreases hydrophilicity of the powder may include a surfactant, such as an alkyl-based surfactant. For example, amphiphiles surfactants with hydrophilic and hydrophobic groups may be particularly useful for performing this surface treatment in water. Non-limiting examples of surfactants include Alkanoic acid (Octanoic acid, Decanoic acid, dodecanoic acid, etc.), Alkyl phosphate (Decyl phosphate, Dodecyl phosphate, Tetradecyl phosphate, etc.), Alkyl amine (Octyl amine, Decyl amine, Dodecyl amine, etc.), Alkyl sulphate (Decyl sulfate, Dodecyl sulfate, etc.), Alkyl thiols (Octanethiol, Decanethiol, Dodecanethiol). Grafting mechanisms of surfactants to particles, in particular metal particles, can be achieved in different ways, such as attachment of surfactants with thiol end groups to metals under elimination of hydrogen; ether linkages can be introduced onto oxide and functionalized particles with terminal OH groups using silane halides and ethers, phosphonates, carboxylates, catechols, alkenes, and amines; multistep functionalization of terminal OH groups (oxides, polymers) to introduce reactive amine groups and esters. The person of skill in the art will readily understand that, in principle, any feasible chemical reaction at the particle surface can be exploited to graft a surfactant and for sake of conciseness will not be further described here.

In some embodiments, the surface treatment may thus include a number of steps. For example, the treatment may include starting with a powder atomization manufacturing process comprising contacting a feed material with a plasma to atomize the feed material (e.g., metal source) to produce a powder containing spherical particles. The treatment may further include classifying (e.g., sieving or gas classifying) the powder to obtain a powder having a predetermined particle size distribution (PSD). Alternatively, the treatment may proceed to the next step without the step of classifying the powder. Finally, the treatment includes contacting the powder with water or other suitable solvent containing the source of the molecule which decreases hydrophilicity of the powder under conditions to obtain a powder containing less than 800 ppm, or less than 500 ppm, or less than 400 ppm, or less than 300 ppm, or less than 200 ppm, or less than 100 ppm, or less than 50 ppm, or less than 25 ppm, or less than 20 ppm, or less than 15 ppm, or less than 10 ppm of the molecule which decreases hydrophilicity of the powder.

Additive Manufacturing Process

In one broad aspect, the present disclosure describes a method and an apparatus of powder bed fusion additive manufacturing that takes advantage of the herein described improved characteristics of a powder 10.

In various embodiments in accordance with the present disclosure, a build platform capable of moving, tilting, or inverting is designed for separating a powder bed from the supporting build platform. The powder bed is formed by dispensing multiple layers of a powdered material during an additive manufacturing print cycle for a 3D object. A substantial portion of the powdered material is collected in a hopper and transported to a storage chamber for reuse in later print jobs. The powdered material may be sealed inside the storage chamber in a controlled atmosphere such as air, nitrogen, argon, helium, or other inert or noble gas.

In powder bed fusion additive manufacturing, a powder bed may be formed by successively dispensing multiple layers of a powdered material on a build platform. An optical or electron beam of sufficient energy impinges on the surface of the powder bed and may cause melting/sintering/amalgamating or processing of the powdered material to form an integral part. When the portion of a powder layer corresponding to the geometry of a two-dimensional slice of a 3D object (part) is fused or bonded together, a next layer of the powdered material is dispensed on the surface of the powder bed to continue the print cycle. The printed part and remaining un-sintered powdered material need to be removed from the build platform when the printing job is finished to allow a next cycle to begin.

An additive manufacturing system may include one or more energy sources, including in one embodiment, one or more laser or electron beams, positioned to emit one or more energy beams. Beam shaping optics may receive the one or more energy beams from the energy source and form a single beam. An energy patterning unit receives or generates the single beam and transfers a two-dimensional pattern to the beam, and may reject the unused energy not in the pattern. An image relay receives the two-dimensional patterned beam and focuses it as a two-dimensional image to a desired location on a height fixed or movable build platform (e.g. a powder bed). In certain embodiments, some or all of any rejected energy from the energy patterning unit is reused.

In some embodiments, multiple beams from the laser array(s) are combined using a beam homogenizer. This combined beam can be directed at an energy patterning unit that includes either a transmissive or reflective pixel addressable light valve. In one embodiment, the pixel addressable light valve includes both a liquid crystal module having a polarizing element and a light projection unit providing a two-dimensional input pattern. The two-dimensional image focused by the image relay can be sequentially directed toward multiple locations on a powder bed to build a 3D structure.

An energy source generates photon (light), electron, ion, or other suitable energy beams or fluxes capable of being directed, shaped, and patterned. Multiple energy sources can be used in combination. The energy source can include lasers, incandescent light, concentrated solar, other light sources, electron beams, or ion beams. Possible laser types include, but are not limited to: Gas Lasers, Chemical Lasers, Dye Lasers, Metal Vapor Lasers, Solid State Lasers (e.g. fiber), Semiconductor (e.g. diode) Lasers, Free electron laser, Gas dynamic laser, "Nickel-like" Samarium laser, Raman laser, or Nuclear pumped laser.

A Gas Laser can include lasers such as a Helium-neon laser, Argon laser, Krypton laser, Xenon ion laser, Nitrogen laser, Carbon dioxide laser, Carbon monoxide laser or Excimer laser.

A Chemical laser can include lasers such as a Hydrogen fluoride laser, Deuterium fluoride laser, COIL (Chemical oxygen-iodine laser), or Agil (All gas-phase iodine laser).

A Metal Vapor Laser can include lasers such as a Helium-cadmium (HeCd) metal-vapor laser, Helium-mercury (HeHg) metal-vapor laser, Helium-selenium (HeSe) metal-vapor laser, Helium-silver (HeAg) metal-vapor laser, Strontium Vapor Laser, Neon-copper (NeCu) metal-vapor laser, Copper vapor laser, Gold vapor laser, or Manganese (Mn/MnCl2) vapor laser.

A Solid State Laser can include lasers such as a Ruby laser, Nd:YAG laser, NdCrYAG laser, Er:YAG laser, Neodymium YLF (Nd:YLF) solid-state laser, Neodymium doped Yttrium orthovanadate (Nd:YVO4) laser, Neodymium doped yttrium calcium oxoborate Nd:YCa4O(BO3)3 or simply Nd:YCOB, Neodymium glass (Nd:Glass) laser, Titanium sapphire (Ti:sapphire) laser, Thulium YAG (Tm:YAG) laser, Ytterbium YAG (Yb:YAG) laser, Ytterbium:2O3 (glass or ceramics) laser, Ytterbium doped glass laser (rod, plate/chip, and fiber), Holmium YAG (Ho:YAG) laser, Chromium ZnSe (Cr:ZnSe) laser, Cerium doped lithium strontium (or calcium)aluminum fluoride (Ce:LiSAF, Ce:LiCAF), Promethium 147 doped phosphate glass (147Pm+3:Glass) solid-state laser, Chromium doped chrysoberyl (alexandrite) laser, Erbium doped anderbium-ytterbium co-doped glass lasers, Trivalent uranium doped calcium fluoride (U:CaF2) solid-state laser, Divalent samarium doped calcium fluoride (Sm:CaF2) laser, or F-Center laser.

A Semiconductor Laser can include laser medium types such as GaN, InGaN, AlGaInP, AlGaAs, InGaAsP, GaInP, InGaAs, InGaAsO, GaInAsSb, lead salt, Vertical cavity surface emitting laser (VCSEL), Quantum cascade laser, Hybrid silicon laser, or combinations thereof.

For example, in one embodiment a single Nd:YAG q-switched laser can be used in conjunction with multiple semiconductor lasers. In another embodiment, an electron beam can be used in conjunction with an ultraviolet semiconductor laser array. In still other embodiments, a two-dimensional array of lasers can be used. In some embodiments with multiple energy sources, pre-patterning of an energy beam can be done by selectively activating and deactivating energy sources.

FIGS. 19 to 24 show a practical example of an additive manufacturing process and of an apparatus for implementing same. In this practical example, the additive manufacturing process is powder bed fusion, and more specifically, the powder bed fusion process is direct metal laser melting (DMLM). This process and apparatus for implementing same are discussed in reference to a process and apparatus, which may benefit from using the herein described powder 10, however, the person of skill will readily understand that any other suitable additive manufacturing process and/or apparatus may be used instead.

Figure 19:
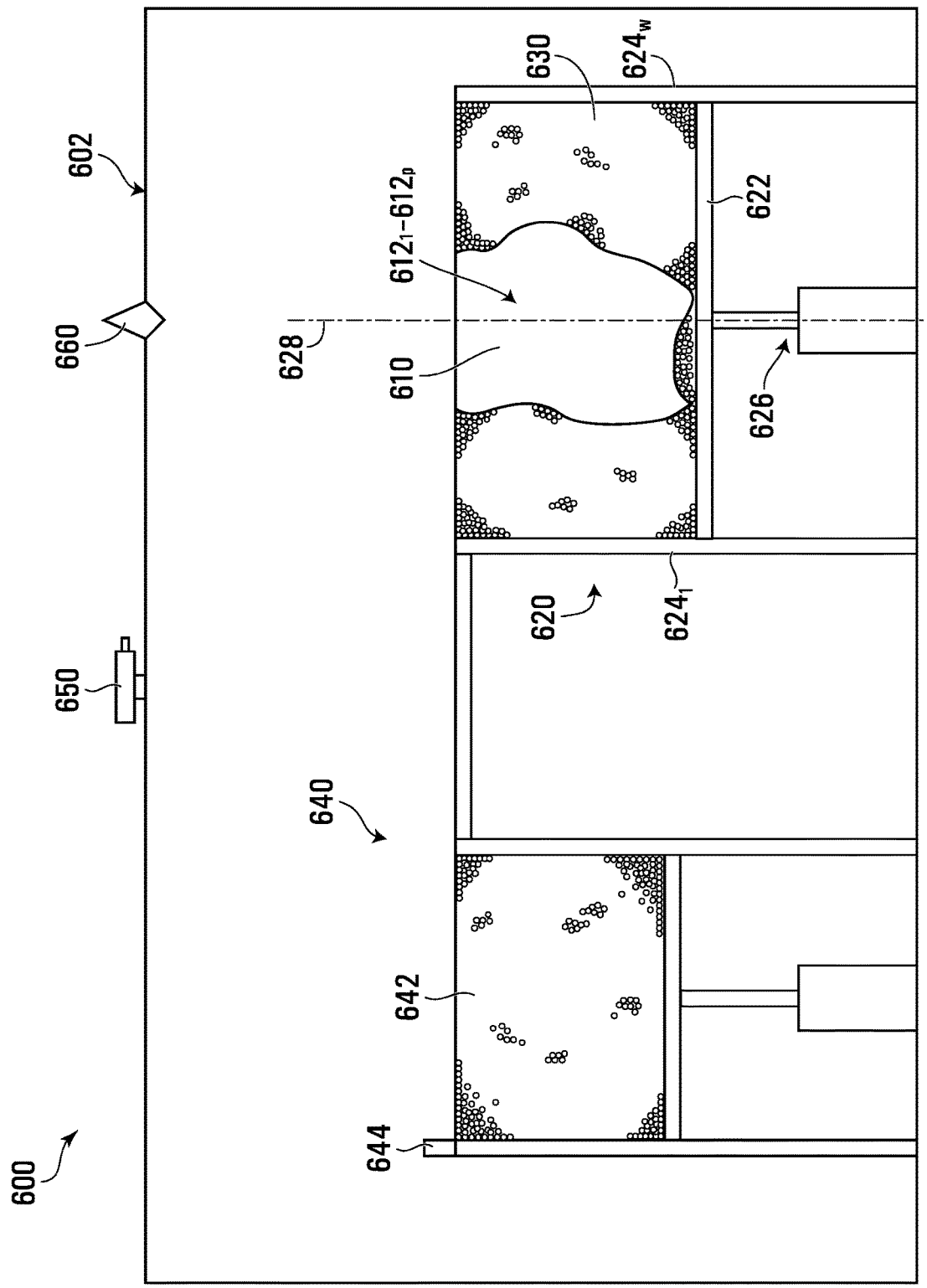
FIGS. 19 to 24 show the operation of an additive manufacturing apparatus in accordance with an embodiment of the present disclosure.

With reference to FIG. 19, there is shown additive manufacturing apparatus 600 which comprises a chamber 602, a build volume 620 comprising a bed platform 622 and walls $624_1$-$624_w$, a powder pool 630, a powder delivery system 640 comprising a volume 642 of powder 10 and powder spreading tool 644, a laser 650, a scanner 660 and an three-dimensional metal part 610 that is being manufactured. The bed platform 622 can be raised or lowered (vertically indexed) within walls $624_1$-$624_w$ or can be fixed, as will be discussed in further detail later in this text. In this particular embodiment, the three-dimensional metal part 610 may be manufactured using a layer-by-layer approach. That is, the three-dimensional metal part 610 may be composed of a plurality of layers $612_1$-$612_p$ which are fused over and under each other. Respective layers $612_1$-$612_p$ of the three-dimensional metal part 610 may be manufactured by laser melting layers $646_1$-$646_L$ of powder 10.

The chamber 602 may contain the build volume 620, the powder pool 630, at least part of the delivery system 640 and optionally the laser 650 and the scanner 660. The chamber 602 may be filled with a pre-selected gas or gas mixture (for example, one or more inert gas such as argon, helium, and the like) and internal pressure of the chamber 602 may be controlled at a pre-selected value. Further, an internal temperature of the chamber 602 may be controlled, either to prevent undesirable chemical reactions which could create undesired by-products and/or to facilitate melting of the powder 642.

In this embodiment, the build volume 620 defines the volume where the three-dimensional metal part 610 is manufactured. The bed platform 622 may define a surface on which the powder pool 630 and the three-dimensional metal part 610 are to rest. Further, the bed platform 622 may be surrounded by the walls $624_1$-$624_w$. The number and shape of the walls $624_1$-$624_w$ depend on the shape of the bed 622. In this non-limiting embodiment, for instance, the bed platform 622 being substantially rectangular is thus surrounded by four flat walls $624_1$-$624_4$.

Figure 20:
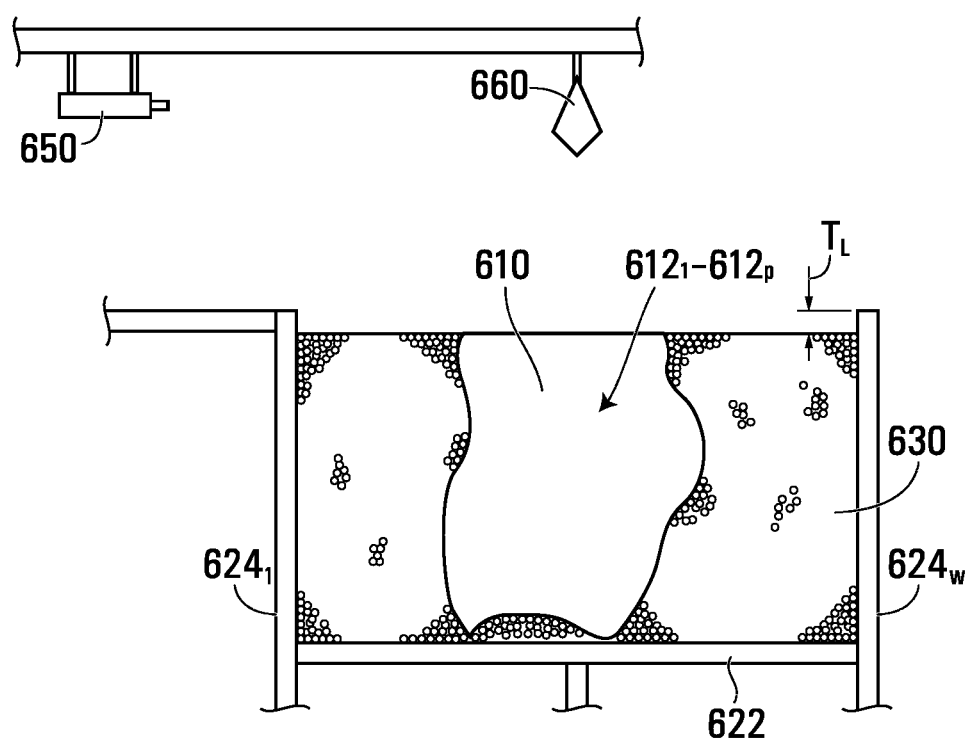

The bed platform 622 may be movable relative to the walls $624_1$-$624_w$. For instance, in this embodiment, the bed platform 622 may be actuated by an actuator 626 such that it moves relative to the walls $624_1$-$624_w$ and to the chamber 602 towards an elevation axis 628, while the walls $624_1$-$624_w$ do not move relative to the chamber 602. Each movement of the bed platform 622 relative to the walls $624_1$-$624_w$ may typically be for allowing manufacture of a new layer 612' of the three-dimensional metal part 610. As such, after a layer $612_i$ of the three-dimensional metal part 610 is manufactured, as shown in FIG. 19, the bed platform 622 may be lowered by the actuator 624 by a dimension $T_L$ corresponding to a thickness of a new layer 612' that is to be manufactured (or to the thickness of each layer $612_i$ where the three-dimensional metal part 610 is manufactured with layers of constant thickness), as shown in FIG. 20.

In variants, the bed platform 622 may be affixed to the chamber 602, while the walls $624_1$-$624_w$ are actuated and moveable relative to the chamber 602—still, the working principle may remain similar.

In this embodiment, the powder pool 630 may be created by the deposition of the powder 10 on the bed platform 622 and within the walls $624_1$-$624_w$. After each layer $612_i$ of the three-dimensional metal part 610 is created by melting a proportion of the powder 10 of each layer $646_i$, a remaining proportion of the powder 10 which is not melted remains in powder form and composes the powder pool 630. The powder pool 630 may serve several functions. At first, the powder pool 630 serves as a reservoir of powder 10 ready to be melted to create a layer $612_i$ of the three-dimensional metal part 610. The powder pool 630 may also support the three-dimensional metal part 610 as it is manufactured: a shape of the end-product may not be self-supportable. Additionally, the powder pool 630 may contribute to dissipate the energy applied on the surface during melting of each layer $646_i$, as heat transfer by conduction is typically more effective than heat transfer by convection and thus heat at the surface of the three-dimensional metal part 610 may be more easily regulated by the powder pool 630 than by other techniques (e.g. by regulating a gas temperature inside the chamber 602).

Figure 21:
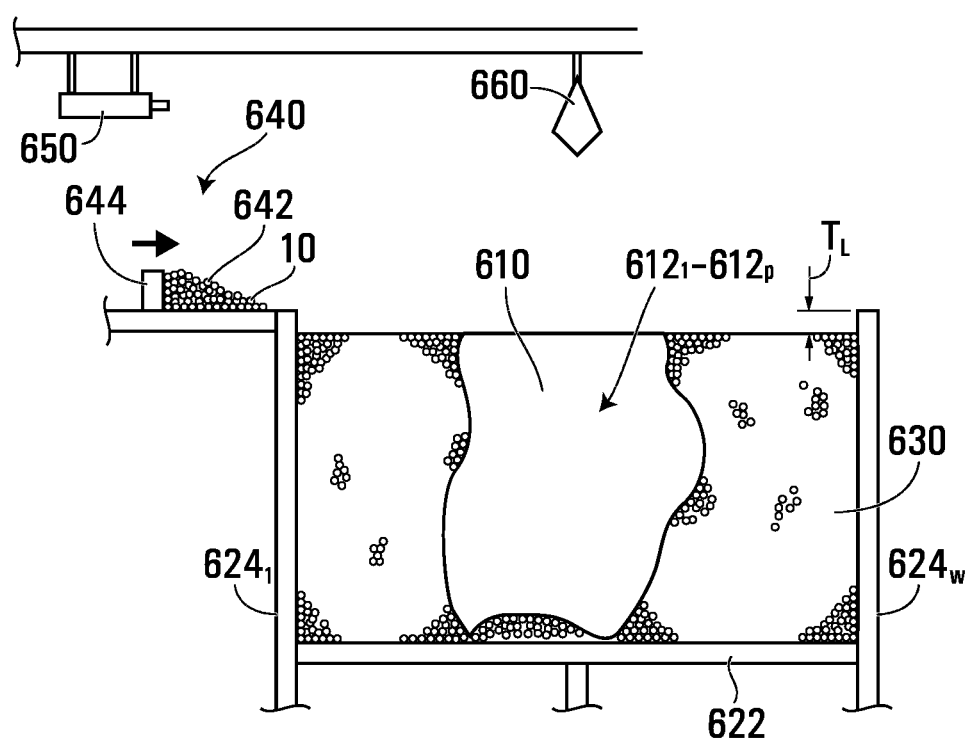
Figure 22:
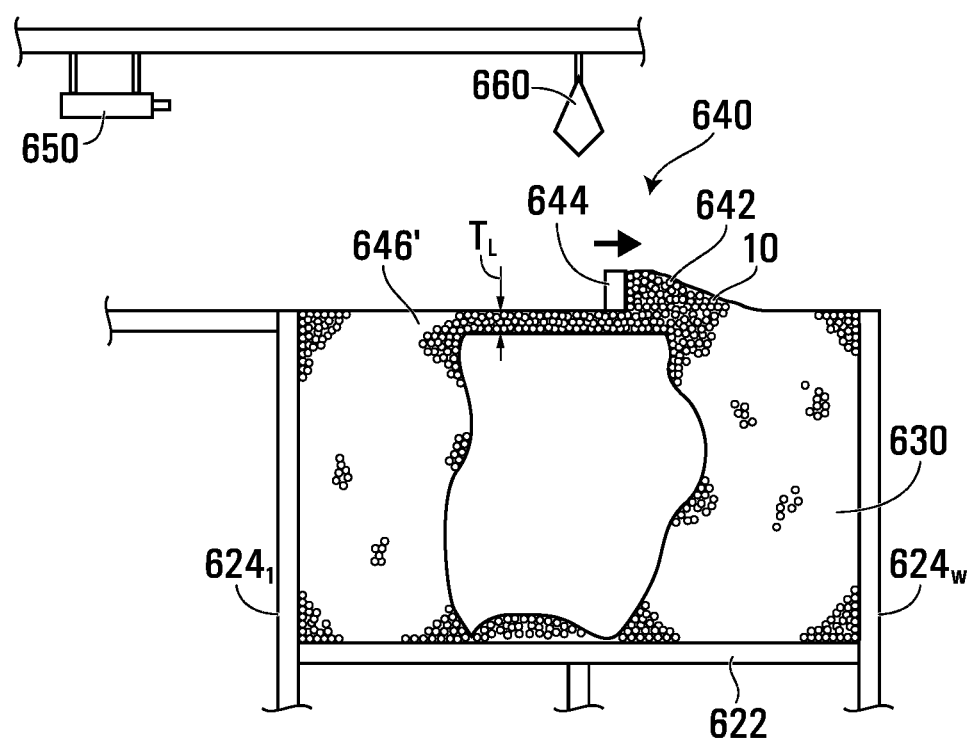
Figure 23:
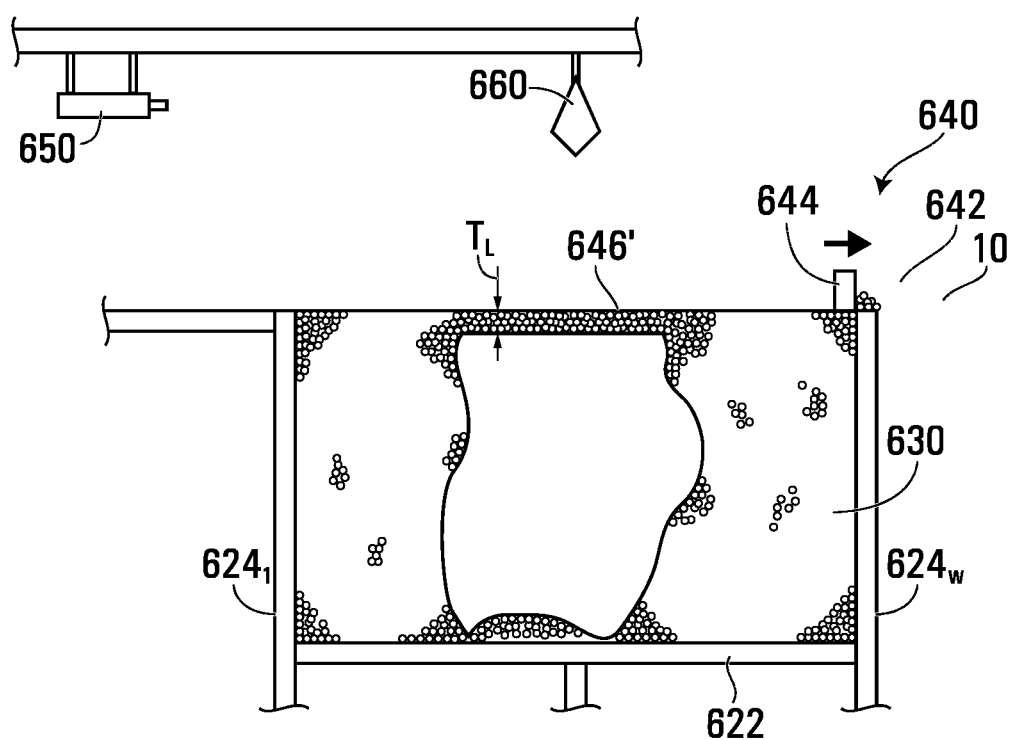

As shown in FIGS. 21 to 23, in this embodiment, the powder delivery system 640 provides powder volume 642 (composed of the same powder 10 than the powder 10 of the powder pool 630) to the powder pool 630 using the spreading tool 644, which may be a roll, a rake or any other suitable device. The spreading tool 644 may be made of rigid material, may be longitudinal and oriented such that a longitudinal axis of the spreading tool 644 is perpendicular to the elevation axis 628 of the bed 622, and may be moveable relative to the build volume 620 in a direction that is perpendicular to the elevation axis 628 of the bed 622. The spreading tool 644 may thus allow the powder delivery system 640 to provide new layers 646' of powder 10 onto the powder pool 630 such that each new layer 646' of powder 10 defines a surface that is flat and perpendicular to the elevation axis 628 of the bed 622. While in this embodiment, the thickness $T_L$ of the new layer 646' is rather defined and/or controlled by the movement of the build platform 620, the powder delivery system 640 may allow sufficient provision and efficient spreading of the powder 10 to ensure that the thickness $T_L$ of the new layer 646' is constant over its entire surface.

Figure 24:
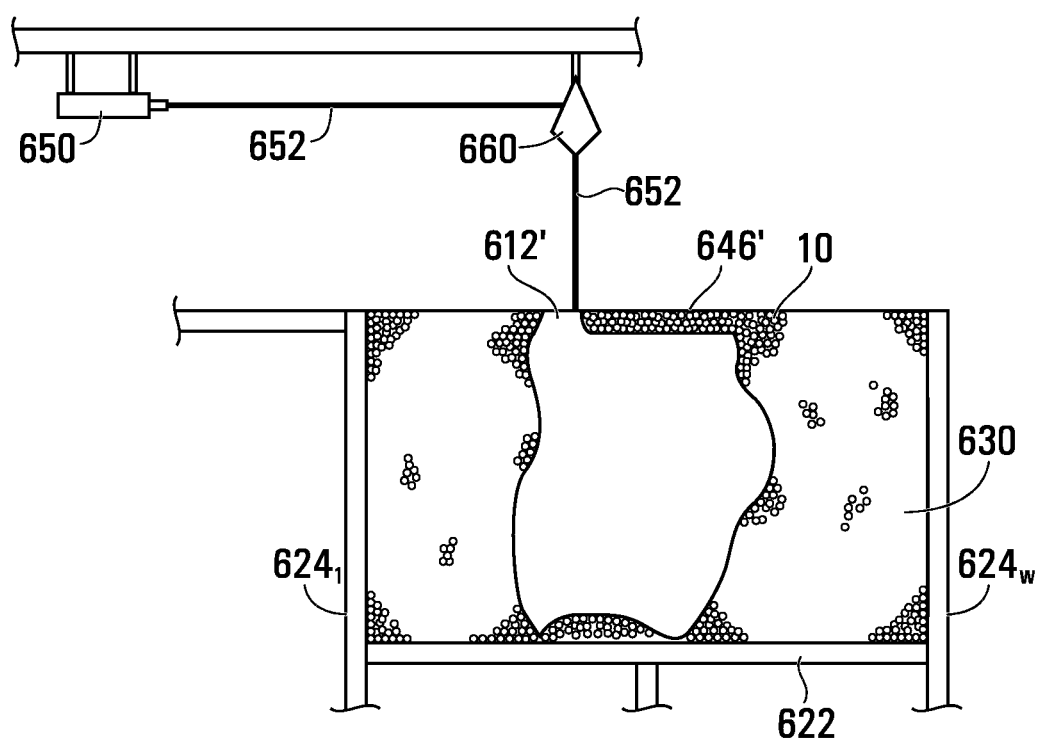

As shown in FIG. 24, in this embodiment, after the new layer 646' of powder 10 is prepared and ready to be melted to form the new layer 612' of the three-dimensional metal part 610, a power supply and/or a controller may activate the laser 650, providing a laser beam 652 of a pre-determined power to the scanner 660. The scanner 660 may redirect the laser beam 652 onto the new layer 646' of powder 10 in order to scan the new layer 646' according to the desired shape of the new layer 612', thereby melting the powder 10 of the new layer 646' in order to form the new layer 612'. The laser beam 652 may run through the new layer 646' of powder at a pre-determined speed, depending on the powder 10, on the thickness $T_L$ of the new layer 646' and on the pre-determined power of the layer beam 652, in order to sufficiently melt the particles 20 of the layer 10.

In some embodiment, because of the improved characteristics described herein, the powder 10 may allow improvements to one or more of the additive manufacturing process, of the manufacturing apparatus 600 and of the three-dimensional metal part 610 manufactured. For example, in the additive manufacturing industry, since powder is the raw material at the origin of the additive manufacturing processes and since a cost of powder feedstock is often the most important expense over the lifecycle of an additive manufacturing machine, an improved consistency of the powder may have an impact on most of the operations of the additive manufacturing processes.

For example, when a powder is sensitive to ambient humidity, additive manufacturing users may need to reset the powder by drying it to remove water adsorbed at the surface of particles of the powder. At least some of the herein described improved properties of the powder 10 may render such step obsolete, notably because the particles 20 of the powder 10 may have a hydrophobic surface which prevents water adsorption thereon and as such, there is no strict requirement for a drying step.

As another example, when a powder is sensitive to ambient humidity, water will adsorb to the surface of the powder. Indeed, it has been proposed in the literature that powders may have an hydration layer consisting of three different zones defined by water molecules mobility. The first zone consists of molecules rigidly bound to the surface or hydroxyl groups. This layer is considered irreversibly bound and remains at the surface even with prolonged heating in an oven. The second layer gains mobility but remains confined by the rigidity of the first layer while the third layer is considered free, and can be removed upon heating at 65° C. However, all three layers are easily recovered when exposed to air at ambient temperatures. In an additive manufacturing apparatus, the powders are likely to be fully hydrated, unless very stringent drying protocols are put in place. Even then, the first hydration layer will typically remain. When the laser strikes the powder grain, all the adsorbed water suddenly evaporates and is likely to dissociate. This will contribute to the vapor jet that carries highly oxidized metal projections. This absorbed water thus may cause an environment of the additive manufacturing process to be spoiled. Indeed, as the laser encounters adsorbed water, the latter is vaporized and partly dissociates into oxygen and hydrogen elements. The released oxygen and hydrogen are then free to react with the un-melted powder and the molten (thus highly reactive) material. Oxygen uptake in un-melted powder is typically the main cause why powders have a limited life cycle, i.e., there is a limited number of cycles available before the powders get out of specification due to high levels of oxygen content. Oxygen uptake into the molten material in certain cases will have detrimental effects on final parts, including embrittlement and fatigue resistance.

At least some of the herein described improved properties of the powder 10 may minimize or avoid such spoilage of the additive manufacturing environment, notably because the absence of water adsorbed on the surface of the particles 20 of the powder 10 contributes to maintaining a chemically clean environment during the additive manufacturing process, which can be advantageous in terms of avoiding undesirable chemical reactions and/or by-products. Without being bound by any theory, the present inventors believe that moisture present on the particles of comparative prior art powders is responsible for most of the oxygen pickup in the three-dimensional part made with additive manufacturing processes and in the un-melted powder resulting therefrom, e.g., laser powder bed fusion and e-beam additive manufacturing processes.

As another example, the high flowability of the powder 10 may minimize or prevent the formation of larger secondary particles (agglomerates) which, in turn, may allow the particles of the powder 10 to be softened (e.g., sintered) or melted using less laser energy than particles of a comparative prior art powder, which often includes aggregates (or "secondary particles"). Those aggregates of the comparative prior art powder may be formed with primary particles that are bound three-dimensionally with some interspaces due to cohesive forces caused by the presence of adsorbed water on the surface of particles. In contrast, one or more of a higher apparent density of the powder 10, a higher absolute weight of the powder 10 for a given build thickness, and a higher heat conductivity of the powder 10 may contribute to saving laser energy during softening and/or melting. For instance, laser power may tend to be overshot to avoid the formation of porosities resulting from voids in the powder bed, which results from stacking faults in cohesive powders. Having less cohesiveness results in a better density therefore a more reliable melting. The laser power can then be lowered accordingly.

As another example, at least some of the herein described improved characteristics of the powder 10 may allow to reduce a maximal temperature at the surface of the layer 612'/646' during melting of the layer 646' by at least 5%, in some embodiments by at least 25%, in some embodiments by at least 50%, and in some embodiments by even more. Diminishing the laser energy required for softening or melting the layer 612'/646' may not only save energy costs but may also help preserve the material and/or reduce by-product formation by lowering maximal peaks of temperatures that are attained in the powder and at the surface underneath the layer of powder. For example, while keeping other parameters constant, the powder 10 may allow a power reduction of the laser 652 of at least 0.5%, in some embodiments of at least 1%, in some embodiments of at least 2%, in some embodiments of at least 5%, in some embodiments of at least 10% and in some embodiments even more.

Additive manufacturing processes may be particularly time consuming since a layer-by-layer approach involves repeated steps. Among such repeated steps, a recoating step involves spreading a thin layer 646' of powder 10 over the three-dimensional metal part 610 and over the powder pool 630 using the spreading tool (e.g. a roller, a rake) 644. As another example, the herein described enhanced flow properties of the powder 10 may allow speeding up this process and, therefore, the additive manufacturing process may be improved by a gain factor that is multiplied by the number of layers $612_1$-$612_p$ in the three-dimensional metal part 610.

In a similar manner, among the repeated steps, a scanning step involves scanning the new layer 646' of powder 10 with the laser beam 652 at a pre-determined speed to melt the powder 10 of the new layer 646' and form the new layer 612' of the three-dimensional metal part 610. In this embodiment, because the particles 20 of the powder 10 may be softened or melted using less energy, a scanning speed of the laser beam 652 may be increased, thereby speeding up the scanning step. For instance, in some embodiments, while keeping other parameters constant, the powder 10 may allow the scanning speed of the laser beam 652 to increase by at least 0.5%, in some embodiments of at least 1%, in some embodiments of at least 2%, in some embodiments of at least 5%, in some embodiments of at least 10% and in some embodiments even more.

As another example, the herein described increased apparent density of the powder 10 may increase a thermal conductivity of the powder pool 630 and may improve consistency of this characteristic of the powder pool 630. A high thermal conductivity and consistency thereof may ease prediction of thermal cycles underwent by the powder 10 and by layers $612_1$-$612_p$ of the three-dimensional metal part 610. For instance, in some embodiments, a ratio of the thermal conductivity of the powder pool 630 filled with powder 10 over a thermal conductivity of the powder pool 630 filled with similar but non-treated powder may be at least 1.05, in some embodiments at least 1.10, in some embodiments at least 1.15, in some embodiments at least 1.20, and in some embodiments even more.

Much research effort has been spent on topological optimization for end-products made using additive manufacturing, with a strong bias towards the aerospace industry, where a strength to weight ratio is paramount. Since regulations regarding all structural elements within aircrafts are extremely stringent, all structural elements need to be manufactured with standardized materials and processes. Unfortunately, inconsistencies currently arise from the additive manufacturing processes and restrict the use of additive manufacturing parts to non-structurally critical components.

As another example, at least some of the herein described improved characteristics of the powder 10 may allow the variability related to characteristics of the material (i.e. the powder used for manufacturing the three-dimensional metal part 610) to be substantially reduced. As such, the powder 10 may allow increased batch-to-batch consistency and more stable product performances by reducing the variance associated with issues relating to poor apparent density and/or powder flowability issues, such as erratic flowability values in funnel measurements, powder not flowing, sensitivity to humidity and sensitivity to humidity exposure history. This may translate to a better process control in the additive manufacturing apparatus and thus results in fewer defects and failures in the end-product.

For example, better flow properties may reduce the proportion of aggregates 28 that are found in the particles. For instance, in some embodiments, the weight ratio of aggregates 28 that are at least 5 times bigger in size than the average particle is no more than 5 wt. %, in some embodiments no more than 2 wt. %, in some embodiments no more than 1 wt. %, in some embodiments no more than 0.1 wt. %, in some embodiments no more than 0.01 wt. %, and in some embodiments even less (e.g. 0%).

Metal Part

As discussed elsewhere in this text, the herein described improved physical characteristics of the powder of the disclosure and/or improved additive manufacturing process and apparatus afford a three-dimensional metal part having improved characteristics.

For example, a three-dimensional metal part may have a better surface finish when it is manufactured using a powder in accordance with the present disclosure as shown, for example, in FIGS. 32A to 32D relative to the surface finish obtained when the part is manufactured using a comparative prior art powder as shown, for example, in FIGS. 32E to 32H. Additionally, the three-dimensional metal part manufactured with the powder of the present disclosure may have a better ultimate tensile strength (UTS) and/or an elongation at break (A %) due to improved characteristics of the powder which in turn reduce the presence of porosities and/or micro-cracks in the body of the metal part.

For example, the inventors compared the mechanical properties of three-dimensional metal parts made from Al—Si7-Mg powders printed with identical parameters in a blind study. The as-printed parts were subjected to a hot isostatic pressing (HIP) treatment at a 14.75 KSI pressure and 960° F.+/−25° F. for 3 hours. The parts were then solution treated within 1010-1013 for 90 minutes and aged at 317±5° F.

The three-dimensional metal parts obtained were tested according to ASTM E8/E8M-16a. The specimens built with powders according to the present disclosure showed improvements on the order of 12 to 18% on the yield strength and on the order of 8 to 13% on the ultimate tensile strength (See FIGS. 46A and 46B). The gains were observed in all of the x,y,x=y (w) and z sample directions relative to the build orientation.

In some embodiments, a surface finish of a surface of the three-dimensional metal 610 may be characterized with Ra<D90 of the metal powder used for the additive manufacturing process as is discussed elsewhere in this text.

In some embodiments, a ratio of the surface finish Ra of an external surface of the three-dimensional metal part 610 over a surface finish of an external surface of a similar end product manufactured using a comparative prior art powder may be less than 0.95, in some embodiments less than 0.90, in some embodiments less than 0.85, and in some embodiments even less. For example, a three-dimensional metal part was manufactured using an embodiment of the powder 10 described herein and the inventors obtained a surface finish characterized with Ra of 19-20 micrometers and/or Rz of 126-143 micrometer which is an improvement over the surface finish of a metal part manufactured with comparative prior art powder where the surface finish was characterized with Ra of 25-35 and/or Rz of 238-342 micrometers.

In some embodiments, having low proportion of aggregates in the powder 10, high apparent density of the powder 10 and reduced thickness $T_L$ of the layers $612_1$-$612_p$ and $646_1$-$646_L$ may allow the three-dimensional metal 610 to have the herein described characteristics.

Figure 25A:
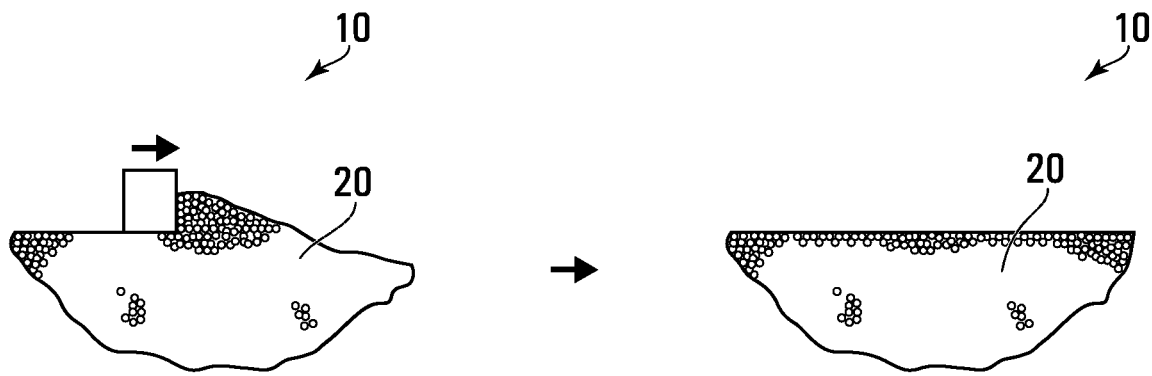
FIG. 25A shows an illustration of the spreading of a layer of powder containing an aggregate.
Figure 25B:
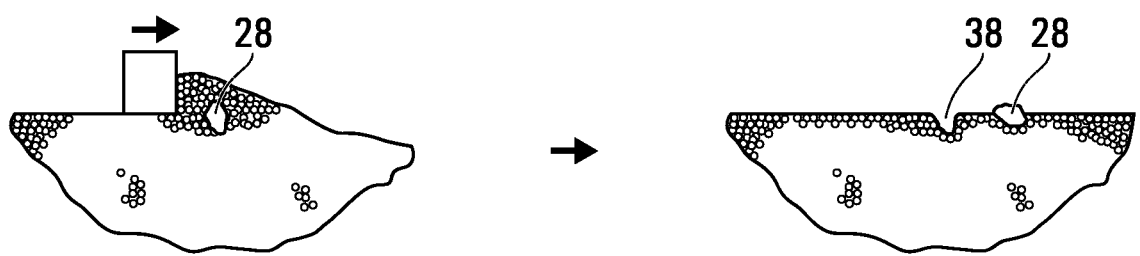
FIG. 25B shows an illustration of the spreading of a layer of powder free of aggregates in contrast to FIG. 25A and in accordance with an embodiment of the present disclosure.
Figure 26A:
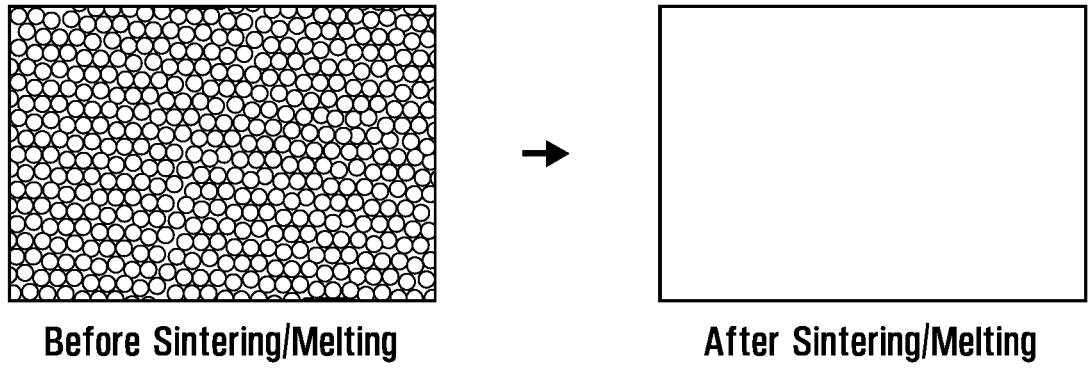
FIG. 26A shows an illustration of the effect of a defect in a layer of powder before and after it is melted or sintered in an additive manufacturing operation.
Figure 26B:
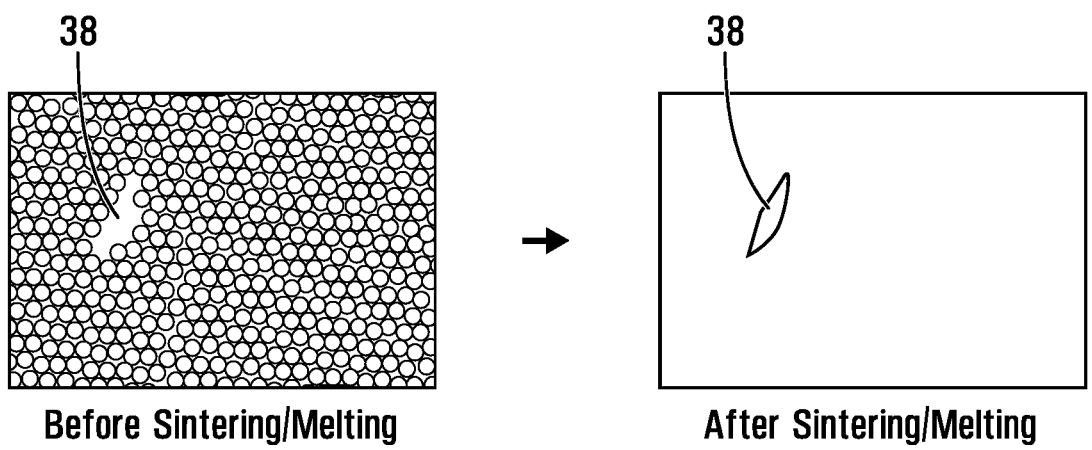
FIG. 26B shows a layer of powder free of defects, in contrast with FIG. 26A, before and after it is melted or sintered in an additive manufacturing operation, in accordance with an embodiment of the present disclosure.

In some embodiments, having low proportion of aggregates 28 in the powder 10 may allow each layer to have a topography of a better quality, such that there is a lower proportion of imperfections caused by aggregates when the spreading tool spreads the particles of the layer. The imperfections on the layer, shown in FIG. 25A (left) may cause imperfections such as porosities and/or micro-cracks 38 in the end-product, as shown in FIG. 25A (right). Those porosities and/or micro-cracks 38 may alter the structure of the end products. The porosities and/or micro-cracks 38 are, however, significantly diminished (if not absent) from the end-product using the powder 10, as shown in FIG. 25B. For instance, in some embodiments the end-product additively manufactured using the powder 10 may be at least 90% porosity-free, in some embodiments at least 95% porosity-free, in some embodiments at least 98% porosity-free, in some embodiments at least 99% porosity-free, and in some embodiments even more (e.g., about 100% porosity-free).

In some cases, increasing amounts of the porosities and/or micro-cracks 38 may diminish an ultimate tensile strength and/or an elongation at break of a metal part structure. This may be observed by comparing tensile test results of the three-dimensional metal part 610 (e.g., a rod) manufactured using additive manufacturing with tensile test results of the same structure manufactured traditionally (e.g., by extruding). Additionally, in some cases, even porosities and/or micro-cracks 38 have little or no effect on the ultimate tensile strength and/or an elongation at break of the structure, porosities and/or micro-cracks may initiate cracks and reduce resistance to fatigue of the structure. This may be observed by comparing fatigue test results of the three-dimensional metal part 610 (e.g. a rod) manufactured using additive manufacturing with fatigue test results of the same structure manufactured traditionally (e.g., by extruding). For this reason, additively manufactured parts with prior art powder often need to be machined for improving surface finish. In this embodiment, the three-dimensional metal part 610 manufactured using additive manufacturing with a powder 10 may not need to be machined after being additively manufactured.

In a similar fashion, in this embodiment, a metallic microstructure of the three-dimensional metal part 610, including the metallic material of the three-dimensional metal part 610 and the porosities of the three-dimensional metal part 610 if there are any, may have properties (e.g., mechanical properties) close to those of a bulk of the metallic material. For instance, in some embodiments, a ratio of an ultimate strength of the metallic microstructure of the three-dimensional metal part 610 manufactured by additive manufacturing using the particles 10 over an ultimate strength of the metallic material in a bulk may be at least 80%, in some embodiments at least 90%, in some embodiments at least 95%, in some embodiments at least 99%, and in some embodiments even more (e.g. more than 100%). In some embodiments, a ratio of an elongation at failure of the metallic microstructure of the three-dimensional metal part 610 manufactured by additive manufacturing using the particles 10 over an elongation at failure of the metallic material in a bulk may be at least 80%, in some embodiments at least 90%, in some embodiments at least 95%, in some embodiments at least 99%, and in some embodiments even more. In some embodiments, a ratio of a toughness of the metallic microstructure of the three-dimensional metal part 610 manufactured by additive manufacturing using the particles 10 over a toughness of the metallic material in a bulk may be at least 80%, in some embodiments at least 90%, in some embodiments at least 95%, in some embodiments at least 99%, and in some embodiments even more. In some embodiments, a ratio of a maximal stress amplitude before failure after $10^6$ cycles of the metallic microstructure of the three-dimensional metal part 610 manufactured by additive manufacturing using the particles 10 over a maximal stress amplitude before failure after $10^6$ cycles of the metallic material in a bulk may be at least 80%, in some embodiments at least 90%, in some embodiments at least 95%, in some embodiments at least 99%, and in some embodiments even more.

As another example, the powder 10 may have properties (e.g. flowability, apparent density, PSD, low proportion of aggregate, etc.) allowing reducing thickness $T_L$ of the layers $612_1$-$612_p$ and $646_1$-$646_L$. For instance, in some embodiments, the thickness $T_L$ of the layers $646_1$-$646_L$ may be no more than 50 μm, in some embodiments be no more than 40 μm, in some embodiments be no more than 30 μm, in some embodiments be no more than 20 μm, in some embodiments be no more than 10 μm, and in some embodiments even less.

In one embodiment, the low proportion of aggregates in the particles 20, the high apparent density of the powder 10 and the reduced thickness $T_L$ of the layers $612_1$-$612_p$ and $646_1$-$646_L$ may allow the three-dimensional metal 610 to have properties close to those of the powder material in a bulk, i.e., to preserve its ultimate strength, its elongation at break, its toughness and/or its resistance to fatigue.

For instance, in some embodiments, a ratio of an ultimate strength of the three-dimensional metal 610 manufactured by additive manufacturing using the particles 10 over an ultimate strength of a similar end product manufactured traditionally (e.g. by extrusion) may be at least 80%, in some embodiments at least 90%, in some embodiments at least 95%, in some embodiments at least 99%, and in some embodiments even more (e.g. more than 100%). In some embodiments, a ratio of an elongation at failure of the three-dimensional metal 610 manufactured by additive manufacturing using the powder 10 over an elongation at failure of a similar end product manufactured traditionally (e.g. extruding) may be at least 80%, in some embodiments at least 90%, in some embodiments at least 95%, in some embodiments at least 99%, and in some embodiments even more. In some embodiments, a ratio of a toughness of the three-dimensional metal 610 manufactured by additive manufacturing using the powder 10 over a toughness of a similar end product manufactured traditionally (e.g. extruding) may be at least 80%, in some embodiments at least 90%, in some embodiments at least 95%, in some embodiments at least 99%, and in some embodiments even more. In some embodiments, a ratio of a maximal stress amplitude before failure after $10^6$ cycles of the end product manufactured by additive manufacturing using the powder 10 over a maximal stress amplitude before failure after $10^6$ cycles of a similar end product manufactured traditionally (e.g. extruding) may be at least 80%, in some embodiments at least 90%, in some embodiments at least 95%, in some embodiments at least 99%, and in some embodiments even more.

Figure 36:
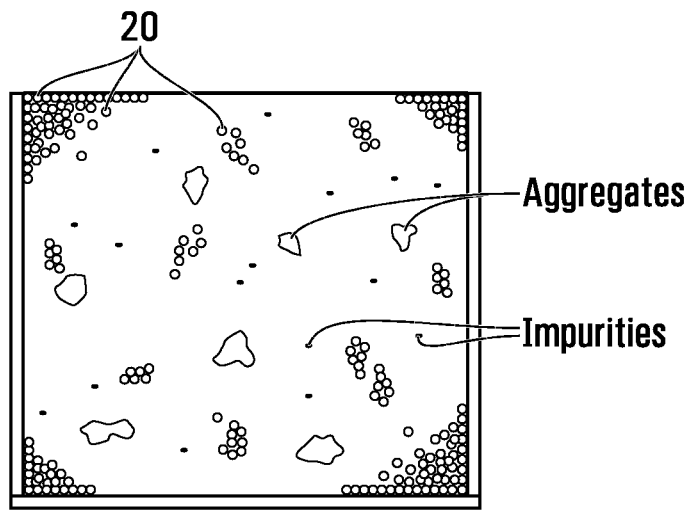
FIG. 36 illustrates segregation of aggregates and impurities in the powder.
Figure 36:
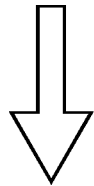
Figure 36:
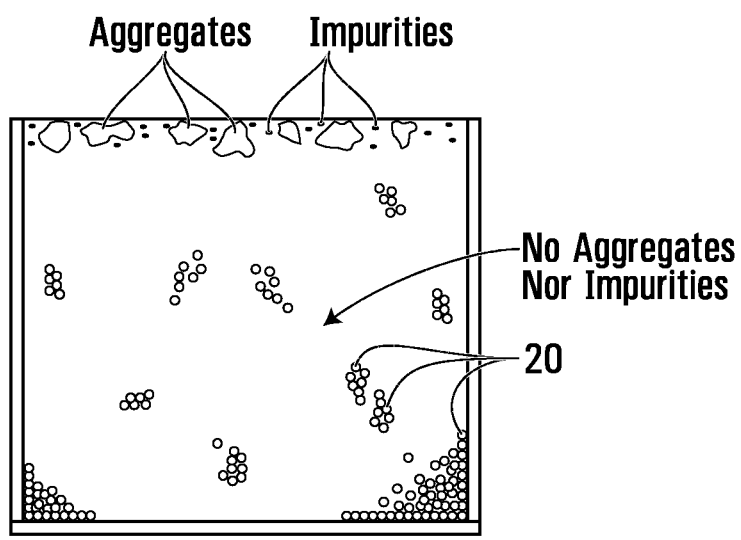

In this embodiment, the powder 10 may exhibit segregating properties, as illustrated in FIG. 36. More specifically, the powder 10 may be so fluid-like that it makes particles with a lower apparent density float and particles with higher apparent density sink. For instance, in one embodiment, impurities and/or aggregates may infiltrate a pool 730 of the powder 10 (for example during use or transportation of the powder 10). The impurities and aggregates may typically have a lower apparent density. After a certain period, when present, impurities and aggregates may segregate to an upper portion of the pool of powder 730.

Practical Implementations

The improved surface finish of three-dimensional metal parts described herein may open the possibility of manufacturing three-dimensional metal parts for industries such telecommunications, aerospace, and the like, which have, inter alia, high stringent needs for high quality surface finishes.

In some embodiments, the herein described improved characteristics of the powder of the disclosure afford one to manufacture a one-piece, integrally formed metallic component, made by powder bed fusion additive manufacturing process using a laser as a source of thermal energy to heat and melt selected areas of a bed of metallic powder to build the metallic component in successive layers. In particular, the metallic component includes an internal cavity which in turn includes side walls, where the side walls have portions configured to preclude surface finishing by using machining tool (e.g., rotary tool, electrical discharge machining, etc.) to reach into the channel from outside the metallic component and machine the side wall portions through a subtractive process. For example, the portions have a surface finish being characterized with Ra<D90 of the powder. The geometry of the cavity is such that there is no possible tool access. In other words, it is not possible to insert a tool from outside the part into the cavity such as to machine the internal surfaces and provide these surfaces with a better finish than the additive manufacturing process finish.

Figure 49:
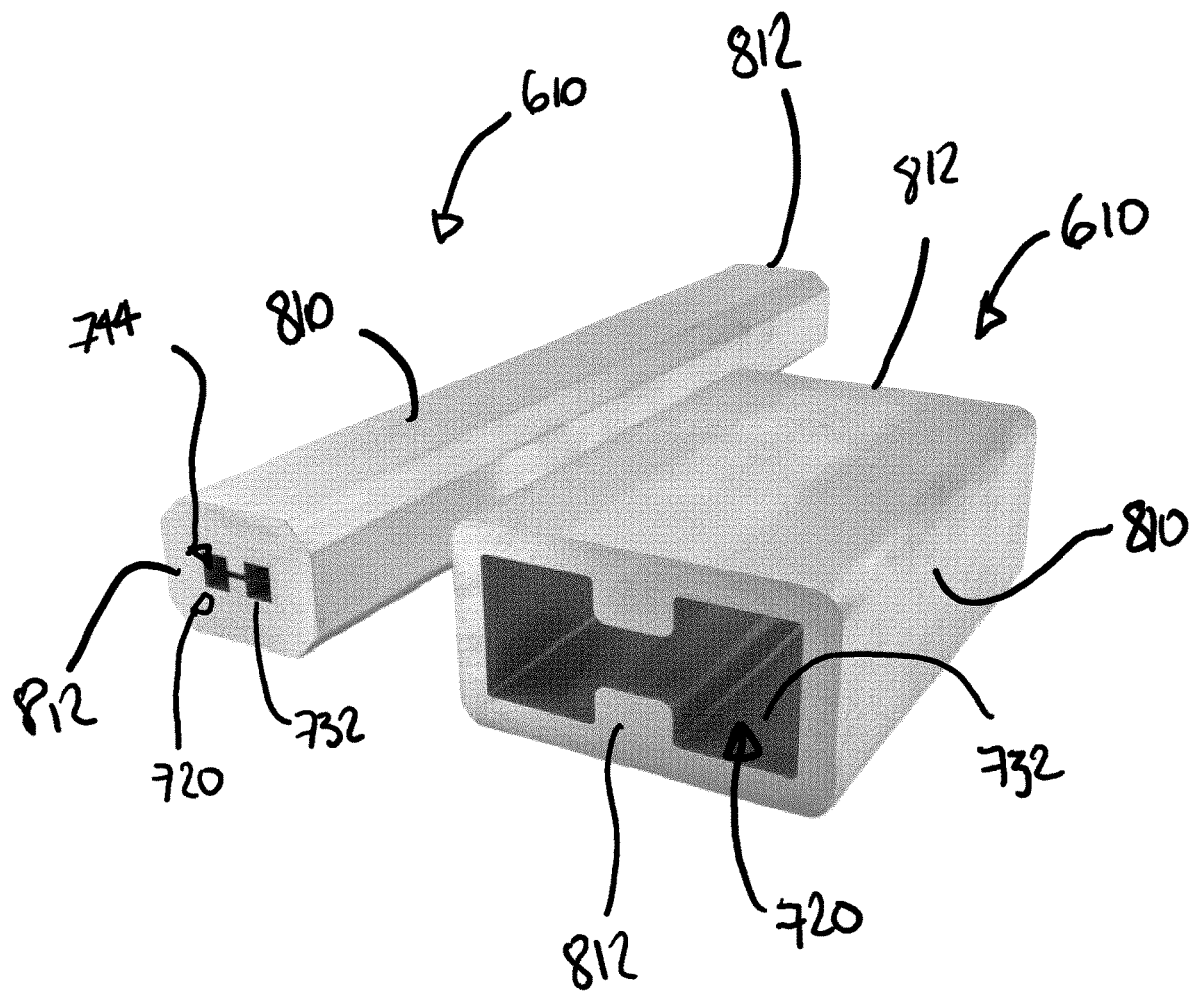
FIGS. 49 to 65 show examples of one-piece additively manufactured parts manufactured with an embodiment of the powder of the disclosure, where the additively manufactured parts comprise a cavity defining an internal surface that is inaccessible from an outside of the additively manufactured parts by machining tools.

To this effect, FIG. 49 illustrates examples of such geometry that impedes such tools access. For example, such geometry may include completely closed cavity or a cavity that is open but has portions that are not directly visible from the opening of the cavity on the outside of the part and through which a machining tool (e.g., rotary tool, electrical discharge machining, etc.) can be inserted or portions that might be visible they the access path is too small or too deep for a machining tool to fit therein. For instance, a channel having an angle, a completely enclosed cavity that does not open at the outside of the part or any other cavity arrangement where portions of the wall cannot be seen from the cavity opening.

In some embodiments, the herein described improved characteristics of the powder of the disclosure afford one to manufacture a one-piece, integrally formed metallic component, made by powder bed fusion additive manufacturing process using a laser as a source of thermal energy to heat and melt selected areas of a bed of metallic powder to build the metallic component in successive layers. The metallic component comprises a surface having an as-built surface finish being characterized with Ra<D90 of the powder. The reader will readily understand that here, the term «as-built» is used to mean the native finish one gets by the powder bed fusion process.

The herein described surface finish can be characterized with Ra<, or <0.90×, or <0.80, or <0.70×, or <0.60×, or <0.50×, or <0.40×, or <0.30×, or 0.25×, or <0.20× the D90 size of the additive manufacturing powder used in the powder bed fusion additive manufacturing process using a laser as a source of thermal energy, which is surprising and unexpected at least because typically one would expect the surface finish to reflect the D90 granulometry of the additive manufacturing powder, in other words one would expect that the irregularities at the surface are substantially of the same size as the D90 size of the powder.

For example, the surface roughness is a key element when manufacturing waveguides for microwave transmission. The presence of undesirable surface roughness may occur due to various reasons, such as polishing of irregular waveguide structures, uneven surface coating or corrugation of surface while fabricating the waveguides. The presence of surface roughness affects the propagation constant and attenuation constant of the waveguide, and change the cut-off frequency of every waveguide mode, thus affecting electromagnetic wave propagation. Passive millimeter-wave and THz components are traditionally fabricated by computer numerical control (CNC), micromachining, electrical discharge machining (EDM), or injection molding.

In some embodiments, the one-piece, integrally formed metallic component is a waveguide, which is a hollow metal pipe used to carry radio waves. Waveguides are almost exclusively made of metal and mostly rigid structures. Due to the skin effect at high frequencies, electric current along the walls penetrates typically only a few micrometers into the metal of the inner surface. Since this is where most of the resistive loss occurs, it is important that the conductivity of interior surface be kept as high as possible.

In some embodiments, as shown in FIGS. 49 to 62, the three-dimensional metal part 610 may be a one-piece part and may comprise a cavity 720. The cavity 720 may comprise a cavity surface 732 defining a peripheral surface of the cavity. At least part of the cavity surface 732 may be inaccessible from an outside of the part 610.

For instance, in some cases, the cavity 720 may be a closed cavity that doesn't connect with an exterior of the part 610. Such a geometry may be achievable using additive manufacturing but may not be achievable using traditional machining (e.g., turning, milling, drilling, etc.) because the cavity 720 doesn't connect with the exterior of the one-piece part 610.

In some cases, also, the cavity 720 may connect with the exterior of the one-piece part 610, but may be configured such that at least a part 744 of the cavity surface 732 is hardly reachable or not reachable at all by a traditional machining tool (e.g., a turning tool, a milling tool, a drilling tool, etc.). As such, in these embodiments, it is impossible to improve a surface finish of the part 744 of the cavity surface 732 using the traditional machining tools.

Figure 50:
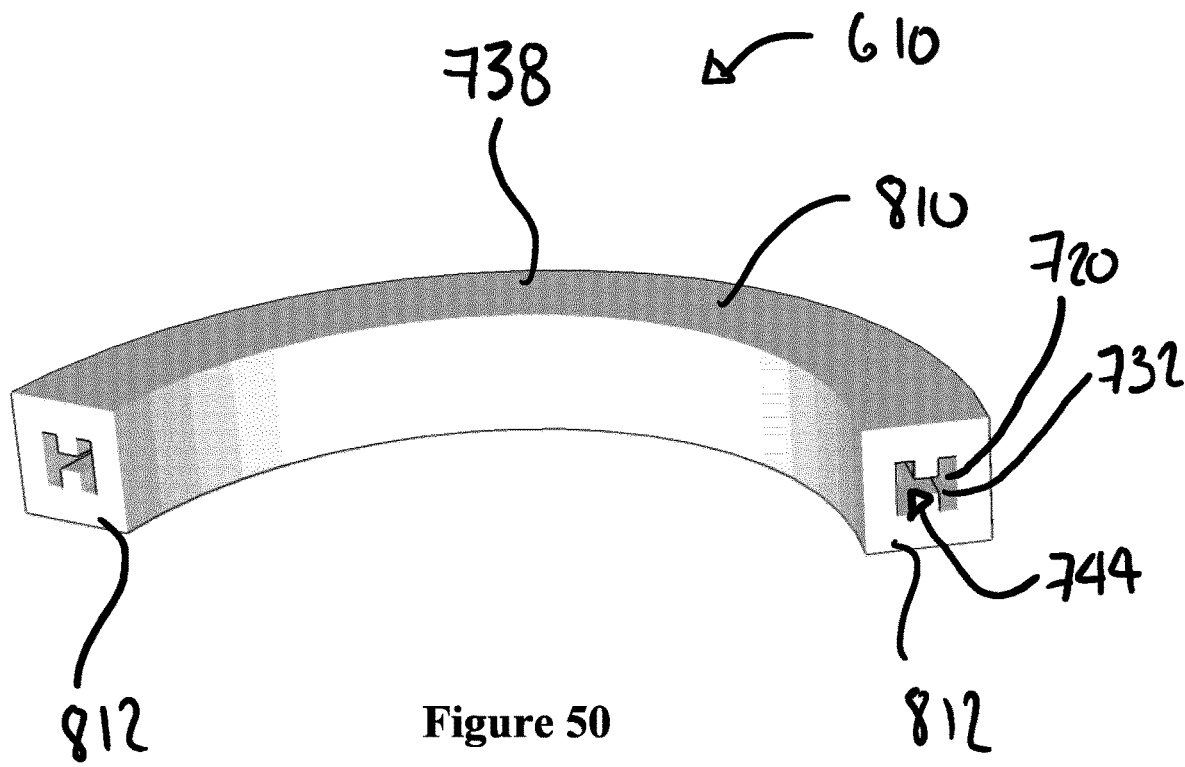
Figure 51:
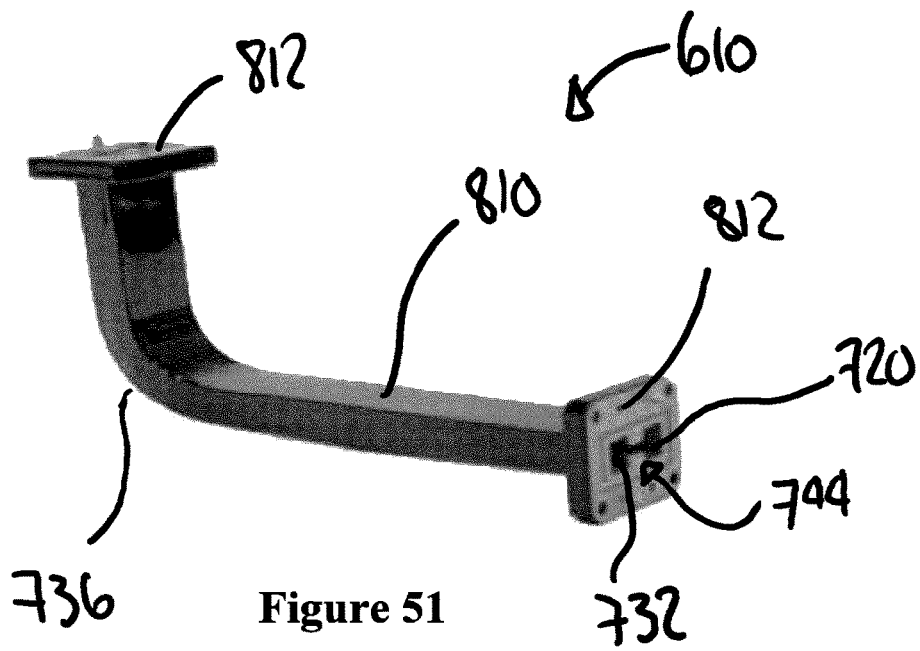
Figure 52:
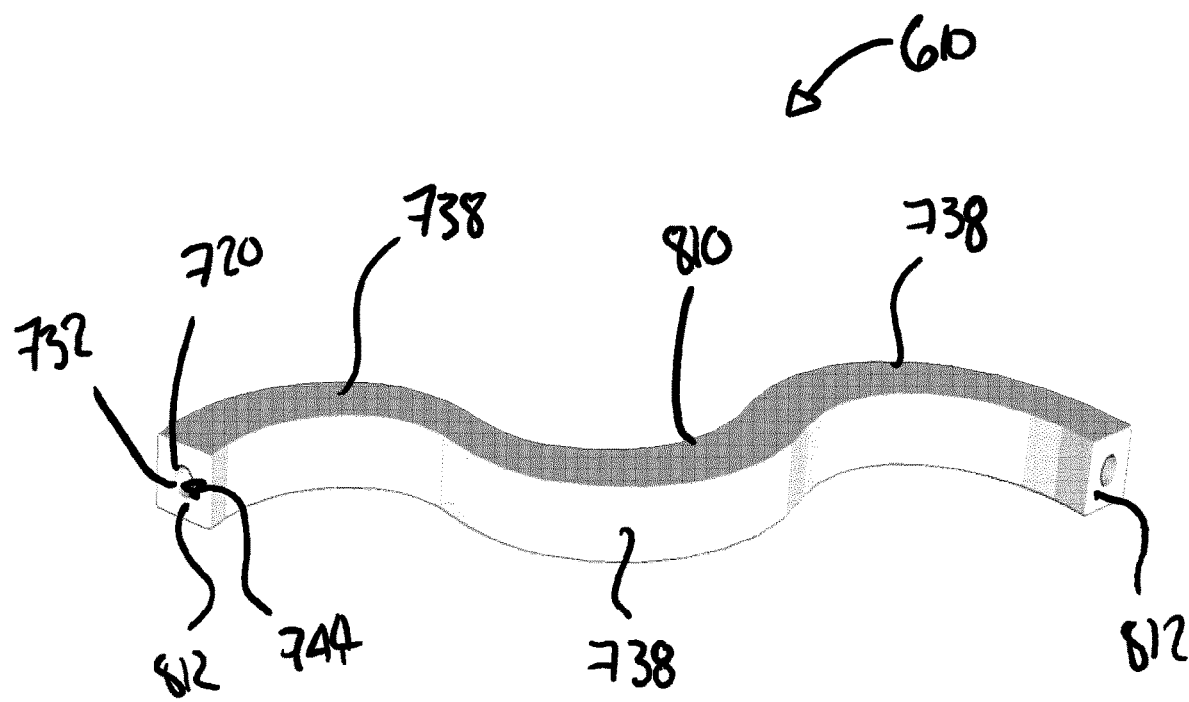
Figure 53:
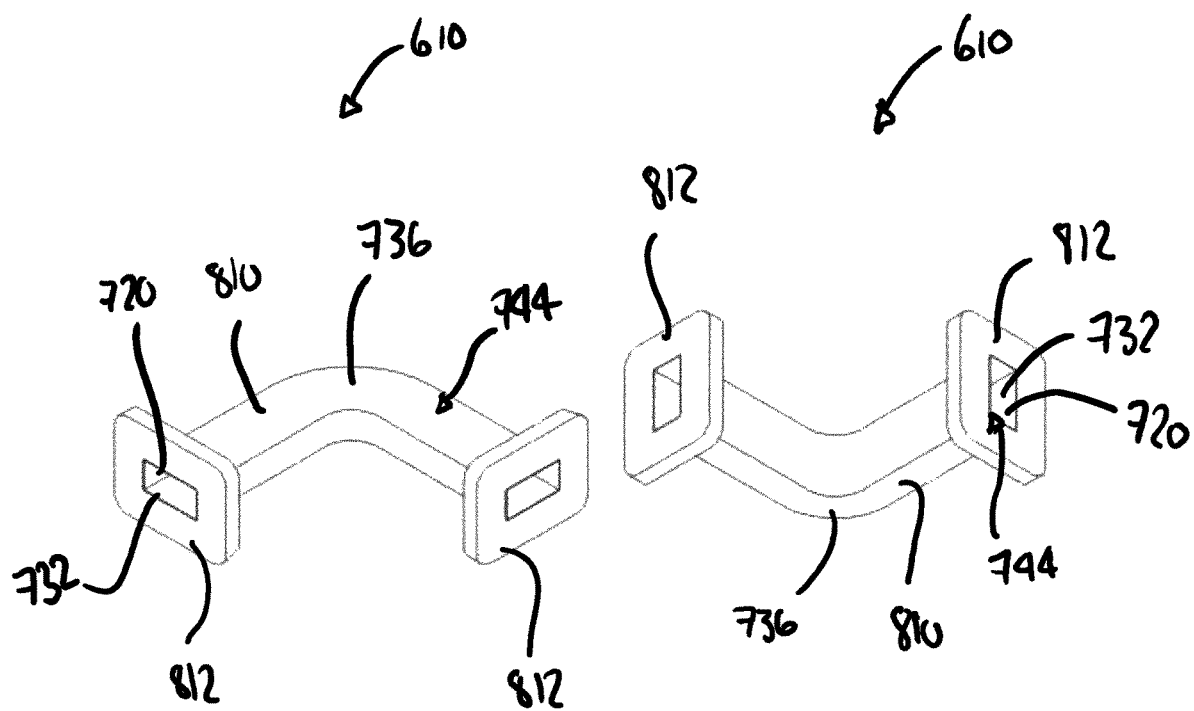
Figure 54:
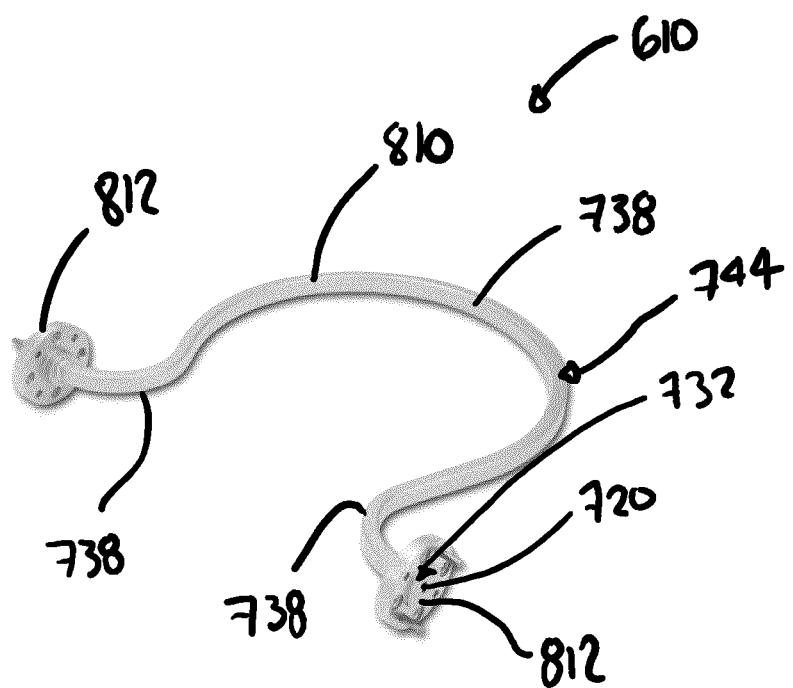
Figure 55:
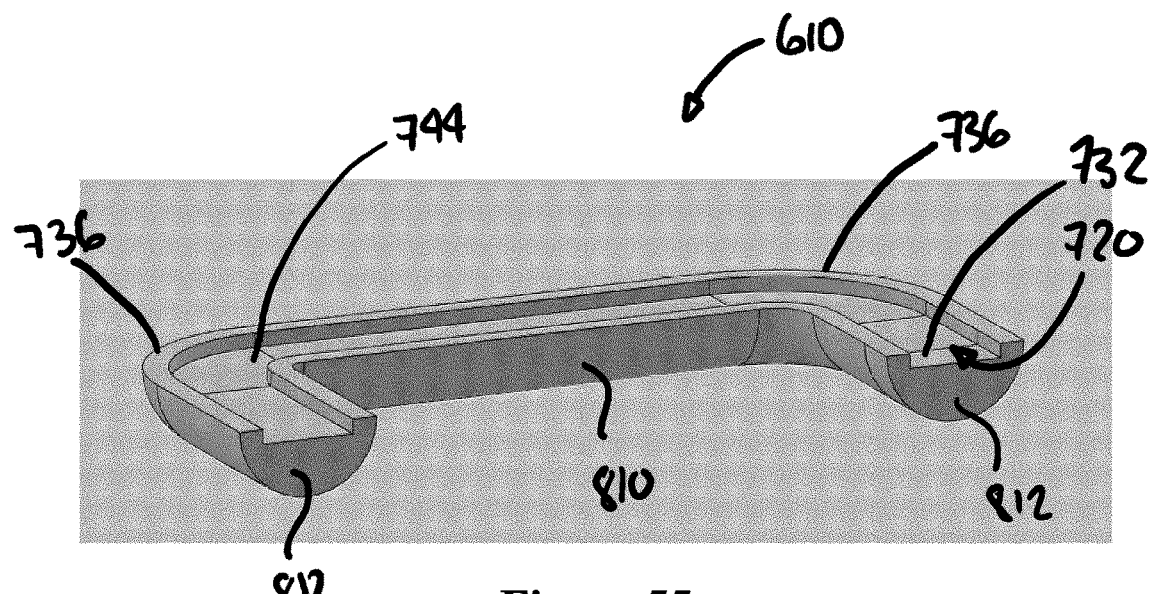
Figure 56:
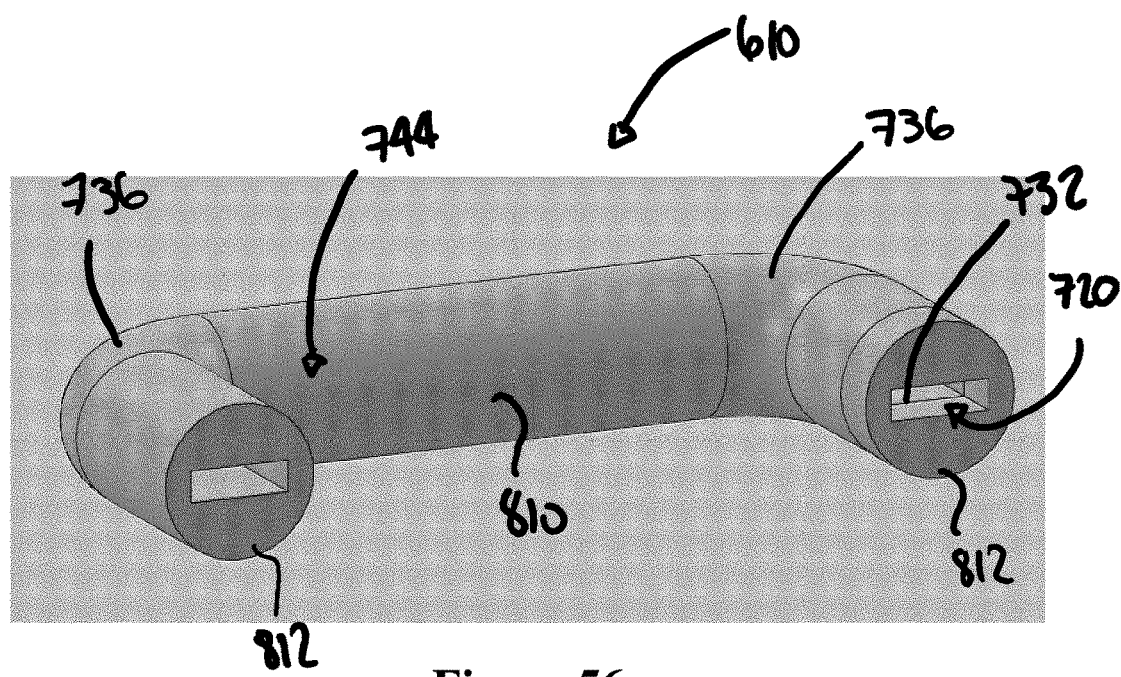
Figure 57:
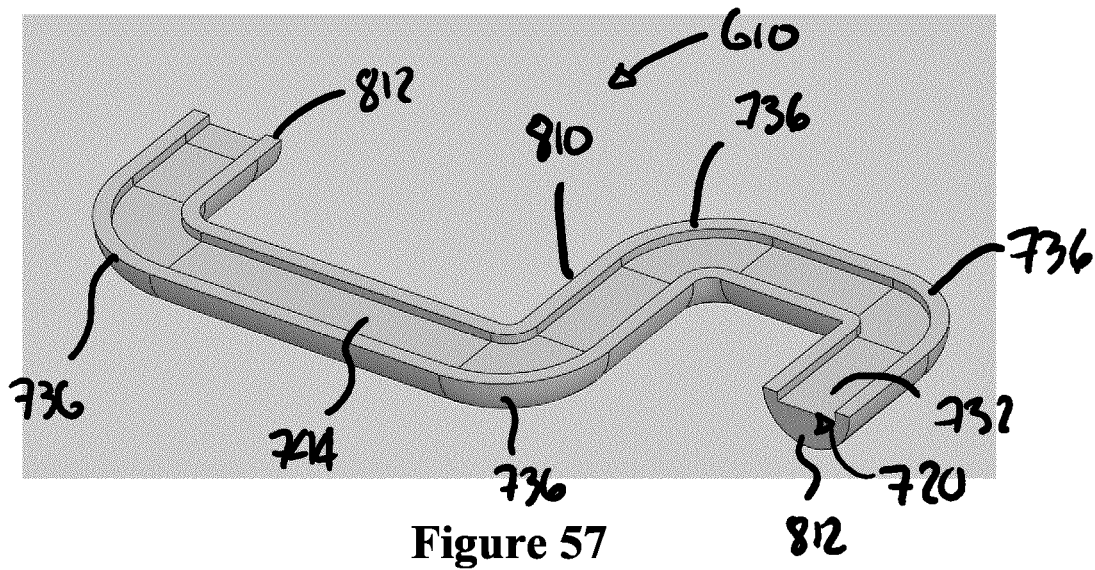
Figure 58:
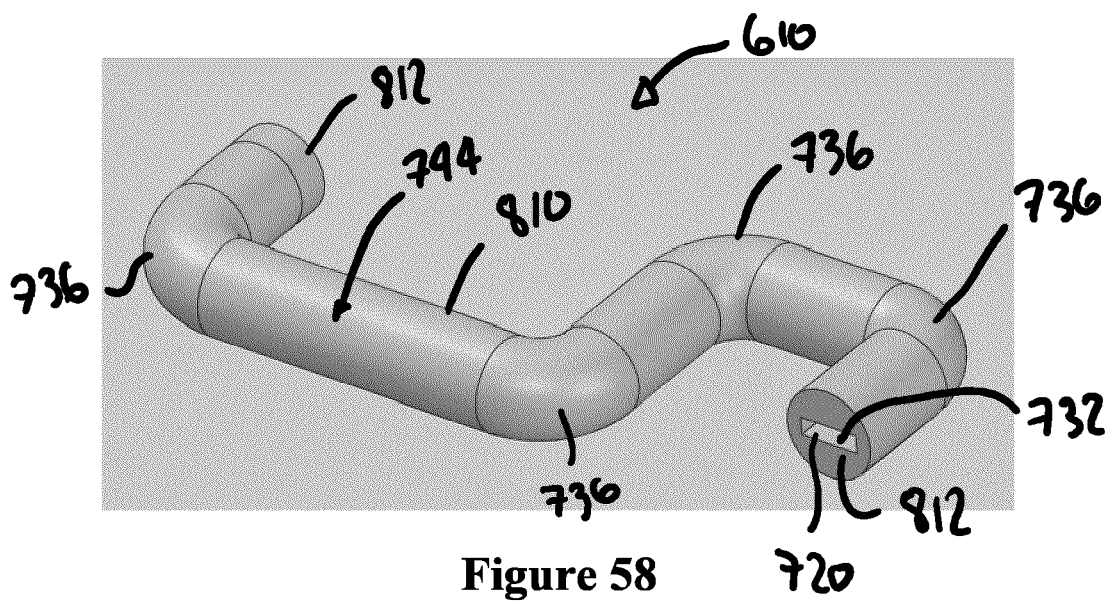
Figure 59:
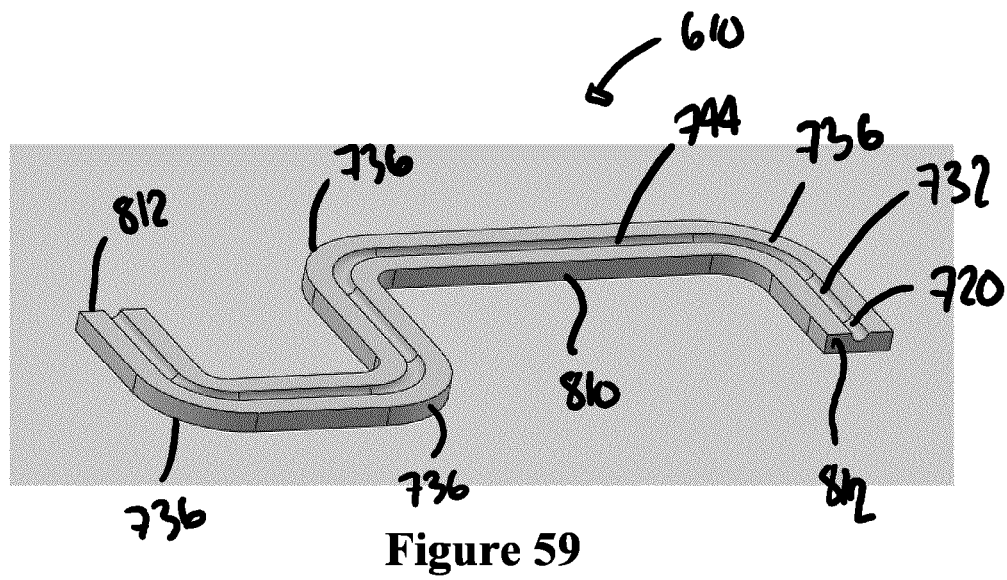
Figure 60:
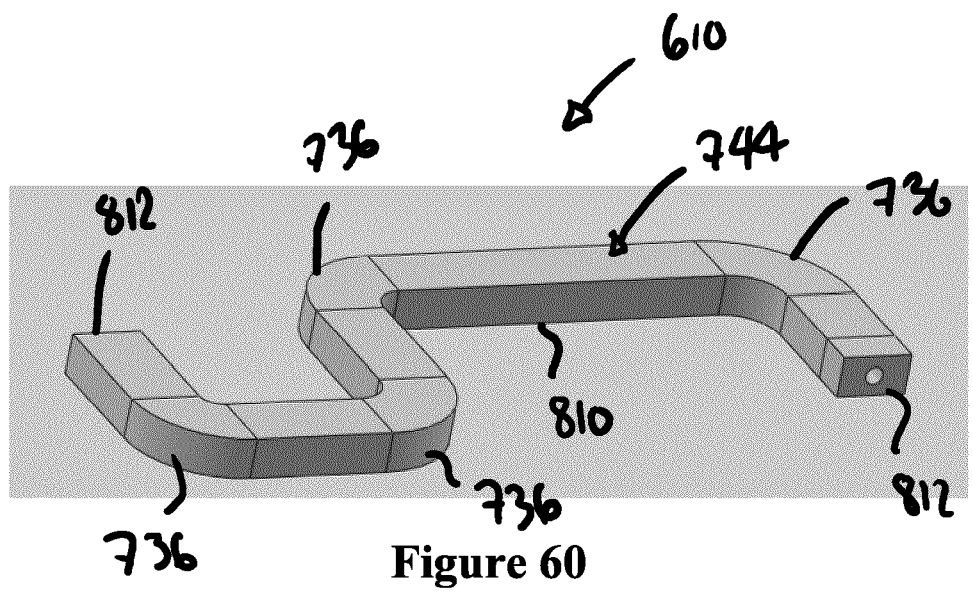
Figure 61:
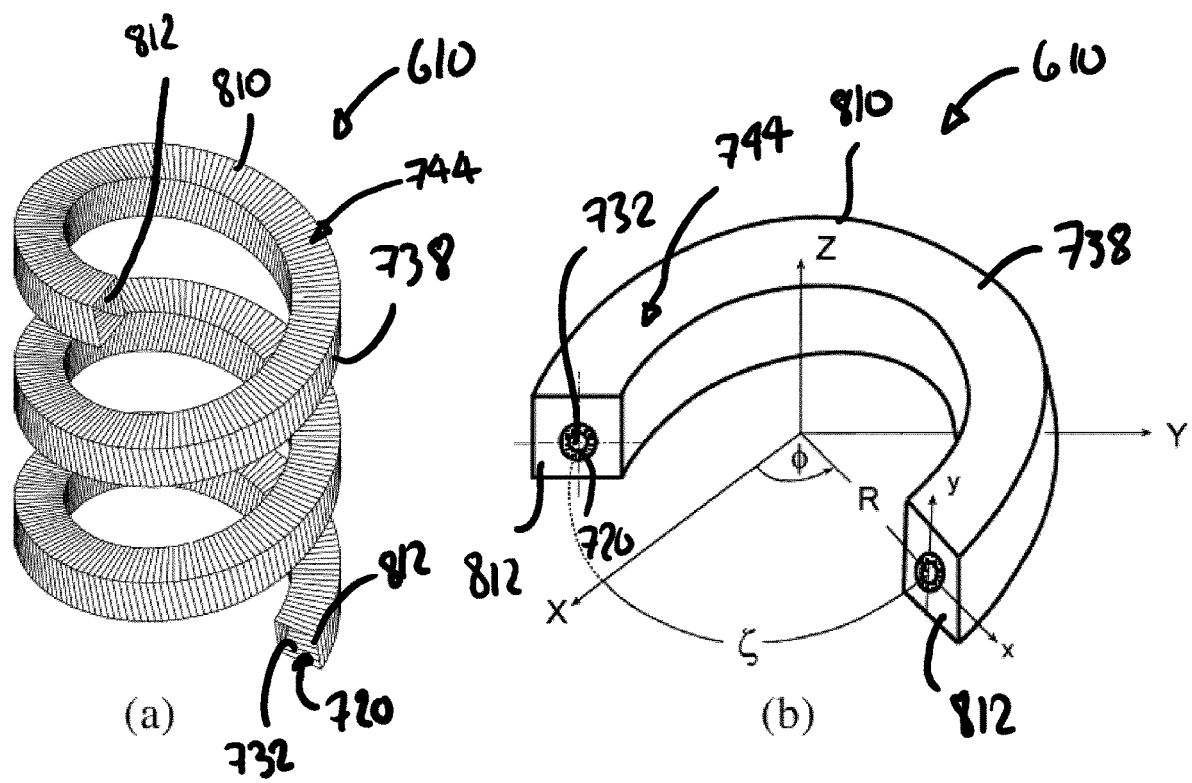
Figure 62:
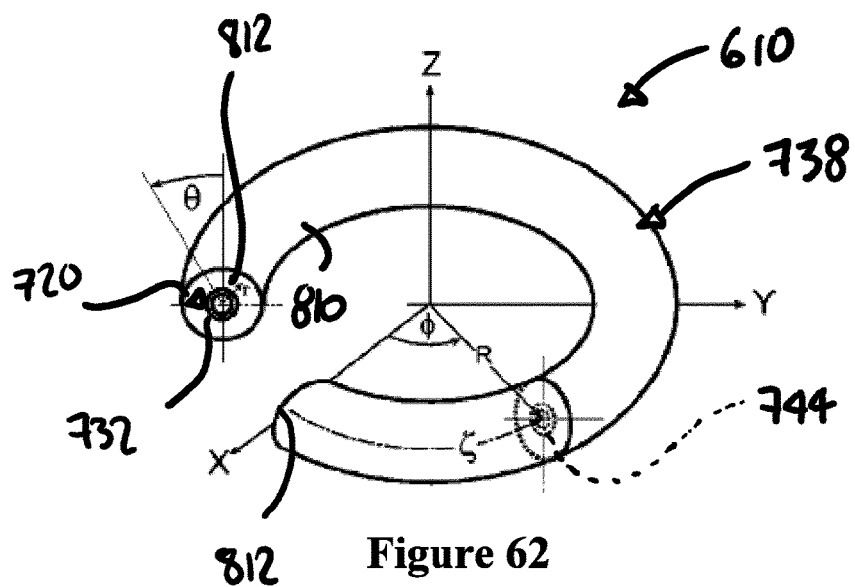
Figure 63:
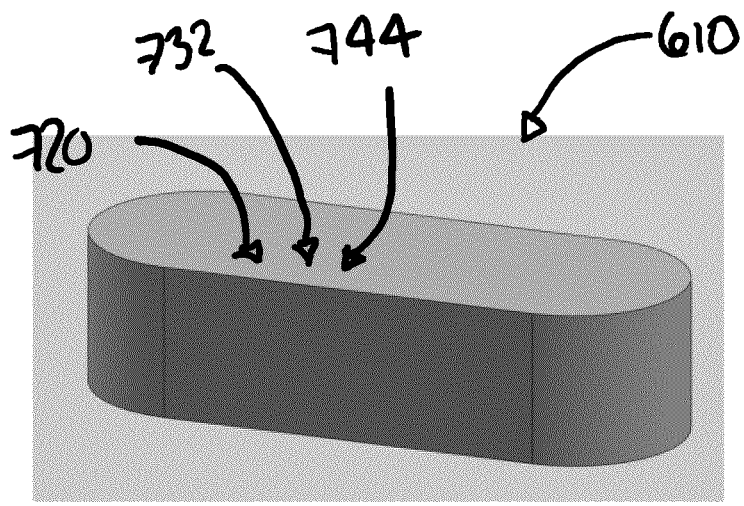
Figure 64:
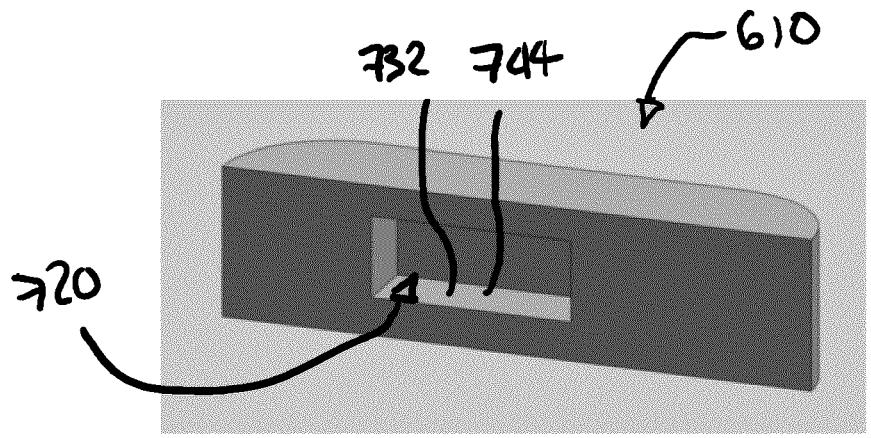
Figure 65:
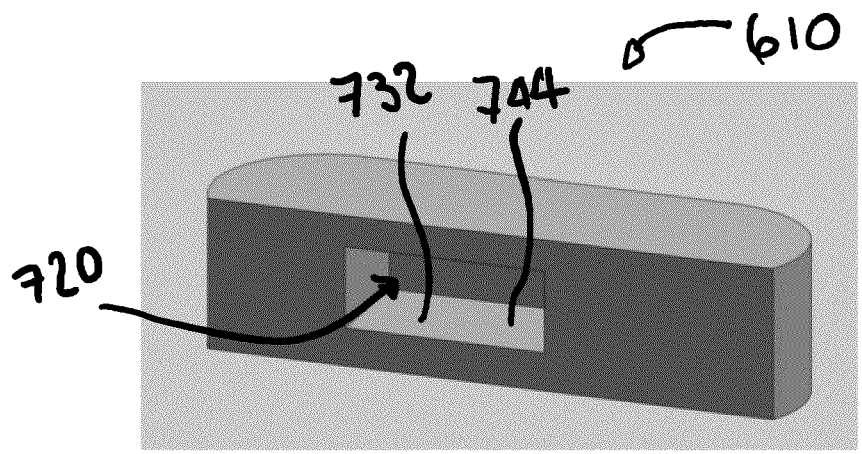
Figure 66:
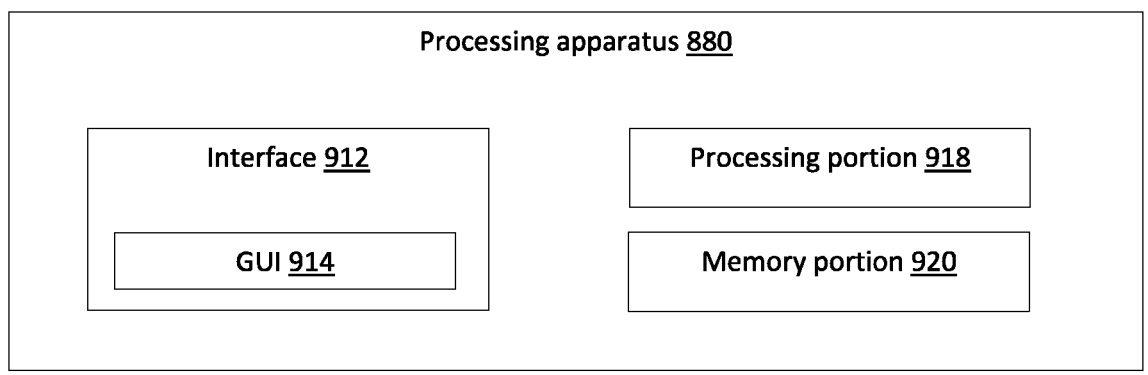
Figure 67:
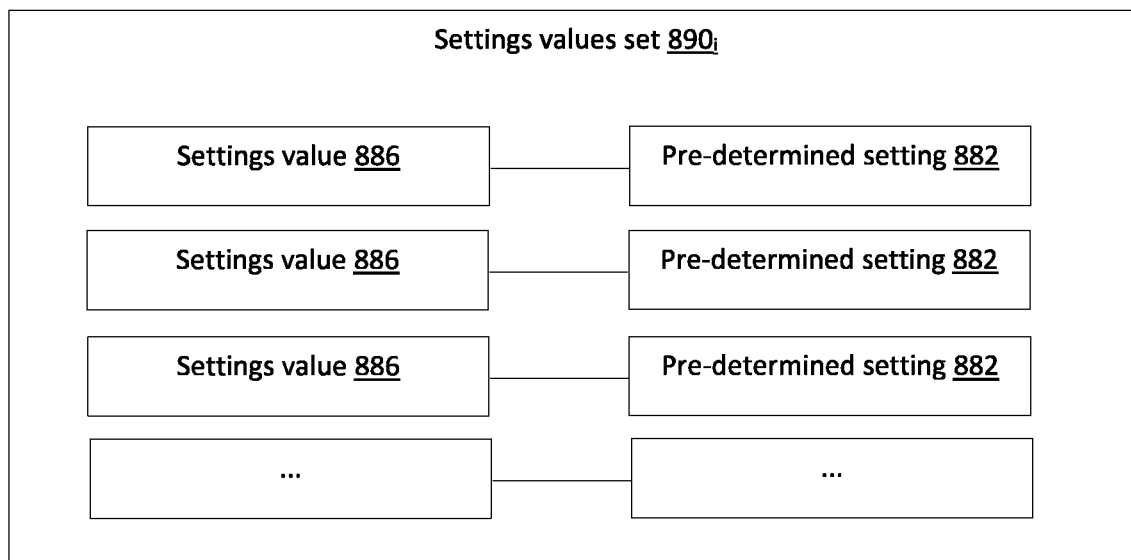
Figure 68:
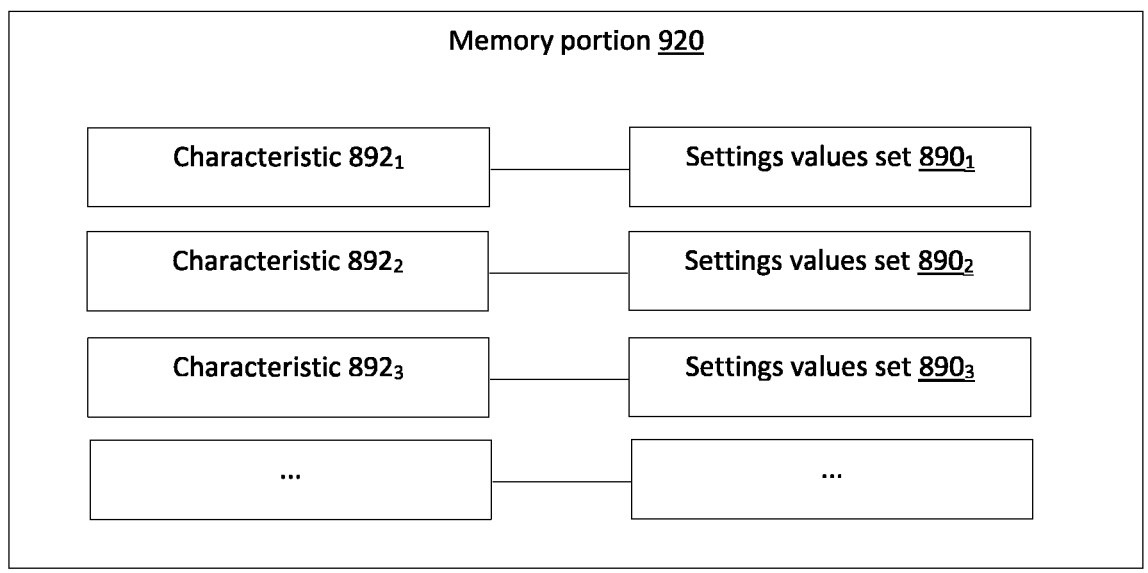
Figure 69:
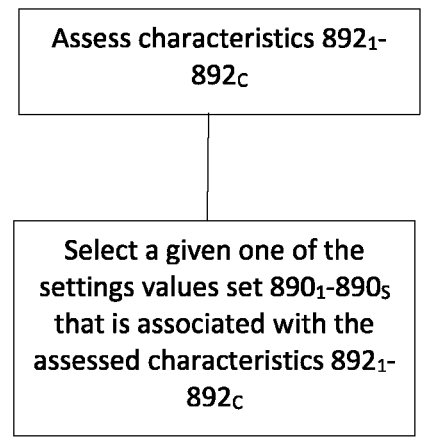
FIG. 69 shows an example of a method to select a set of setting values for operating the additive manufacturing apparatus, in accordance with an embodiment of the present disclosure.

The inaccessibility of the part 744 may be caused by a combination of factors. For instance, in some embodiments, the cavity 720 may be an elongate cavity, as shown in FIGS. 49 to 62. In some embodiments, the elongate cavity 720 may be relatively narrow (e.g., the internal cavity of a rectangular waveguide WR3 has dimensions of 0.034 inches [i.e., 0.8636 mm] and 0.017 inches [i.e., 0.4318 mm]). In some embodiments, the elongate cavity 720 may have a complex shape such as a "H" shape, as shown in FIGS. 49 to 51. Other shapes of the elongate cavity 720 may include, for example, a circular shape, as shown in FIGS. 52 and 59 to 62, a rectangular shape, as shown in FIGS. 53 to 58, or a square shape, as shown in FIG. 61. In some embodiment, the elongate cavity 720 may be relatively long. In some embodiment, the elongate cavity 720 may comprise one, two, three or more bends 736 and/or deviations 738 of at least 5°, at least 15°, at least 30°, at least 45°, at least 60°, at least 90°, at least 135°, at least 180°, at least 360°, or even more.

In some embodiments, the one-piece three-dimensional metal part 610 may be a waveguide. The waveguide 610 may be configured to guide waves, such as electromagnetic waves or sound, with minimal loss of energy by restricting the transmission of energy to one direction. In order to do so, the waveguide 610 may comprise an elongate body 810 having two end-portions 812 configured to receive and/or output waves. The elongate cavity 720 may extend between the end-portions 812. The elongate body 810 may also comprise the bends 736 and/or deviations 738.

Performances (e.g., efficiency, efficacity, durability, etc.) of the waveguide 610 may be correlated with a surface finish of the surfaces of the elongate body 810, including a surface finish of the cavity surface 732. For example, conductor surface roughness may result in parts made with additive manufacturing and in particular from the incorporation of un-sintered metal particles at the surface of the printed part which cause imperfect conductors with the presence of rugosities and/or microcracks. The present inventors expect reducing conductor surface roughness with the use of the herein described additive manufacturing powder in additive manufacturing processes.

DIN 4768 standards establish the methods to characterize the surface roughness. Alternatively, one can use the traditional technique to determine this parameter using a Surface Roughness Testers which use a scanning cantilever in physical contact with the sample to measure the roughness parameter.

Recycling/Reusing Powders

In one aspect, the present disclosure provides a method and a system of powder bed fusion additive manufacturing for automatically collecting powdered materials for reuse after a print cycle.

Improved powder handling can be another aspect of an improved additive manufacturing system. A build platform supporting a powder bed can be capable of tilting, inverting, and shaking to separate the powder bed substantially from the build platform in a hopper. The powdered material forming the powder bed may be collected in a hopper for reuse in later print jobs. The powder collecting process may be automated, and vacuuming or gas jet systems also used to aid powder dislodgement and removal In a practical implementation, a method and system in accordance with the present disclosure may include means to assess a purity of the powder 10 contained in the pool of powder 730 and/or to filter the powder 10.

Figure 37:
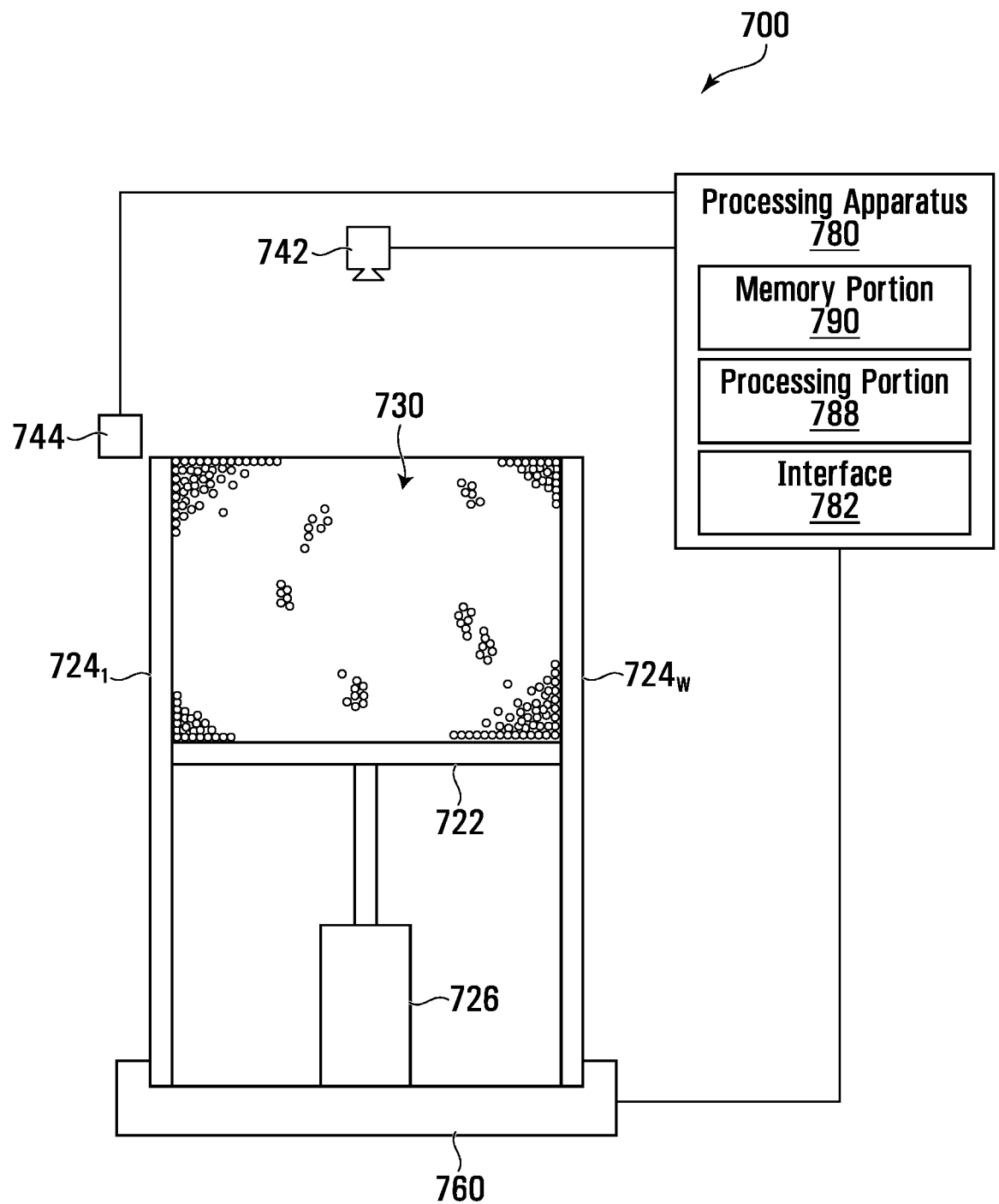
FIG. 37 show an apparatus for assessing purity of the powder and removing impurities and/or aggregates in accordance with an embodiment of the present disclosure.

FIG. 37 shows an apparatus 700 which is a non-limiting embodiment apparatus to assess purity and filter the pool of powder 730. The apparatus 700 comprises a build platform 720 comprising a platform 722 acting as a powder bed and a plurality of walls $724_1$-$724_w$. The apparatus 700 comprises sensors 742 to sense a characteristic of the pool of powder 730. In one embodiment, the sensors 742 may comprise a camera and the characteristic of the powder 10 may comprise a visual aspect of an upper surface 746 of the pool 730. In one embodiment, the visual aspect comprises a size and a color of the particles 20.

In this embodiment, the camera 742 is connected to a processing apparatus 780 to automatically assess or allow an operator to assess a purity of the powder 10 contained in the pool of powder 730. In some embodiments, the processing apparatus 780 is comprised in the apparatus 700, while in other embodiments the processing apparatus 780 is a remote processing apparatus. The processing apparatus 780 may comprise an interface 782, a processing portion 788, and a memory portion 790, which are implemented by suitable hardware and/or software.

The interface 782 comprises one or more inputs and outputs allowing the processing apparatus 780 to receive input signals from and send output signals to other components to which the processing apparatus 780 is connected (i.e., directly or indirectly connected, for example over a network), including, in this embodiment, the sensors 742. For example, in this embodiment, an input of the interface 782 is implemented by a wireless receiver to receive a sensor signal from a sensor 742. An output of the interface 782 is implemented by a transmitter to transmit a signal which may be indicative of the sensed characteristic or of an assessment made by the processing apparatus 780.

The processing portion 788 comprises one or more processors for performing processing operations that implement functionality of the processing apparatus 780. A processor of the processing portion 788 may be a general-purpose processor executing program code stored in the memory portion 790. Alternatively, a processor of the processing portion 788 may be a specific-purpose processor comprising one or more preprogrammed hardware or firmware elements (e.g., application-specific integrated circuits (ASICs), electrically erasable programmable read-only memories (EEPROMs), etc.) or other related elements.

The memory portion 790 comprises one or more memories for storing program code executed by the processing portion 788 and/or data used during operation of the processing portion 788. The memory portion 790 could also be used for storing data (e.g., size readings, reference sizes). A memory of the memory portion 790 may be a semiconductor medium (including, e.g., a solid-state memory), a magnetic storage medium, an optical storage medium, and/or any other suitable type of memory. A memory of the memory portion 790 may be read-only memory (ROM) and/or random-access memory (RAM), for example.

In some embodiments, two or more elements of the processing apparatus 780 may be implemented by devices that are physically distinct from one another and may be connected to one another via a bus (e.g., one or more electrical conductors or any other suitable bus) or via a communication link which may be wired, wireless, or both. In other embodiments, two or more elements of the processing apparatus 780 may be implemented by a single integrated device.

In this embodiment, the interface 782 may be configured to receive a signal from the camera 742 indicative of the visual aspect of the upper portion of the powder pool 730. The processing apparatus 786 may be configured to assess purity of the powder 10 in the pool of powder 730 by comparing the signal sensed by the camera 742 with reference data or processing apparatus 786 may be configured to display an image of the pool of powder to an operator to allow the operator to assess purity of the powder 10 contained in the pool 730.

If the processing apparatus 780 or the operator determine that the pool of powder 730 comprises impurities and/or aggregates, these impurities and/or aggregates may be removed from the pool of powder 730 manually by the operator or automatically. For instance, in this embodiment, the powder bed 722 may be an elevating powder bed that can be elevated and lowered by an actuator 726. The apparatus 700 may also comprise a spreading tool 744 to even the upper surface of the pool of powder 730. The actuator 726 and the spreading tool 744 may be in connection with the processing apparatus 780. When the pool of powder 730 comprises impurities and/or aggregates, the processing apparatus 780 may send a signal to the actuator 726 to elevate the pool of powder 730 such that the top surface of the pool of powder 730 gets pushed higher that top edges of the walls $724_1$-$724_w$ of the apparatus 700 and an upper portion of the powder 10 of the pool of powder 700, which contains the impurities and/or aggregates, flows out from the build platform 720 of the apparatus and are removed from the pool 730. To facilitate this, the processing apparatus 780 may send a signal to the spreading tool 744 which may trigger the spreading tool 744 to remove excess powder from the pool 730.

In some embodiments, vibrations may facilitate segregation of the powder 10. Impurities and aggregate may segregate at any suitable rate when they are subject to vibrations.

Figure 38:
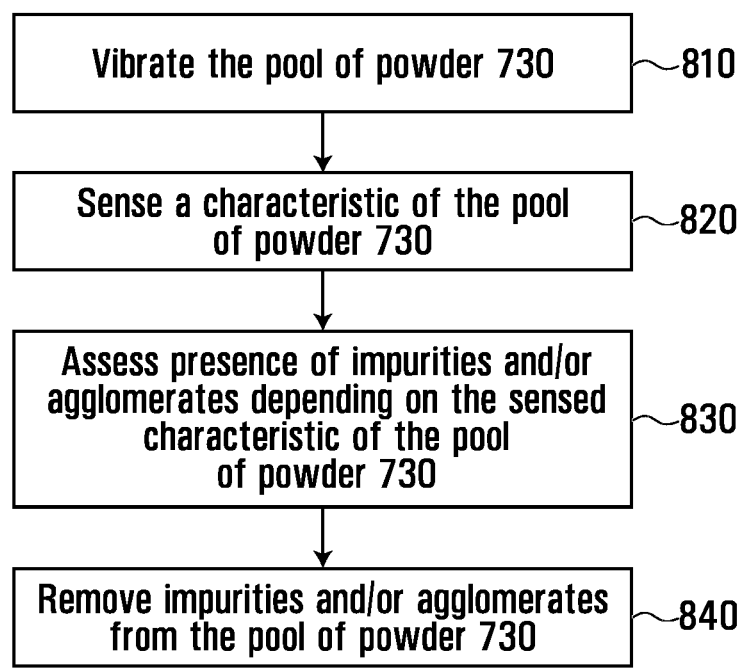
FIG. 38 shows a method to assess purity of the powder and remove impurities and/or aggregates in accordance with an embodiment of the present disclosure.

One or more steps of vibrating the pool of powder 730 at pre-determined frequencies for pre-determined durations may be added to the aforementioned methods for assessing a purity of the powder 10 of the pool of powder 730 and/or for removing impurities and/or aggregates from the powder 10 of the pool of powder 730. For instance, as shown in FIG. 38, a method to assess purity of the powder 10 of a pool of powder 730 may comprise: the step 810 of vibrating the pool of powder 730 at pre-determined frequencies for pre-determined durations; the step 820 of sensing a characteristic (e.g., a visual aspect) of the pool of powder 730 using one or more sensors (e.g., a camera); the step 830 of assessing presence of impurities and/or agglomerates depending on the sensed characteristic at step 820; and the step 840 of removing impurities and/or agglomerates from the pool of powder 730.

For instance, the apparatus 700 may comprise a vibrating actuator 760 that is connected to the processing apparatus 780. When the processing apparatus 780 sends a signal to the vibrating actuator 760, the vibrating actuator may vibrate at a pre-determined frequency for a pre-determined duration, facilitating the segregation of the impurities and/or aggregates to top and/or bottom layers of the pool of powder 730.

Additional Improvements to Manufacturing Process

In some embodiments, the powder 10 may also allow additional improvements to the manufacturing process and/or to the manufacturing apparatus 600 as further described below.

For example, in some embodiments, the improved flowability of the powder 10 described herein may allow the particles 20 to be more fluid-like, that is, to have a behavior that is more like a fluid. Such a behavior may allow new methods for additive manufacturing.

Figure 27:
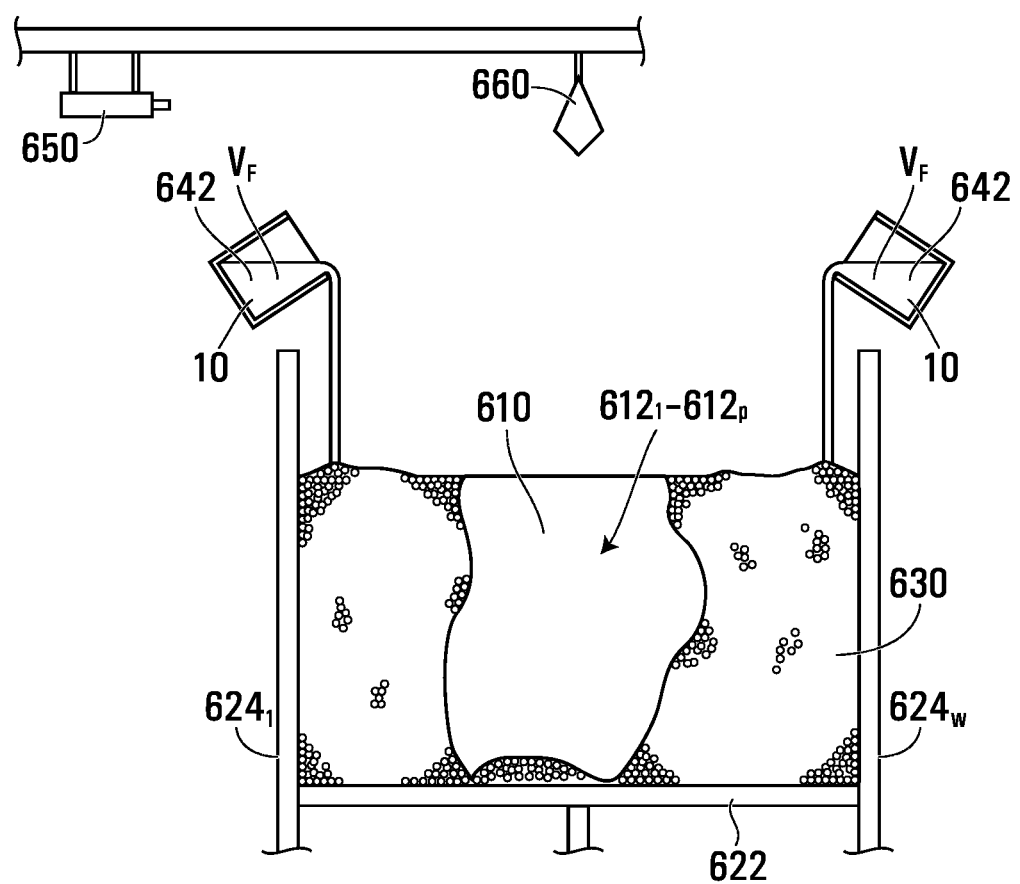
FIGS. 27 to 31 show variants of the additive manufacturing apparatus.
Figure 28:
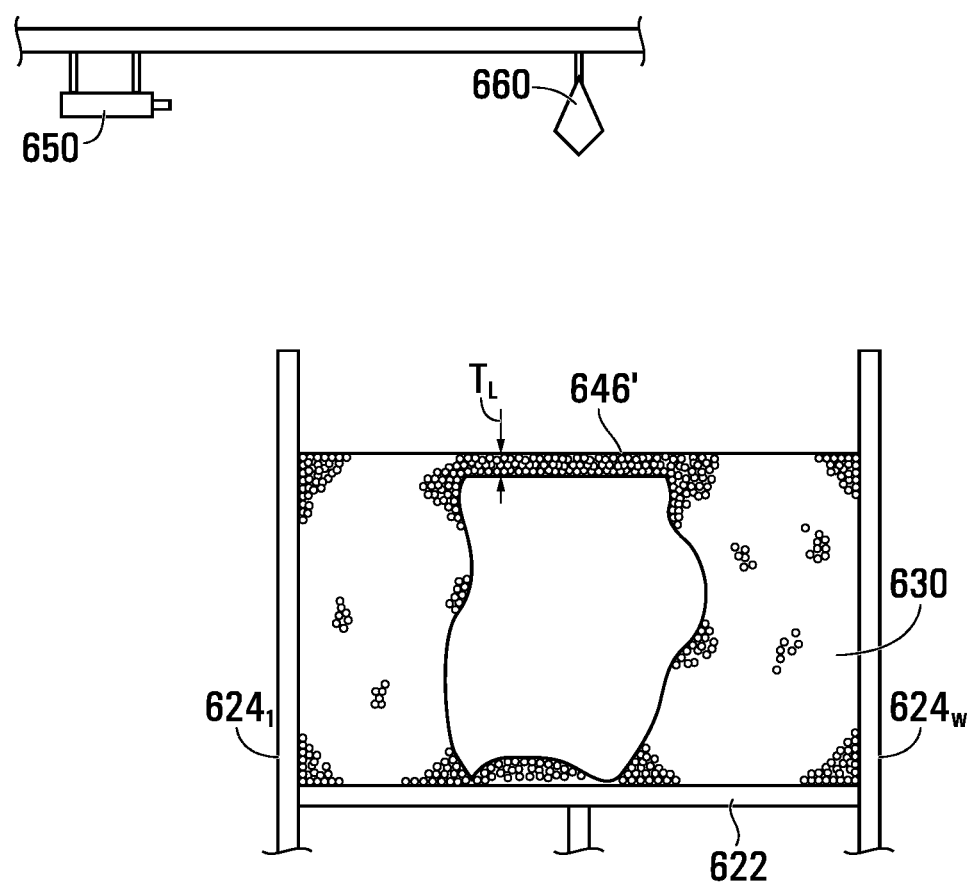
Figure 39:
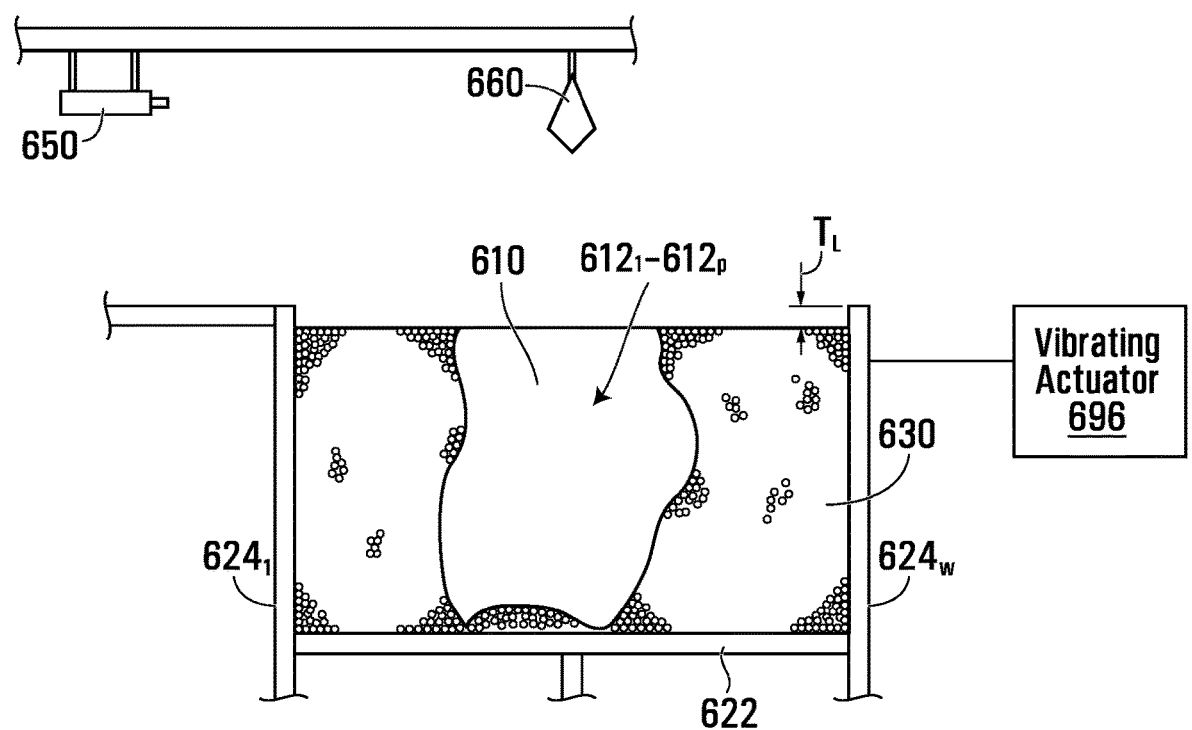
FIGS. 39 to 46 show variants of an additive manufacturing apparatus.

As such, with additional reference to FIGS. 27 and 28, in some embodiments, the additive manufacturing 600 for powder bed fusion may be free of a spreading tool (e.g. roll, rake, etc.). In this example, during the recoating step, rather than lowering the three-dimensional metal part 610 between after each layer 646' is fused into a new layer 612' and using the spreading tool 644 to spread a layer 646' of powder 10 over the three-dimensional metal part 610, the three-dimensional metal part 610 may be contained within walls and, after each layer 612$_i$ is formed, a pre-determined volume $V_P$ of particles 10 may be incorporated or spread over the three-dimensional metal part 610. Because the particles 10 are fluid-like, the particles 10 may cover the end-product horizontally, creating a layer 646' of constant thickness. For instance, in some embodiments, as shown in FIG. 39 the additive manufacturing 600 may be provided with a vibrating actuator 696 which creates a vibration, providing energy to the powder 10 such that the particles move relative to one another such as to cover the end-product horizontally, creating the layer 646' when vibration of the vibrating actuator 696 ends.

Figure 29:
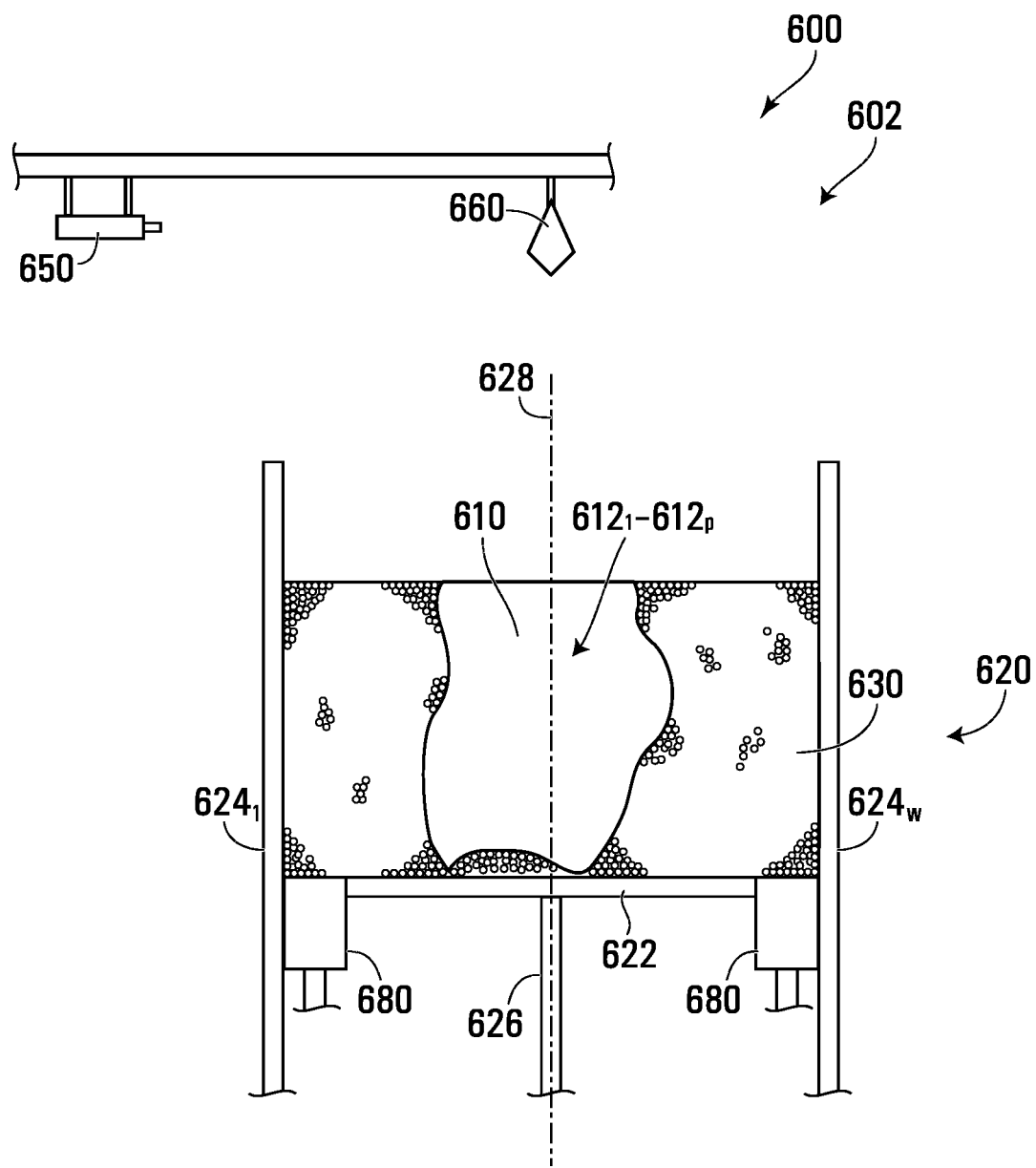
Figure 30:
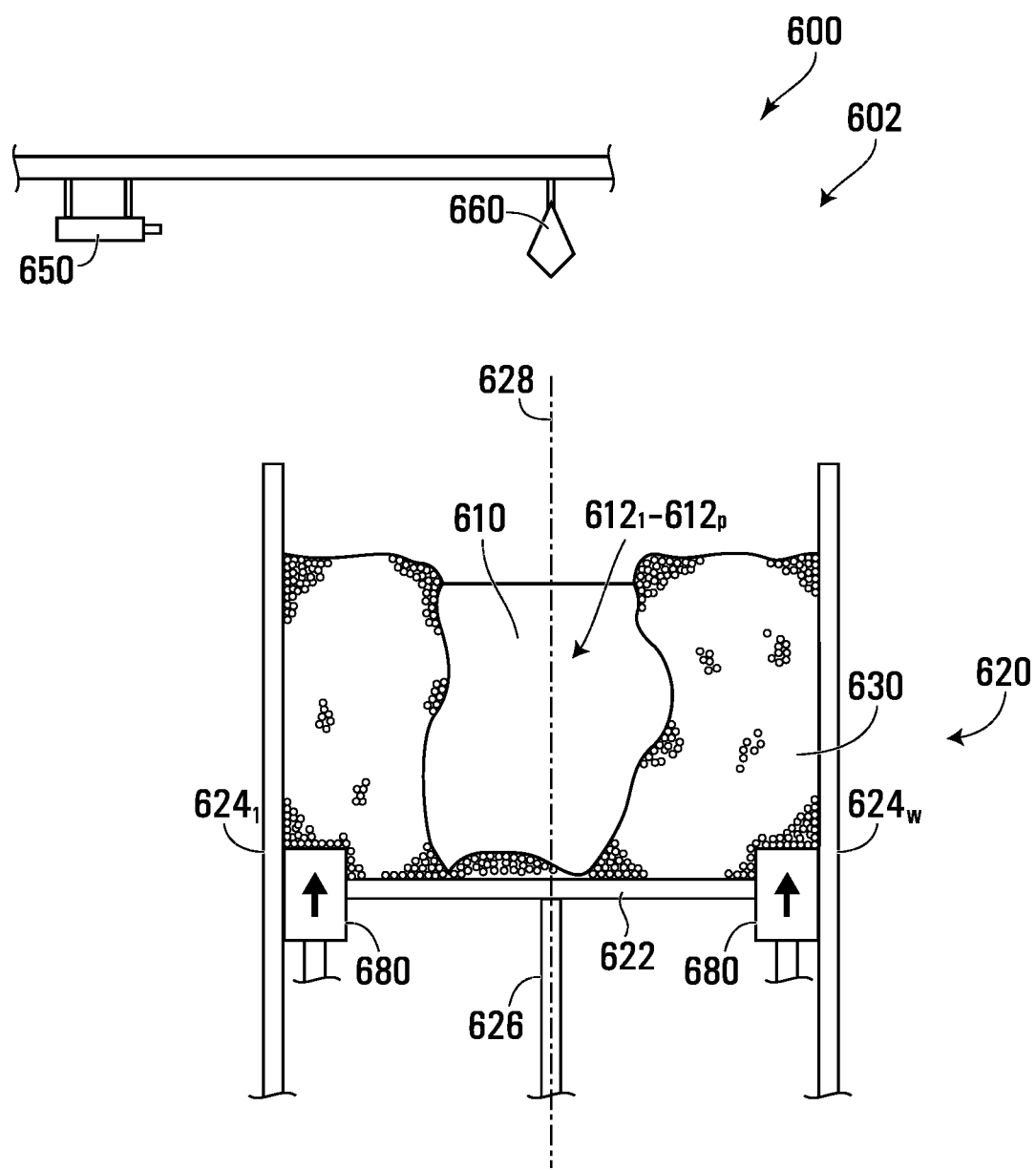
Figure 31:
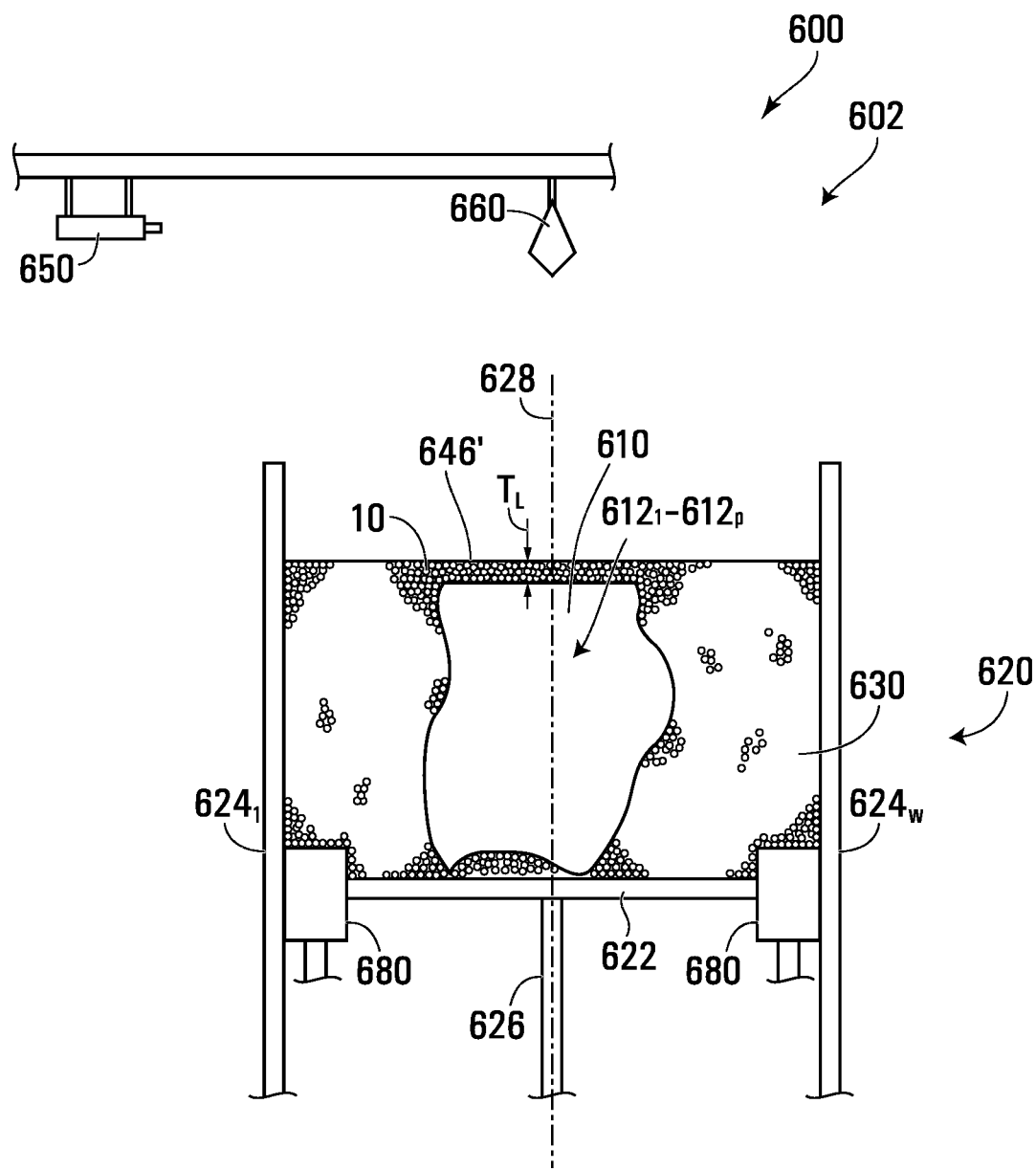

In another example, with additional reference to FIGS. 29 to 31, the build volume 620 may comprise actuators 680 located at an underside of the powder pool 630 but offset from the three-dimensional metal part 610. At each recoating step, the actuators 680 may insert a pre-determined volume in the powder pool 630 such that the upper surface of the powder pool 630 is raised relative to the three-dimensional metal part 610 by the dimension $T_L$, as shown in FIG. 30, and until it covers the three-dimensional metal part 610 by the same dimension, as shown in FIG. 31.

Figure 40:
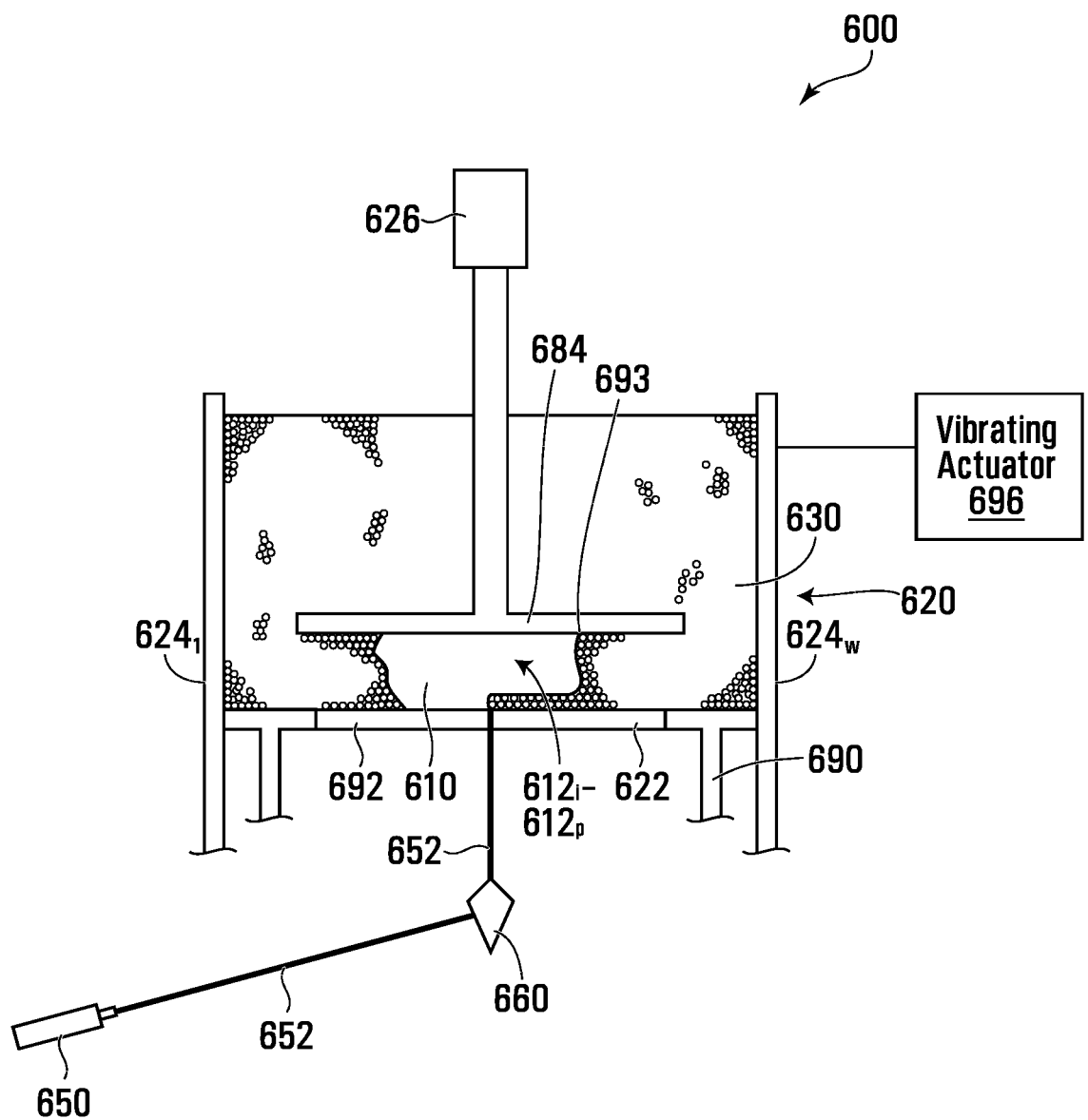
Figure 41:
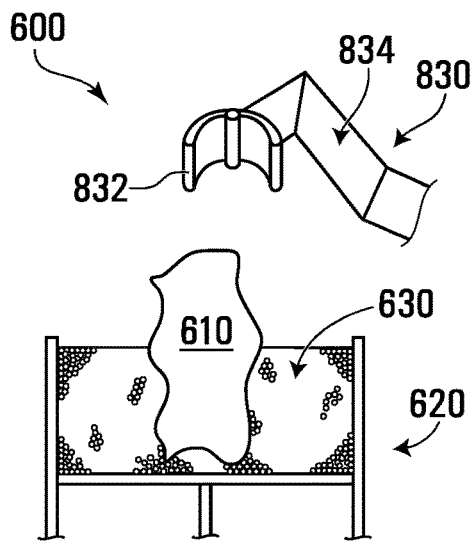
Figure 42:
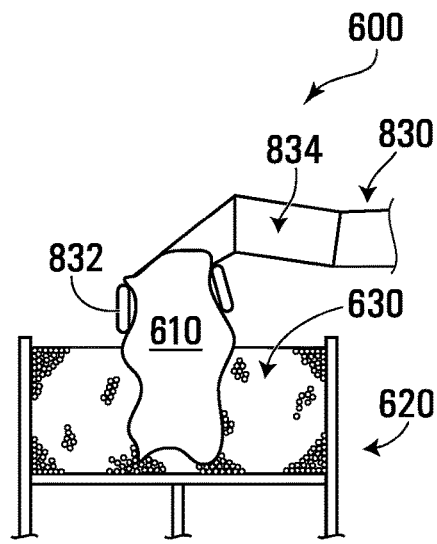
Figure 43:
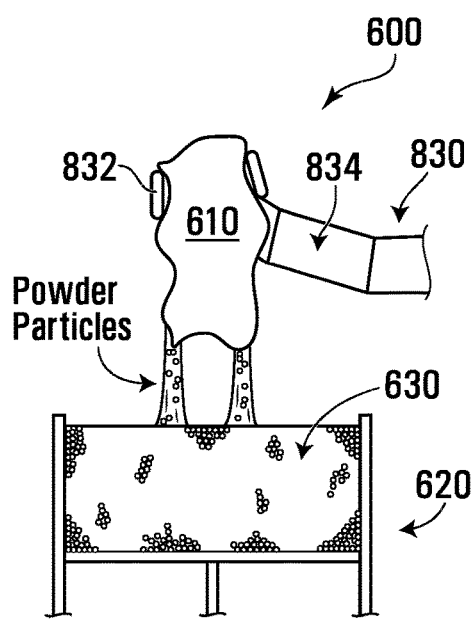
Figure 44:
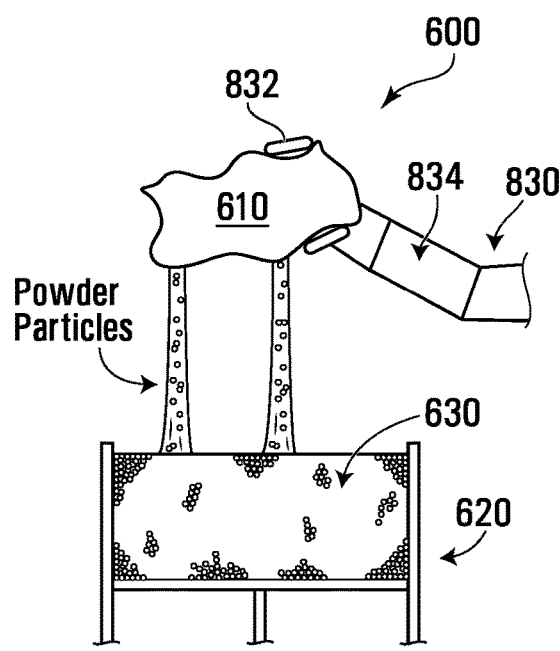

In another example, with additional reference to FIG. 40, the manufacturing apparatus 600 may comprise a bottom-up 3D-printer. In this embodiment, the build-platform 620 comprises the walls 624$_1$-624$_w$ and a bed 690 which, in this example, is a static platform. The static bed 690 may comprise an interface 692 that is at least partly transparent to at least part of the laser beam 652. In this embodiment, the powder pool 630 is received in the cavity defined by the walls 624$_1$-624$_w$ and the bed 690. In this embodiment, the bottom-up 3D-printer comprises an elevating platform 684 which can be lowered and/or elevated by the actuator 626, and the elevating platform 684 may comprise a surface 693 at an underside of the elevating platform 684 that is configured to interlock with the three-dimensional metal part 610 while the three-dimensional metal part 610 is manufactured. The laser 650 and the scanner 660 may be located at an underside of the powder pool 630. At first, the elevating platform 684 may be positioned such that the surface 693 is at a distance corresponding to the dimension $T_L$ from the bed 690. Then the laser beam 650 may pass through the transparent interface 692 of the bed 690 to scan and melt particles of the powder pool 630 disposed in the gap between the bed 690 and the elevating platform 684 such that the molten material adheres to the surface 693 of the elevating platform 684. After a first layer 612$_1$ of the end-product is printed, the actuator 626 may elevate the platform 684 and the first layer 612$_1$ adhered thereto by the dimension $T_L$. An actuator 696, such as a vibrating actuator, may be connected to at least part of the built platform 620 of the bottom-up 3D-printer to create a vibration that will facilitate flow of the particles of the powder pool 630 such that the particles evenly flow in the newly-created gap between the platform 684 and the bed 690. This three-dimensional metal part 610 may need to be emptied from this amount of powder. In this embodiment, there is provided a method to empty the three-dimensional metal part 610 from powder resting in hollow spaces of the three-dimensional metal part 610 wherein the powder exhibits the enhanced flowability characteristics of the powder 10, allowing reduction in time of post-manufacturing processes and cost reductions. For instance, in this embodiment, the manufacturing apparatus 600 may comprise an emptier 830 which comprises connection means 832 to grip the three-dimensional metal 610 and actuators 834 to move the end-product in space such that powder in empty spaces of the three-dimensional metal part 610 flow out from process may be repeated to create each one of the layers 612$_1$-612$_L$ and fuse them with their respective surrounding layers until the three-dimensional metal part 610 is manufactured from the bottom-up of the build platform 620.

In another example, with additional reference to FIGS. 41 to 44, the powder 10 may allow to speed up post-manufacturing processes. For instance, in some embodiments, the three-dimensional metal part 610 may be a hollow part. After manufacturing the three-dimensional metal part 610, some powder rests in hollow spaces of the end-product the end-product. While with conventional prior art powders this process is time consuming, in this embodiment, the powder 10 may speed up this process of up to at least 25%, or at least 35%, or at least 45%, or at least 50% in terms of time required to complete the process.

In another example, the powder 10 may allow new geometries of the three-dimensional metal part 610. For instance, in some embodiments, the three-dimensional metal part 610 may be a hollow part. After manufacturing the three-dimensional metal part 610, some powder rests in hollow spaces of the three-dimensional metal part 610 and the three-dimensional metal part 610 may need to be emptied from this amount of powder. However, when the hollow spaces are difficult to access (e.g., because of a narrow elongate shape, because of elbows, etc.) it may be impossible to additively manufacture the three-dimensional metal part 610 using conventional prior art powders. In this embodiment, there is provided a method to empty the three-dimensional metal part 610 from powder resting in hollow spaces of the three-dimensional metal part 610 wherein the three-dimensional metal part 610 comprises long, narrow and complexes hollow shapes.

Figure 45:
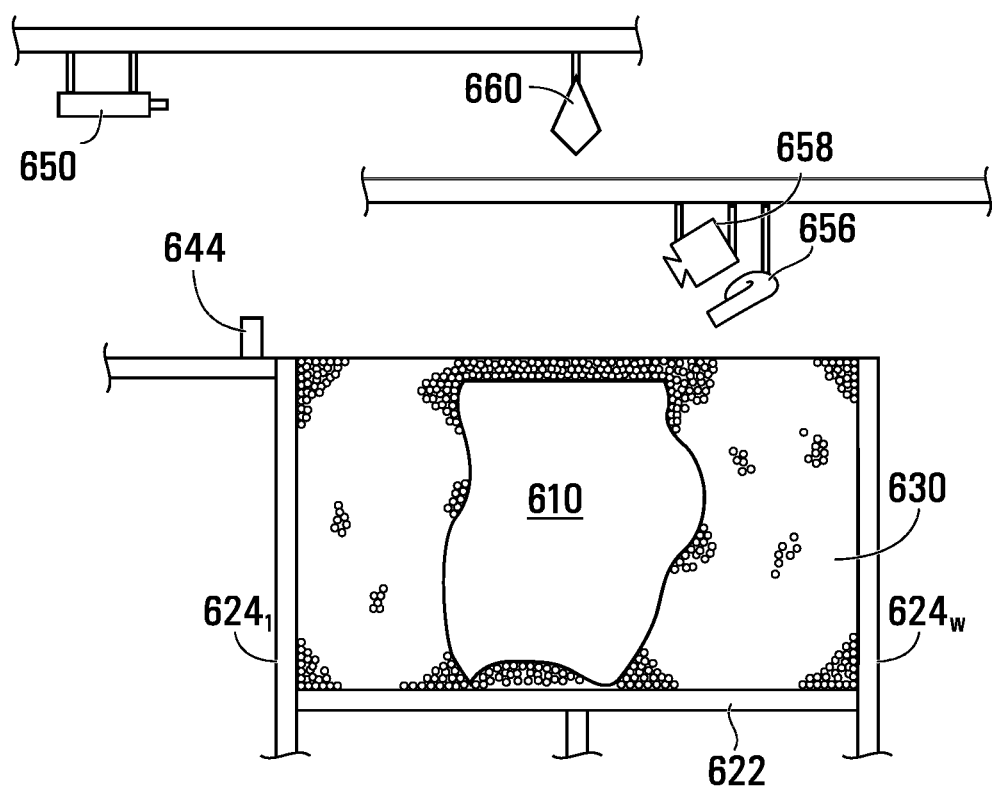

In another example, with additional reference to FIG. 45, the manufacturing apparatus 600 may be configured to sense a property of the powder 10 and to change at least one of its settings accordingly. In this embodiment, the manufacturing apparatus 600 may comprise a blower 656 and a camera 658 to ensure that the surface of powder 10 after the spreading tool spreads the powder 10 over one of the layers $612_1$-$612_L$ of the in-progress three-dimensional metal part 610 is evenly spread and does not comprise agglomerates or voids that could be created by agglomerates and that would create a weak point in the three-dimensional metal part 610. When an irregular feature is detected by the camera 658 on the surface of the powder 10, the blower 656 may be oriented towards the aggregate and create an air flow to remove the aggregate. The spreading step may be repeated to ensure that the powder 10 is evenly spread before scanning of the powder 10 by the laser beam 652. In some embodiment, the operator may adapt the settings of the blower 656 to ensure that the blower 656 blows enough air to remove the aggregate, but not too much as this may remove too much powder 10 and create a cloud of powder particles 20 in suspension, which may reduce efficiency of manufacturing. In this example, the operator may input one or more characteristics (e.g., size of the particles 20, flowability, etc.) of the powder 10 that is used to manufacture the three-dimensional metal part 610. In other embodiments, this may be achieved automatically by the manufacturing apparatus 600. For instance, the manufacturing apparatus 600 may comprise sensors to measure a characteristic (e.g., size of the particles 20, flowability, etc.) of the powder 10 and adjust the settings of the blower 656 accordingly. The manufacturing apparatus 600 may also use machine learning algorithms to determine the best working settings for different types of powder, depending on pre-determined characteristics (e.g., size of the particles 20, flowability, etc.).

In at least some embodiments described above, the manufacturing apparatus 600 may comprise a processing apparatus that is similar to the processing apparatus 780 of the apparatus 700 and that controls and/or communicates with electromechanical components of the manufacturing apparatus 600 described herein. An interface of the processing apparatus of the manufacturing apparatus 600 may allow an operator to enter commands and to consult data such as via a display of the interface.

In another example, with additional reference to FIG. 45, the manufacturing apparatus 600 may be configured to sense a property of the powder 10 and to change at least one of its settings accordingly. In particular, in this embodiment, the manufacturing apparatus 600 may comprise a processing apparatus 880 configured to control the operation of at least some of the tools (e.g. the laser 650, the scanner 660, the rake 644, the actuators 626, 696, and so on) of the manufacturing apparatus 600 according to a set of pre-determined settings 882. Practically, the processing apparatus 880 may associate a setting value 886 to each pre-determined setting 882 and the control of the tools of the manufacturing apparatus 600 may depend on the setting values 886 of the pre-determined settings 882.

In this embodiment, with additional reference to FIGS. 66 to 69, the processing apparatus 880 may comprise a plurality of settings values sets $890_1$-$890_S$, each set comprising a specific setting value 886 for each pre-determined setting 882. For example, in some embodiments, each settings values set $890_i$ may comprise a laser power setting value, a laser scanning speed setting value, a layer thickness setting value, a rake speed setting value, and so on.

Each settings values set $890_1$-$890_S$ may be associated with one or more characteristics $892_1$-$892_C$ of the powder put in the manufacturing apparatus 600 and/or one or more desired characteristic of the end-product 610. For instance, the processing apparatus 880 may comprise a first setting values set $890_1$ associated with a powder having a first characteristic $892_1$ and a second setting values set $890_2$ associated with a powder having a second characteristic $892_2$.

Specifically, in this example, the first settings values set $890_1$ is associated with a higher powder flowability and the second settings values set $890_2$ is associated with a lower powder flowability. Other examples of the characteristics $892_1$-$892_C$ may be related to material composition of powder particles, PSD of the powder, desired surface finish of the end-product, desired porosity of the end-product, and so on.

In this embodiment, the processing apparatus 880 is configured to assess the characteristics $892_1$-$892_C$ and automatically select an appropriate one of the settings values set $890_1$-$890_S$ depending on the characteristics $892_1$-$892_C$. Assessing the characteristics $892_1$-$892_C$ may be either done automatically (e.g., using a sensor in the manufacturing apparatus 600 to sense a characteristic of the powder, using a computer-readable file comprising desired characteristics of the end-product 610, etc.) or via a user input.

In this regard, the processing apparatus 880 may comprise an interface 912, a processing portion 918, and a memory portion 920, which may be implemented by any suitable hardware and/or software, and which may be implemented in a similar fashion as the interface 782, the processing portion 788, and the memory portion 790 of the processing apparatus 780.

In this embodiment, the interface 912 further comprises a graphical user interface (GUI) 914 to interact with an operator, display information, and allow user input. The interface 912 may be connected to the sensor in the manufacturing apparatus 600 to automatically assess the characteristics $892_1$-$892_C$ and may be further connected to the tools of the manufacturing apparatus 600 to allow the processing apparatus 880 to control them.

The memory portion 920 may comprise the computer-readable file comprising the desired characteristics of the end-product 610. The memory portion 920 may also comprise the settings values set $890_1$-$890_S$ and a computer-readable file comprising computer-readable instructions to associate the characteristics $892_1$-$892_C$ with settings values set $890_1$-$890_S$.

The processing portion 918 may process the input data to generate settings values for operating the tools of the manufacturing apparatus 600.

Controlling the Atmosphere

In another example, the manufacturing apparatus 600 may comprise means for controlling the atmosphere within the manufacturing apparatus 600 which consider one or more of the improved characteristics of the herein described powder.

Indeed, at times, debris (e.g., metal vapor, molten metal, or plasma) may be generated in the enclosure (e.g., above the material bed). The debris may float in the enclosure atmosphere. The floating debris may alter at least one characteristic of the energy beam (e.g., its power per unit area) during its passage through the enclosure towards material bed. The debris may alter (e.g., damage) to various components of the 3D printing system (e.g., optical window). Some existing 3D printers establish cross flow of gas to reduce the debris in the enclosure atmosphere. However, some of these cross-flow solutions cause undesirable gas flow structures (e.g., stagnation, recirculation of gas within the enclosure that may lead to a steady state) that do not completely solve the debris related issues. It may be desirable to establish a gas flow solution that avoids the undesirable gas flow structures and allows removal of debris from the enclosure atmosphere. At times, during the 3D printing, various material forms become gas-borne. The material forms may compromise (e.g., fine) powder or soot. Some of the gas-borne material may be susceptible to reaction with a reactive agent (e.g., an oxidizing agent). Some of the gas-borne material may violently react (e.g., when coming into contact with the reactive agent). At times, it may be desirable to provide low leakage of the reactive agent (e.g., oxygen in the ambient atmosphere) into one or more segments of the 3D printer. At times, it may be desirable to isolate the interior of one or more segments of the 3D printer from a harmful (e.g., violently reactive) level of the reactive agent (e.g., that is present in the atmosphere external to the one or more segments of the 3D printer). At times, it may be desirable to preserve a non-reactive (e.g., inert) atmosphere in at least one segment of the 3D printer (e.g., before, during and/or after the 3D printing).

At times, gas-borne material may be collected within a filtering mechanism. The gas-borne material may violently react (e.g., ignite, flame and/or combust), when exposed to an atmosphere comprising the reactive agent (e.g., an ambient atmosphere comprising oxygen). It may be desirable to incorporate a filter mechanism that is separated (e.g., isolated) from an external (e.g., ambient) atmosphere comprising the reactive agent. It may be desirable to incorporate a filter mechanism that maintains an inert interior atmosphere around the filter, at least during the filtering operation and/or disassembling of the filter from the filtering mechanism. It may further be desirable to facilitate an uninterrupted exchange of the filter in the filtering mechanism, for example, in order to facilitate continuous separation of gas-borne material from the recirculating gas in at least one or more segments of the 3D printer during the 3D printing, for example, when the filter clogs and requires exchange and/or refurbishing.

In some embodiments, the powder characteristics may have an impact on the above issues as is further discussed below.

For example, the apparatus 600 may include one or more gas inlets and outlets and suitable controller for causing the presence of a gas flow within the enclosure which is sufficient to properly control the atmosphere in the enclosure before, during and/or after melting of the powder to form layers $612_1$-$612_p$, of the end-product, while being below a threshold to avoid disturbing the powder bed and/or lifting particles of the powder within the enclosure which could, otherwise, create a cloud of powder particles and hinder the operations of the apparatus 600.

In some embodiments, the apparatus 600 may additionally or alternatively include a fan 666 for blowing or sucking gas thus creating the above gas flow.

In some embodiments, the operator may input one or more characteristics (e.g., size of the particles 20, flowability, etc.) of the powder 10 that is used to manufacture the three-dimensional metal part 610 to control the gas flow characteristics. In other embodiments, this may be achieved automatically by the manufacturing apparatus 600. For instance, the manufacturing apparatus 600 may comprise sensors to measure a characteristic (e.g., size of the particles 20, flowability, etc.) of the powder 10 and adjust the settings controlling the gas flow characteristics. The manufacturing apparatus 600 may also use machine learning algorithms to determine the best working settings for different type of powders, depending on pre-determined characteristics (e.g., size of the particles 20, flowability, etc.).

Variants

Other additive manufacturing processes do not rely on powder beds, such as directed energy deposition (DED) processes (CLAD, LFMT, BeaM). These also require a precise control of the flowrate of feedstock material. One of the foreseen applications enabled by DED is the design and manufacturing of functionally graded materials, where the raw material is alloyed in situ according to the optimal localized mechanical properties of the part. This is the evolution of topological optimization where optimization assesses not only topology, but also localized material properties, thus enabling a yet unseen level of optimization. In this scheme, control over the raw material dispensing needs to be even more accurate. It is understood that the present disclosure can be applicable to a wide variety of raw materials, and that can be applicable to processes for directed energy deposition, topological optimization and functional gradation of materials.

Tests

The following paragraphs describe illustrative and non-limiting tests which are referred to in the present disclosure.

Angle of Repose/Hall Flowmeter

The angle of repose defined in ISO-4490/ASTM B213 is where powder flows freely through a funnel onto a plate and the slope angle of the developed cone to the base plate is the angle of repose and considered as a measure for powder flowability. The method is also recommended by ASTM as the characterisation method for metal powders for additive manufacture.

Alternatively, the time required to discharge the powder can be used as a measure for flowability. For freely flowing powders, a low angle (and short discharge time) can be expected as avalanches can easily flow down the slope, whereas for cohesive powders this angle will be high.

Avalanche Angle

The measurement of the avalanche angle is as a methodology, which is nearer to powder-bed-based additive manufacturing (SLS, SLM) than the other techniques. It typically consists of a rotating, transparent drum filled with a certain amount of powder and a camera in front of a backlight. The camera records pictures of the powder free surface and the cross-sectional area of powder inside the drum. The pictures can be analysed for different values associated with powder flowability, e.g., it has been proposed to quantify powders based on the avalanche flow index (AFI) and cohesive interaction index (CoI).

ASTM E11 Meshes Sieving

The testing procedure with the stack of ASTM E11 meshes, includes determining the proportion of powder 10 collected after each sieving mesh relative to the initial amount of powder used in the test and comparing this result to the result obtained with sieving the comparative prior art powder on an identical stack of ASTM E11 meshes at corresponding sieving steps. The results can also be reported using the proportion of powder collected after the last ASTM E11 625 mesh (i.e., the proportion of particles having a size <20 µm).

Sieving efficiency may be informative of a powder's behavior and its tendency to agglomerate: a tendency to agglomerate typically tends to reduce the proportion of powder collected after a sieving step with a given mesh and ultimately, reduce the proportion of powder collected after the last ASTM E11 625 mesh (i.e., the proportion of particles having a size <20 µm) due to progressive clogging of the sieve openings by lumps of material. Accordingly, powders that have a tendency to form agglomerates, for example in high ambient humidity (e.g., 50%, 75% relative humidity) will have reduced recovery of the particles having a diameter of less than 20 µm in the sieving efficiency test. In contrast, when a powder is less cohesive and includes less or no lumps of material, individual particles of powder are forced through the openings of the meshes and cohesion of the powder on the sieve mesh itself is lesser, and therefore particles are easier to remove from a clog.

Surface Roughness

Surface roughness of a part can be measured using a Surface Roughness Tester (e.g., Elcometer 7061, Elcometer Inc., USA), which is mechanically drawn across the surface recording an "image" of the surface roughness across a pre-defined sample length. The measurement technique provides a number of measurement parameters including: Ra which is the average roughness over the sampling length, Rz which is the average distance between the highest peak and lowest valley over a number of sampling lengths, Rt which is the distance between the highest peak and the lowest valley within any given sampling length, and Rmax which is the greatest distance between the highest peak and lowest valley over the sampling length (see, e.g., ASTM D7127).

Other ASTM Standards

The following ASTM Standards can be used in the context of the present disclosure:

B213 Test Methods for Flow Rate of Metal Powders Using the Hall Flowmeter Funnel
B214 Test Method for Sieve Analysis of Metal Powders
B243 Terminology of Powder Metallurgy
B311 Test Method for Density of Powder Metallurgy (PM) Materials Containing Less Than Two Percent Porosity
B348 Specification for Titanium and Titanium Alloy Bars and Billets
B600 Guide for Descaling and Cleaning Titanium and Titanium Alloy Surfaces
B769 Test Method for Shear Testing of Aluminum Alloys
B822 Test Method for Particle Size Distribution of Metal Powders and Related Compounds by Light Scattering
B855 Test Method for Volumetric Flow Rate of Metal Powders Using the Arnold Meter and Hall Flowmeter Funnel
B964 Test Methods for Flow Rate of Metal Powders Using the Carney Funnel
D3951 Practice for Commercial Packaging
D7127-17 Standard Test Method for Measurement of Surface Roughness of Abrasive Blast Cleaned Metal Surfaces Using a Portable Stylus Instrument
E3 Guide for Preparation of Metallographic Specimens
E8/E8M Test Methods for Tension Testing of Metallic Materials
E9 Test Methods of Compression Testing of Metallic Materials at Room Temperature
E10 Test Method for Brinell Hardness of Metallic Materials
E11 Specification for Woven Wire Test Sieve Cloth and Test Sieves
E18 Test Methods for Rockwell Hardness of Metallic Materials
E21 Test Methods for Elevated Temperature Tension Tests of Metallic Materials
E23 Test Methods for Notched Bar Impact Testing of Metallic Materials
E29 Practice for Using Significant Digits in Test Data to Determine Conformance with Specifications
E238 Test Method for Pin-Type Bearing Test of Metallic Materials
E384 Test Method for Microindentation Hardness of Materials
E399 Test Method for Linear-Elastic Plane-Strain Fracture Toughness KIc of Metallic Materials
E407 Practice for Microetching Metals and Alloys
E466 Practice for Conducting Force Controlled Constant Amplitude Axial Fatigue Tests of Metallic Materials
E539 Test Method for Analysis of Titanium Alloys by X-Ray Fluorescence Spectrometry
E606 Test Method for Strain-Controlled Fatigue Testing
E647 Test Method for Measurement of Fatigue Crack Growth Rates
E1409 Test Method for Determination of Oxygen and Nitrogen in Titanium and Titanium Alloys by Inert Gas Fusion
E1417 Practice for Liquid Penetrant Testing
E1447 Test Method for Determination of Hydrogen in Titanium and Titanium Alloys by Inert Gas Fusion Thermal Conductivity/Infrared Detection Method
E1450 Test Method for Tension Testing of Structural Alloys in Liquid Helium
E1742 Practice for Radiographic Examination
E1820 Test Method for Measurement of Fracture Toughness
E1941 Test Method for Determination of Carbon in Refractory and Reactive Metals and Their Alloys by Combustion Analysis
E2368 Practice for Strain Controlled Thermomechanical Fatigue Testing
E2371 Test Method for Analysis of Titanium and Titanium Alloys by Direct Current Plasma and Inductively Coupled Plasma Atomic Emission Spectrometry (Performance-Based Test Methodology)
E2626 Guide for Spectrometric Analysis of Reactive and Refractory Metals
F136 Specification for Wrought Titanium-6Aluminum-4Vanadium ELI (Extra Low Interstitial) Alloy for Surgical Implant Applications (UNS R56401)
F1472 Specification for Wrought Titanium-6Aluminum-4Vanadium Alloy for Surgical Implant Applications (UNS R56400)
F2971 Practice for Reporting Data for Test Specimens Prepared by Additive Manufacturing
F3049 Guide for Characterizing Properties of Metal Powders Used for Additive Manufacturing Processes
F3122 Guide for Evaluating Mechanical Properties of Metal Materials Made via Additive Manufacturing Processes Definitions Unless otherwise defined, all technical and scientific terms used herein have the same meaning as commonly understood by a person of ordinary skill in the art to which the present invention pertains. As used herein, and unless stated otherwise or required otherwise by context, each of the following terms shall have the definition set forth below.

As used herein the term "powder" or the like refers to a collection of particles. The particles may be of any configuration, shape or size as long as they are suitable for improvement in the flowability and/or spreadability thereof.

As used herein the term "average particle size" refers to an average value of the particle sizes. In some embodiments, the average particle size refers to D50, i.e., the particle diameter at the 50% point on a particle size distribution curve when the total volume is 100%.

As used herein, the term "substantially" refers to a degree of deviation that is sufficiently small so as to not measurably detract from the identified property (e.g., sphericity). The exact degree of deviation allowable may in some cases depend on the specific context.

As used herein, the term "plasma" refers to a state of matter in which an ionized gaseous substance becomes highly electrically conductive to the point that long-range electric and magnetic fields dominate the behavior of the matter. Plasma is typically artificially generated by heating neutral gases or by subjecting that gas to a strong electromagnetic field.

The expressions "plasma torch", "plasma arc", "plasma gun" and "plasma cutter" are used herein interchangeably and refer to a device for generating a direct flow of plasma.

As used herein, the abbreviation "µm" designates micrometers and the abbreviation "nm" designates nanometers.

As used herein, the expression "particle size distribution" or "PSD" defines the relative amount of particles present according to size. The most easily understood method of determination is sieve analysis, where powder is separated on sieves of different sizes. Thus, the PSD is defined in terms of discrete size ranges: e.g. a PSD of between 45 µm and 53 µm, when sieves of these sizes are used. The PSD is usually determined over a list of size ranges that covers nearly all the sizes present in the sample.

As used herein, the expression "comparative prior art powder" generally refers to a powder which has not been surface modified (for example, a powder which has been atomized and optionally sieved).

As used herein, the expression "Additive Manufacturing" (AM) refers to a variety of processes in which material is joined or solidified under computer control to create a three-dimensional object, with material being added together (such as liquid molecules or powder grains being fused together), typically layer by layer (also referred to in the art as 3D printing). Currently, ISO/ASTM52900-15 defines seven categories of additive manufacturing processes within its meaning: binder jetting, directed energy deposition, material extrusion, material jetting, powder bed fusion, sheet lamination, and vat photopolymerization.

EXAMPLES

The examples below are given to illustrate the practice of various embodiments of the present disclosure. They are not intended to limit or define the entire scope of this disclosure. It should be appreciated that the disclosure is not limited to the particular embodiments described and illustrated herein but includes all modifications and variations falling within the scope of the disclosure as defined in the appended embodiments.

The powders used in these examples have a PSD comprised within 0-1000 micrometer unless indicated otherwise.

Example 1

In this non-limiting working example, plasma atomized Ti64 powder with a PSD of from about 15 µm to about 45 µm was treated in accordance with an embodiment of the present disclosure in order to obtain a powder that has an improved physical characteristic, namely flowability, which is insensitive to relative humidity. In this example, the treated powder had a flowability of less than 30 seconds according to ASTM B213 from 10% relative humidity up to 75% relative humidity.

15 kg of as produced plasma atomized Ti64 powder was introduced in an 8 litres working capacity V-blender after an argon purge. 3 solutions were prepared. First, 9 g ammonium hydroxide (30% aqueous) was dissolved into 400 ml ethanol (95%, denatured) (sol. 1). 4.05 g methyltrimethoxysilane was then dissolved into 400 ml ethanol (95%, denatured) (sol. 2). A third solution contained only the ethanol solution (95%, denatured) (sol. 3). The V-blender rotation was activated and the injection mechanism through intensifier bars was activated. The solutions were then injected sequentially: sol 1, then sol 2, then sol 3. The vessel was then pressurized and closed airtight. The mixture was allowed to react for 4 hours, at which point a 12 standard liter per minute (slpm) argon gas flow was established through the vessel and the temperature was raised at 50° C. for drying. The mixture was left to dry for 4 hours with rotation of the mixer. The powder was then transferred to a canister and sieved.

Figure 12:
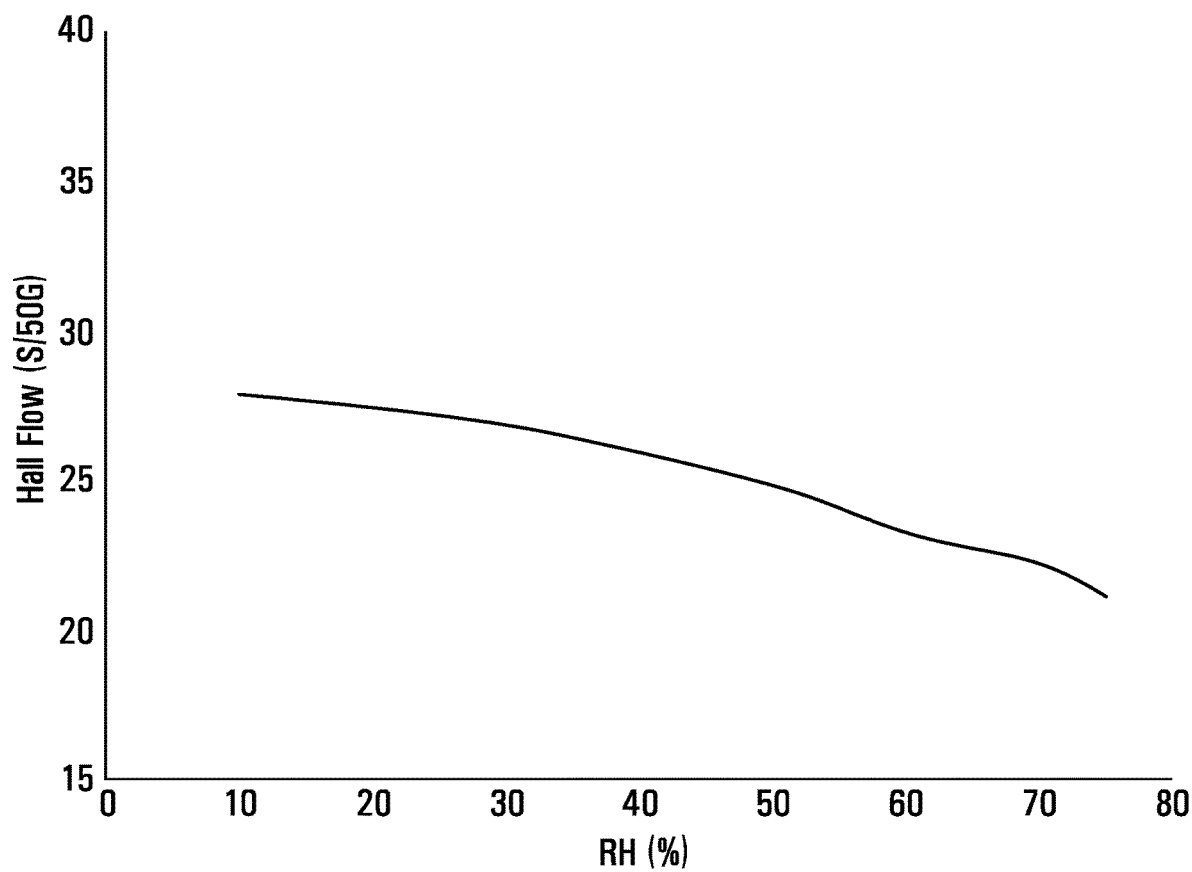
FIG. 12 shows a non-limiting graph of the flowability for a surface-modified powder as per Example 1, measured at various RH %.

Sieving had two main purposes. The first one was to separate the powder into smaller subsets according to target particle size distributions. The second one was to break and disperse any agglomerates that might have formed during the treatment. As shown in FIG. 12, the flowability curve obtained according to ASTM B213 indicates: Hall flow results decreasing (i.e. signifying an increasing flowability) as relative humidity increases; Hall flow results being less than 28 seconds; and Hall flow results varying by less than 3 seconds, or 7%, between 10% of relative humidity and 75% of relative humidity.

Similar results were obtained with variants of this process, where for example, the ammonium hydroxide concentration in total alcohol ranged from 5 g/L to 120 g/L.

Example 2

In this non-limiting working example, the metal powder of Example 1 as well as additional various metal powders were treated with an anhydrous process, in order to obtain powders having improved physical characteristics in accordance with an embodiment of the present disclosure.

120 g of metal powder (Ti64 with a PSD of from about 15 µm to about 45 µm, AlSi10Mg with a PSD of from about 30 µm to about 70 µm, AlSi7Mg with a PSD of from about 30 µm to about 70 µm, and Ni718 with a PSD of from about 15 µm to about 45 µm) was immersed in 200 mL of solvent (Hydrocabon). The suspension was stirred with a magnetic stirrer. Then, 5 mL of silane was added, and the suspension heated at reflux for 3 h. The mixture was vacuum filtered with a Buchner, washed with ethanol followed by a drying step.

Table 4 depicts the resulting different powders, as well as the solvents and silanes used according to this method:

TABLE 4

| Metal powder | Solvent | Silane |
| --- | --- | --- |
| Ti64, AlSi10Mg, AlSi7Mg, Ni718 | Toluene, hexane, heptane, cyclohexane, decane, dodecane, tetradecane. | Methyl trimethoxysilane, Methyl triethoxysilane, dimethyldiethoxysilane, dimethyldimethoxysilane, Vinyltrimethoxysilane, phenyltrimethoxysilane, diphenyldimethoxysilane. |

Example 3

In this non-limiting working example, the metal powder of Example 2 were treated with other coupling agents for surface modification through chelation bonding in order to obtain powders having improved physical characteristics in accordance with an embodiment of the present disclosure.

120 g of metal powder (Ti64 with a PSD of from about 15 µm to about 45 µm, AlSi10Mg with a PSD of from about 30

μm to about 70 μm, AlSi7Mg with a PSD of from about 30 μm to about 70 μm, and Ni718 with a PSD of from about 15 μm to about 45 μm) was immersed in 200 mL of ethanol. The suspension was stirred with a magnetic stirrer. Then, 1 mL of coupling agent was added (Di-(2-ethylhexyl)phosphoric acid or Oleic acid or sodium dodecyl sulfate), and the suspension was heated at 50° C. for 4 h. The mixture was vacuum filtered with a Buchner, washed with ethanol followed by a drying step. FIG. 1 shows the hydrophobic character of the powder 10 after the treatment in that water added to the powder forms a cohesive droplet 35 on top of the powder.

Example 4

In this non-limiting working example, the metal powder of Example 1 was treated with a variant process of the one described in Example 1 to obtain a powder having improved physical characteristics in accordance with an embodiment of the present disclosure. In this example, the treated powder had a flowability of less than 35 seconds according to ASTM B213 from 10% relative humidity up to 75% relative humidity.

15 kg of as produced plasma atomized Ti64 powder with a PSD of from about 15 μm to about 45 μm was introduced in an 8 liters working capacity V-blender after an argon purge. 3 solutions were prepared. First 9 g ammonium hydroxide (30% aqueous) was dissolved into 200 ml ethanol (95%, denatured) (sol. 1). 4.05 g methyltrimethoxysilane was then dissolved into 200 ml ethanol (95%, denatured) (sol. 2). A third solution contained only the ethanol solution (sol. 3, 200 mL).

Figure 13:
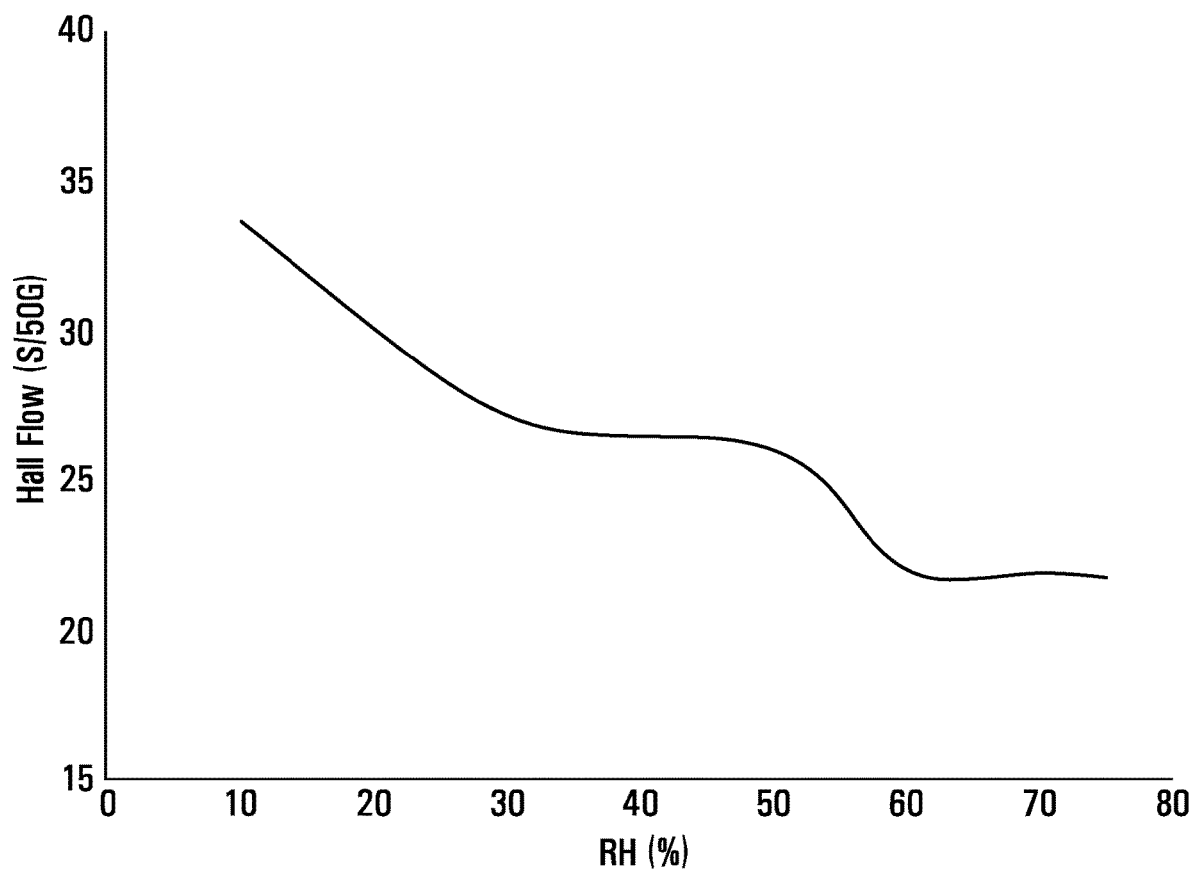
FIG. 13 shows a non-limiting graph of the flowability for a surface-modified powder as per Example 4, measured at various RH %.

The solutions were then injected sequentially: sol 1, then sol 2, then sol 3. The vessel was then pressurized and closed airtight. The mixture was allowed to react for 4 hours, at which point a 12 slpm argon gas flow was established through the vessel and the temperature was raised at 50° C. for drying. The mixture was left to dry for 2 hours with rotation of the mixer. The powder was then transferred to a canister and sieved. As shown in FIG. 13, the flowability curve obtained according to ASTM B213 indicates: Hall flow results decreasing (i.e. signifying an increasing flowability) as relative humidity increases; Hall flow results being less than 34 seconds; and Hall flow results varying by less than 14 seconds, or 42%, between 10% of relative humidity and 75% of relative humidity.

Example 5

In this non-limiting working example, the metal powder of Example 1 was treated with a variant process of the one described in Example 1 to obtain a powder having improved physical characteristics in accordance with an embodiment of the present disclosure. In this example, the treated powder had a flowability of less than 30 seconds according to ASTM B213 from 10% relative humidity up to 75% relative humidity.

Figure 14:
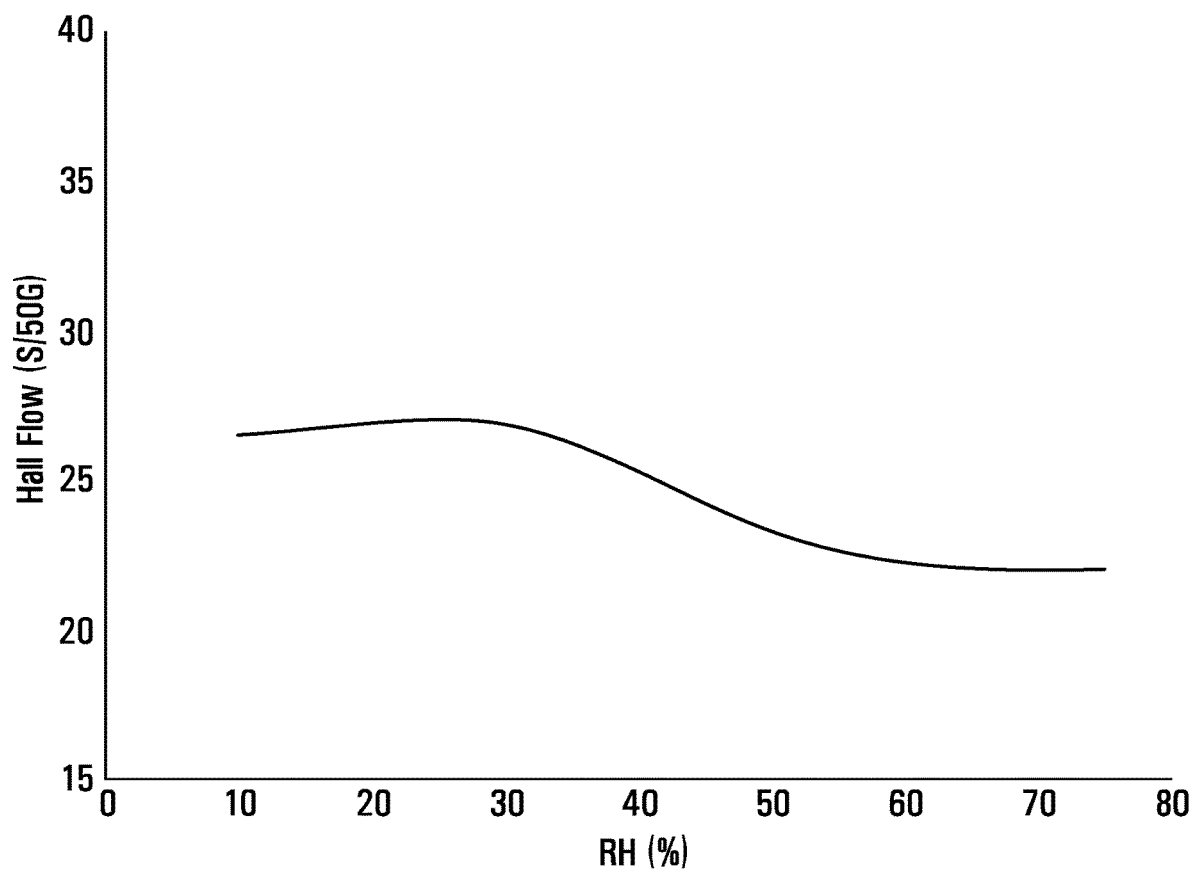
FIG. 14 shows a non-limiting graph of the flowability for a surface-modified powder as per Example 5, measured at various RH %.

15 kg of as produced plasma atomized Ti64 powder with a PSD of from about 15 μm to about 45 μm was introduced in an 8 liters working capacity V-blender after an argon purge. 3 solutions were prepared. First 9 g ammonium hydroxide (30% aqueous) was dissolved into 50 ml ethanol (95%, denatured) (sol. 1). 4.05 g methyltrimethoxysilane was then dissolved into 50 ml ethanol (95%, denatured) (sol. 2). A third solution contained only the ethanol solution (sol. 3, 50 mL). The solutions were then injected sequentially: sol 1, then sol 2, then sol 3. The vessel was then pressurized and closed airtight. The mixture was allowed to react for 2 hours, at which point a 12 slpm argon gas flow was established through the vessel and the temperature was raised at 50° C. for drying. The mixture was left to dry for 2 hours with rotation of the mixer. The powder was then transferred to a canister and sieved. As shown in FIG. 14, the flowability curve obtained according to ASTM B213 indicates: Hall flow results generally decreasing (i.e. signifying an increasing flowability) as relative humidity increases; Hall flow results being less than 27 seconds; and Hall flow results varying by less than 5 seconds, or 19%, between 10% of relative humidity and 75% of relative humidity.

Example 6

In this non-limiting working example, the metal powder of Example 1 was treated with a variant process of the one described in Example 1 to obtain a powder having improved physical characteristics in accordance with an embodiment of the present disclosure. In this example, the treated powder had a flowability of less than 25 seconds according to ASTM B213 from 10% relative humidity up to 75% relative humidity.

Figure 15:
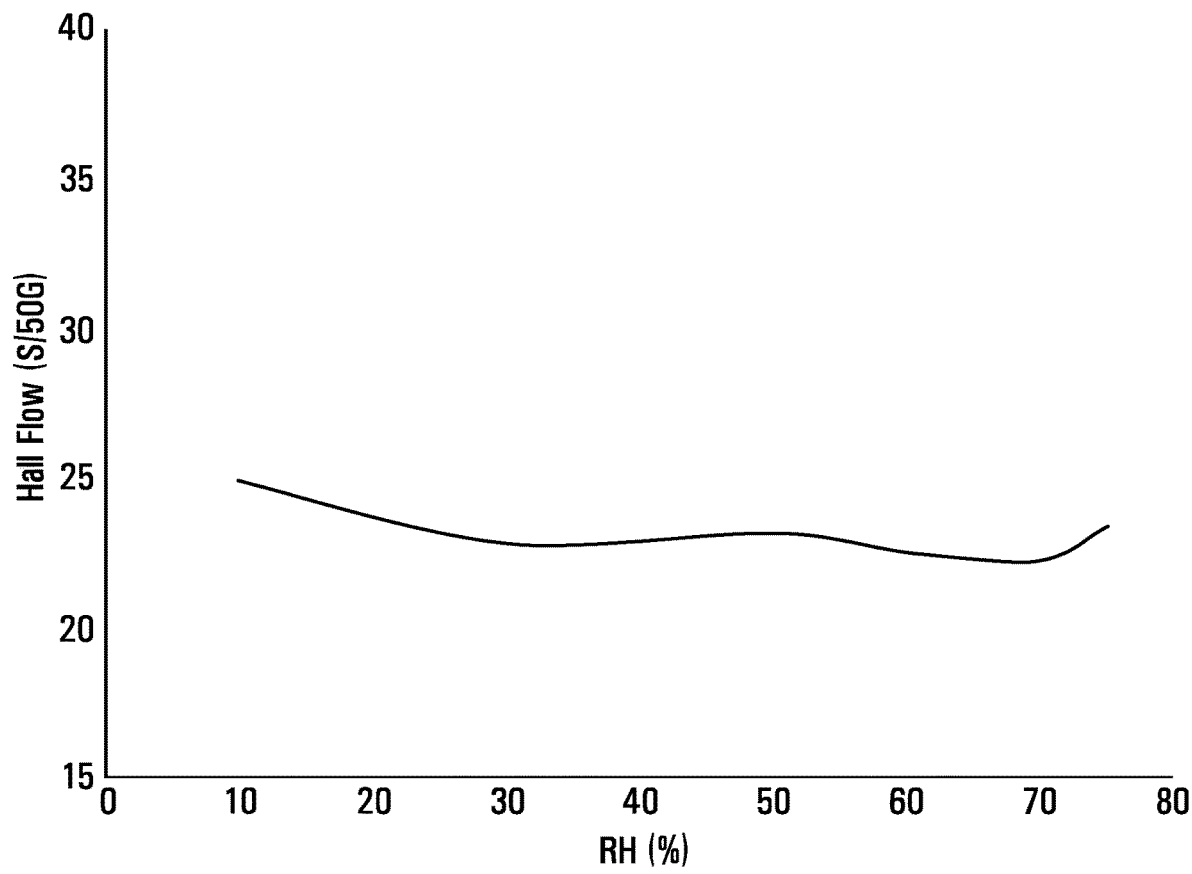
FIG. 15 shows a non-limiting graph of the flowability for a surface-modified powder as per Example 6, measured at various RH %.

15 kg of as produced plasma atomized Ti64 powder with a PSD of from about 15 μm to about 45 μm was introduced in an 8 litres working capacity V-blender after an argon purge. 3 solutions were prepared. First 3 g ammonium hydroxide (30% aqueous) was dissolved into 25 ml ethanol (95%, denatured) (sol. 1). 0.675 g methyltrimethoxysilane was then dissolved into 25 ml ethanol (95%, denatured) (sol. 2). A third solution contained only the ethanol solution (sol. 3, 25 mL). The solutions were then injected sequentially: sol 1, then sol 2, then sol 3. The vessel was then pressurized and closed airtight. The mixture was allowed to react for 30 min, at which point a 12 slpim argon gas flow was established through the vessel and the temperature was raised at 50° C. for drying. The mixture was left to dry for 1 hour with rotation of the mixer. The powder was then transferred to a canister and sieved. As shown in FIG. 15, the flowability curve obtained according to ASTM B213 indicates: Hall flow results generally slightly decreasing (i.e. signifying an increasing flowability) as relative humidity increases; Hall flow results being less than 25 seconds; and Hall flow results varying by less than 3 seconds, or 11%, between 10% of relative humidity and 75% of relative humidity.

Example 7

In this non-limiting working example, the metal powder of Example 1 was treated with a variant process of the one described in Example 1 to obtain a powder having improved physical characteristics in accordance with an embodiment of the present disclosure. In this example, the treated powder had a flowability of less than 35 seconds according to ASTM B213 from 10% relative humidity up to 75% relative humidity.

Figure 16:
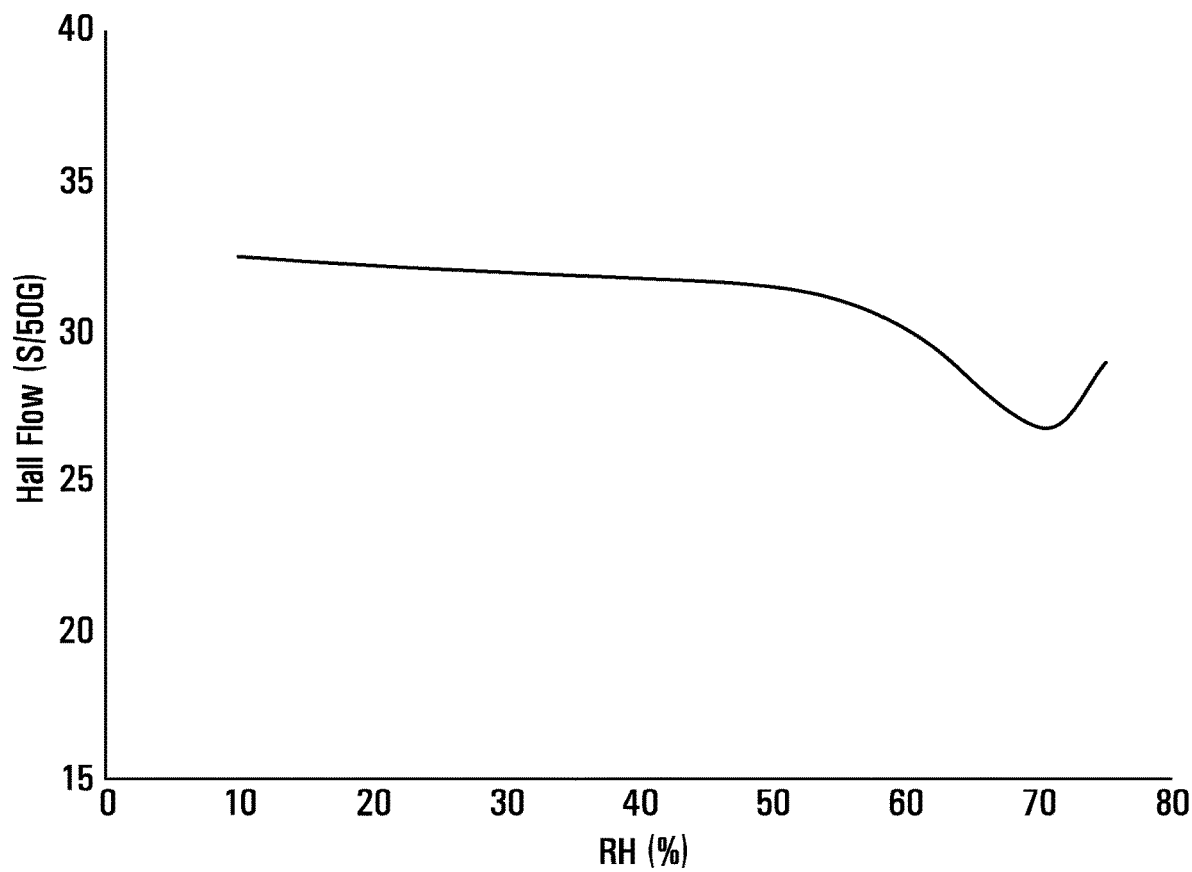
FIG. 16 shows a non-limiting graph of the flowability for a surface-modified powder as per Example 7, measured at various RH %.

15 kg of beforehand sieved plasma atomized Ti64 powder with a PSD of from about 15 um to about 45 μm was introduced in an 8 liters working capacity V-blender after an argon purge. 3 solutions were prepared. First 9 g ammonium hydroxide (30% aqueous) was dissolved into 50 ml ethanol (95%, denatured) (sol. 1). 2.9 g methyltrimethoxysilane was then dissolved into 50 ml ethanol (95%, denatured) (sol. 2). A third solution contained only the ethanol solution (sol. 3, 50 mL). The solutions were then injected sequentially: sol 1, then sol 2, then sol 3. The vessel was then pressurized and closed airtight. The mixture was allowed to react for 1 hour, at which point a 12 slpm argon gas flow was established through the vessel and the temperature was raised at 50° C. for drying. The mixture was left to dry for 2 hours with rotation of the mixer. The powder was then transferred to a canister and re-sieved. As shown in FIG. 16, the flowability curve obtained according to ASTM B213 indicates: Hall flow results generally decreasing (i.e. signifying an increasing flowability) as relative humidity increases; Hall flow results being less than 33 seconds; and Hall flow results varying by less than 5 seconds, or 15%, between 10% of relative humidity and 75% of relative humidity.

Example 8

In this non-limiting working example, another metal powder was in accordance with an embodiment of the present disclosure in order to obtain a powder that has an improved physical characteristic, which is insensitive to relative humidity.

1 kg AlSi10Mg raw powder with a PSD of from about 30 μm to about 70 μm was obtained from a plasma atomization process and suspended in 2 L toluene. 50 g dimethyldiethoxysilane was added to the mixture while stirring. The mixture was stirred for 3 hours at reflux and the powder was filtered out of the solution and washed with ethanol. The powder was left to dry at ambient temperature and atmosphere.

Example 9

In this non-limiting working example, another metal powder was in accordance with an embodiment of the present disclosure in order to obtain a powder that has an improved physical characteristic, which is insensitive to relative humidity. In this example, the treated powder had a flowability of less than 45 seconds according to ASTM B213 from 10% relative humidity up to 75% relative humidity and the Hall flow results vary by less than 3 seconds, or 7%, between 10% of relative humidity and 75% of relative humidity.

300 g AlSi10Mg powder with a PSD of from about 30 μm to about 70 μm was added to a polyethylene container. Methyltrimethoxysilane (0.2 g) was dissolved into ethanol (25 ml) and aqueous ammonium hydroxide (30%, 0.3 ml) was mixed with ethanol (25 ml) in a second container. The ammonium hydroxide solution was first added to the container and the contents were thoroughly mixed.

The silane solution was then added into the container and the contents of the container were thoroughly mixed. The container was placed in a rotating mixer. The mixer was then rotated at 0.5 RPM for 4 hours.

Figure 17:
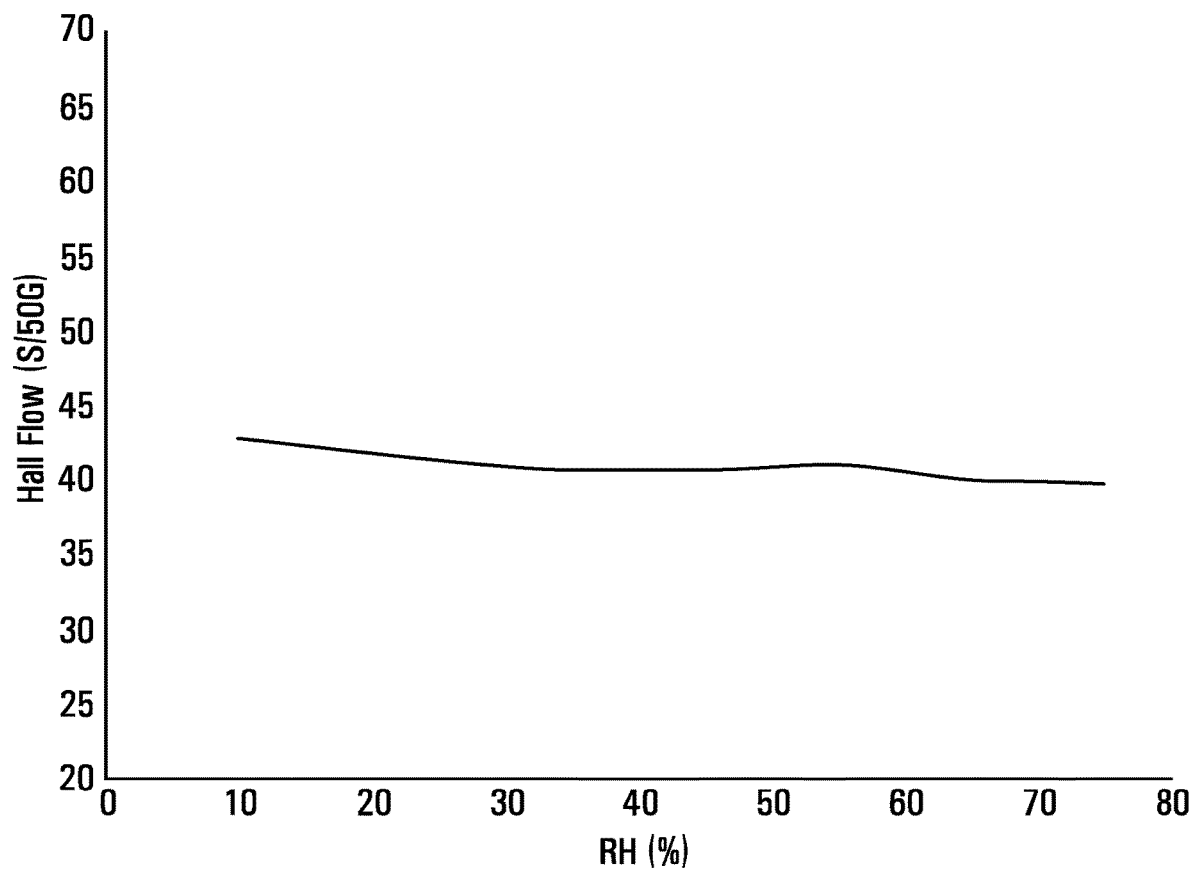
FIG. 17 shows a non-limiting graph of the flowability for a surface-modified powder as per Example 9, measured at various RH %.

As shown in FIG. 17, the flowability curve obtained according to ASTM B213 indicates: Hall flow results generally stable (i.e. signifying an increasing flowability); Hall flow results being less than 43 seconds; and Hall flow results varying by less than 2 seconds, or 5%, between 10% of relative humidity and 75% of relative humidity.

Example 10

In this non-limiting working example, another metal powder was in accordance with an embodiment of the present disclosure in order to obtain a powder that has an improved physical characteristic, which is insensitive to relative humidity. In this example, the treated powder had a flowability of less than 15 seconds according to ASTM B213 from 10% relative humidity up to 75% relative humidity.

Figure 18:
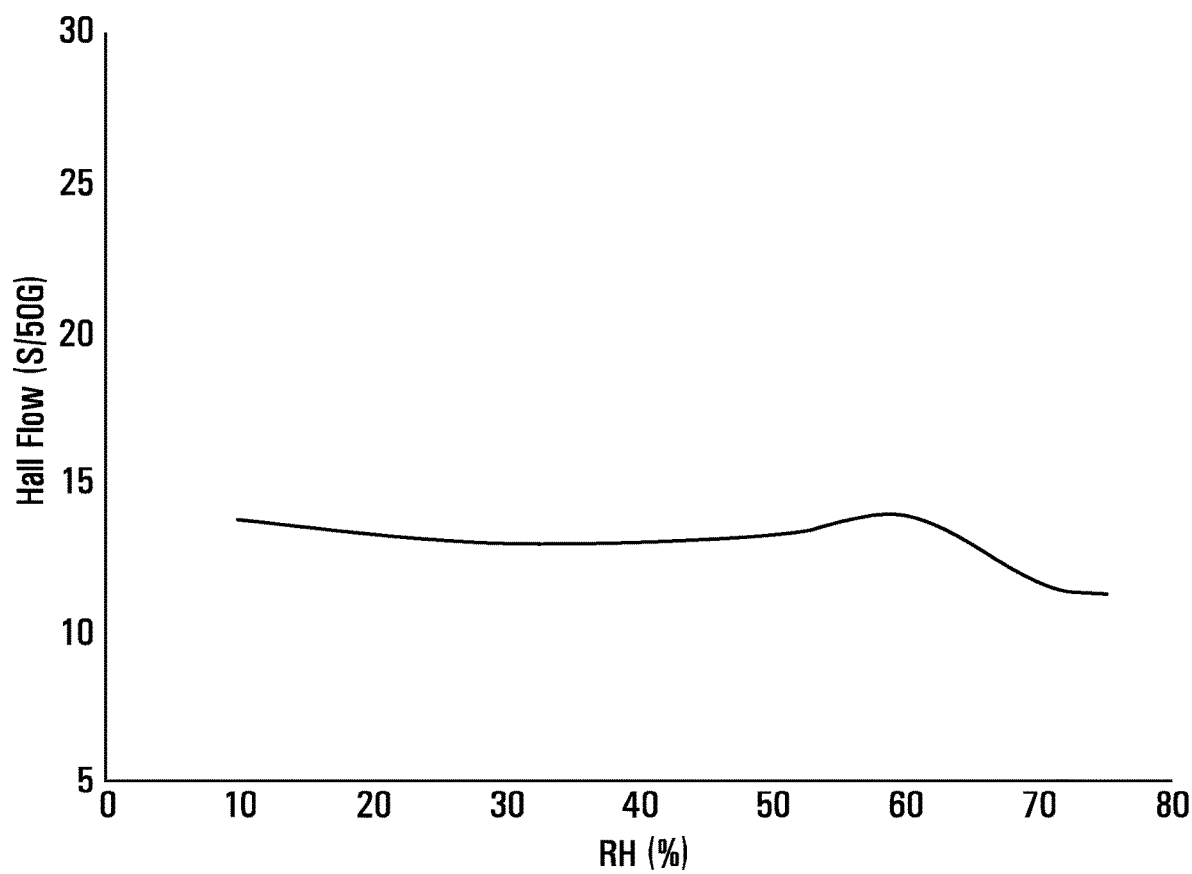
FIG. 18 shows a non-limiting graph of the flowability for a surface-modified powder as per Example 10, measured at various RH %.

500 g raw atomized Ni718 powder ( ) was added to a polyethylene canister. Methyltrimethoxysilane (0.053 g) was dissolved into ethanol (12.5 ml) and aqueous ammonium hydroxide (30%, 0.15 ml) was mixed with ethanol (12.5 ml) in a second container. The ammonium hydroxide solution was first added to the container and the contents were thoroughly mixed. The silane solution was then added into the container and the contents of the container were thoroughly mixed. The container was placed in a rotating mixer. The mixer was then rotated at 0.5 RPM for 4 hours. As shown in FIG. 18, the flowability curve obtained according to ASTM B213 indicates: Hall flow results being less than 14 seconds; and Hall flow results varying by less than 3 seconds, or 21%, between 10% of relative humidity and 75% of relative humidity.

Other examples of implementations will become apparent to the reader in view of the teachings of the present description. Although various embodiments of the disclosure have been described and illustrated, it will be apparent to those skilled in the art in light of the present description that numerous modifications and variations can be made.

For example, the blender described herein can be of V type, twin cone type, screw type, or any type of blender capable of blending metallic powders.

For example, all reagents can be added in a single solution or in at least two distinct solutions and/or in any order.

For example, aqueous ammonium hydroxide concentration in total alcohol can range between about 0.01 g/L to about 500 g/L, for example in the range of from 5 g/L to 120 g/L.

For example, the alcohol solution can be ethanol, methanol, isopropanol or a mixture thereof with or without residual water.

For example, the solution(s) can be injected in the mixer while blending or before, or in multiple steps.

The reaction time can range from about 10 min to about 12 hours, for example, from about 20 min to about 12 h, from about 30 min to about 12 h, from about 40 min to about 12 h, from about 50 min to about 12 h, from about 60 min to about 12 h, from about 10 min to about 11 h, from about 20 min to about 11 h, from about 30 min to about 11 h, from about 40 min to about 11 h, from about 50 min to about 11 h, from about 60 min to about 11 h, from about 10 min to about 10 h, from about 20 min to about 10 h, from about 30 min to about 10 h, from about 40 min to about 10 h, from about 50 min to about 10 h, from about 60 min to about 10 h, from about 10 min to about 9 h, from about 20 min to about 9 h, from about 30 min to about 9 h, from about 40 min to about 9 h, from about 50 min to about 9 h, from about 60 min to about 9 h, or any time in any one of these ranges.

The reaction temperature can range from about 20° C. to about 250° C., for example, from about 30° C. to about 250° C., from about 40° C. to about 250° C., from about 50° C. to about 250° C., from about 60° C. to about 250° C., from about 20° C. to about 200° C., from about 30° C. to about 200° C., from about 40° C. to about 200° C., from about 50° C. to about 200° C., from about 60° C. to about 200° C., from about 20° C. to about 150° C., from about 30° C. to about 150° C., from about 40° C. to about 150° C., from about 50° C. to about 150° C., from about 60° C. to about 150° C., from about 20° C. to about 100° C., from about 30° C. to about 100° C., from about 40° C. to about 100° C., from about 50° C. to about 100° C., from about 60° C. to about 100° C., or any temperature within these ranges.

The drying time can range from about 10 min to 12 hours, for example, from about 20 min to about 12 h, from about 30 min to about 12 h, from about 40 min to about 12 h, from about 50 min to about 12 h, from about 60 min to about 12 h, from about 10 min to about 11 h, from about 20 min to about 11 h, from about 30 min to about 11 h, from about 40 min to about 11 h, from about 50 min to about 11 h, from about 60 min to about 11 h, from about 10 min to about 10 h, from about 20 min to about 10 h, from about 30 min to about 10 h, from about 40 min to about 10 h, from about 50 min to about 10 h, from about 60 min to about 10 h, from about 10 min to about 9 h, from about 20 min to about 9 h, from about 30 min to about 9 h, from about 40 min to about 9 h, from about 50 min to about 9 h, from about 60 min to about 9 h, or any time in any one of these ranges.

Note that titles or subtitles may be used throughout the present disclosure for convenience of a reader, but in no way these should limit the scope of the invention. Moreover, certain theories may be proposed and disclosed herein; however, in no way they, whether they are right or wrong, should limit the scope of the invention so long as the invention is practiced according to the present disclosure without regard for any particular theory or scheme of action.

All references cited throughout the specification are hereby incorporated by reference in their entirety for all purposes.

Reference throughout the specification to "some embodiments", and so forth, means that a particular element (e.g., feature, structure, and/or characteristic) described in connection with the invention is included in at least one embodiment described herein, and may or may not be present in other embodiments. In addition, it is to be understood that the described inventive features may be combined in any suitable manner in the various embodiments.

It will be understood by those of skill in the art that throughout the present specification, the term "a" used before a term encompasses embodiments containing one or more to what the term refers. It will also be understood by those of skill in the art that throughout the present specification, the term "comprising", which is synonymous with "including," "containing," or "characterized by," is inclusive or open-ended and does not exclude additional, un-recited elements or method steps.

Unless otherwise defined, all technical and scientific terms used herein have the same meaning as commonly understood by one of ordinary skill in the art to which this invention pertains. In the case of conflict, the present document, including definitions will control.

As used in the present disclosure, the terms "around", "about" or "approximately" shall generally mean within the error margin generally accepted in the art. Hence, numerical quantities given herein generally include such error margin such that the terms "around", "about" or "approximately" can be inferred if not expressly stated.

The scope of the invention is defined more particularly in the appended claims.

The invention claimed is:

1. Additive manufacturing powder, comprising spherical plasma-atomized particles having a particle size distribution (PSD) from about 0 micrometers (μm) to about 1000 μm, having a hydrophilicity-reducing molecule at a surface of the spherical plasma-atomized particles that is present in an amount of less than 800 ppm in the additive manufacturing powder, and having a measurable flowability determined in accordance with ASTM B213 at 75% relative humidity, wherein the molecule or a source thereof includes an alkoxysilane.

2. The additive manufacturing powder according to claim 1, having a flowability of ≤40 s determined in accordance with ASTM B213 at 75% relative humidity.

3. The additive manufacturing powder according to claim 1, having a flowability of ≤30 s determined in accordance with ASTM B213 at 75% relative humidity.

4. The additive manufacturing powder according to claim 1, comprising particles having a PSD of 5 μm to 25 μm.

5. The additive manufacturing powder according to claim 1, comprising particles having a PSD of 15 μm to 45 μm.

6. The additive manufacturing powder according to claim 1, comprising particles having a PSD of 20 μm to 53 μm or 15 μm to 63 μm.

7. The additive manufacturing powder according to claim 1, wherein the particles have an oxygen content of less than 2000 ppm, or less than 1000 ppm, or less than 400 ppm, or less than 300 ppm, or less than 150 ppm.

8. The additive manufacturing powder according to claim 1, the particles have a hydrogen content less than 200 ppm, or less than 150 ppm, or less than 100 ppm.

9. The additive manufacturing powder according to claim 1, wherein the particles have a carbon content of less than 1000 ppm, or less than 500 ppm, or less than 300 ppm, or less than 100 ppm.

10. The additive manufacturing powder according to claim 1, wherein the particles have a nitrogen content of less than 500 ppm, or less than 400 ppm, or less than 300 ppm.

11. The additive manufacturing powder according to claim 1, wherein the particles are pure metal-based, alloy-based, ceramic-based, or composite-based particles.

12. The additive manufacturing powder according to claim 11, wherein the particles are titanium-, zirconium-, nickel-, platinum- or gold-based particles or are aluminum alloys-, steel-, stainless steel-, copper alloys-, nickel alloys-, superalloys-, palladium-, silver-, tungsten-, refractory metals-, ceramics-, polyamide-, or polystyrene-based particles.

13. The additive manufacturing powder according to claim 11, wherein the particles have the formula Al-10Si-0.35Mg, Al-10Si-Mg or Al-7Si-Mg.

14. The additive manufacturing powder according to claim 11, wherein the particles have the formula Ti-6Al-4Va.

15. The additive manufacturing powder according to claim 11, wherein the particles are Ni alloy 625-based particles or Ni alloy 718-based particles.

16. Additive manufacturing powder, comprising plasma-atomized spherical particles having a particle size distribution (PSD) of from about 0 micrometers (μm) to about 1000 μm and having a first flowability determined in accordance with ASTM B213 at 30% relative humidity and a second flowability determined in accordance with ASTM B213 at 75% relative humidity, wherein a ratio of the second flowability/first flowability is of at least 0.90.

17. The additive manufacturing powder according to claim 16, comprising particles having a PSD of 5 μm to 25 μm.

18. The additive manufacturing powder according to claim 16, comprising particles having a PSD of 15 μm to 45 μm.

19. The additive manufacturing powder according to claim 16, comprising particles having a PSD of 20 μm to 53 μm or 15 μm to 63 μm.

20. The additive manufacturing powder according to claim 16, wherein the particles have an oxygen content of less than 2000 ppm, or less than 1000 ppm, or less than 400 ppm, or less than 300 ppm, or less than 150 ppm.

21. The additive manufacturing powder according to claim 16, wherein the particles have an hydrogen content less than 200 ppm, or less than 150 ppm, or less than 100 ppm.

22. The additive manufacturing powder according to claim 16, wherein the particles have a carbon content of less than 1000 ppm, or less than 500 ppm, or less than 300 ppm, or less than 100 ppm.

23. The additive manufacturing powder according to claim 16, wherein the particles have a nitrogen content of less than 500 ppm, or less than 400 ppm, or less than 300 ppm.

24. The additive manufacturing powder according to claim 16, wherein the particles are pure metal-based, alloy-based, ceramic-based, or composite-based particles.

25. The additive manufacturing powder according to claim 24, wherein the particles have the formula Al-10Si-0.35Mg, Al-10Si-Mg or Al-7Si-Mg.

26. The additive manufacturing powder according to claim 24, wherein the particles have the formula Ti-6Al-4Va.

27. The additive manufacturing powder according to claim 24, wherein the particles are Ni alloy 625-based particles or Ni alloy 718-based particles.

* * * * *